US010575295B2

(12) United States Patent
Barzegar et al.

(10) Patent No.: US 10,575,295 B2
(45) Date of Patent: *Feb. 25, 2020

(54) REMOTE DISTRIBUTED ANTENNA SYSTEM

(71) Applicant: AT&T Intellectual Property I, L.P., Atlanta, GA (US)

(72) Inventors: Farhad Barzegar, Branchburg, NJ (US); Paul Shala Henry, Holmdel, NJ (US); George Blandino, Bridgewater, NJ (US); Irwin Gerszberg, Kendall Park, NJ (US); Donald J. Barnickel, Flemington, NJ (US); Thomas M. Willis, III, Tinton Falls, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,626

(22) Filed: May 8, 2018

(65) Prior Publication Data
US 2018/0263022 A1 Sep. 13, 2018

Related U.S. Application Data

(63) Continuation of application No. 15/179,193, filed on Jun. 10, 2016, now Pat. No. 9,999,038, which is a (Continued)

(51) Int. Cl.
*H04L 12/28* (2006.01)
*H04W 72/04* (2009.01)
(Continued)

(52) U.S. Cl.
CPC .......... *H04W 72/042* (2013.01); *H04B 7/155* (2013.01); *H04B 7/15542* (2013.01);
(Continued)

(58) Field of Classification Search
CPC ................. H04W 72/042; H04W 88/085; H04L 5/0023; H04B 7/2612
(Continued)

(56) References Cited

U.S. PATENT DOCUMENTS 2,685,068 A 7/1954 Goubau
2,852,753 A 9/1958 Gent et al.
(Continued)

FOREIGN PATENT DOCUMENTS

CA 2515560 A1 2/2007
CN 101390412 3/2009
(Continued)

OTHER PUBLICATIONS

European Patent Office, "For EP Application No. 14735737.0 filed Oct. 21, 2015", EP Office Action dated Jun. 18, 2018, Jun. 18, 2018, 7 pages.
(Continued)

*Primary Examiner* — John Pezzlo
(74) *Attorney, Agent, or Firm* — Guntin & Gust, PLC; Matthew Tropper

(57) ABSTRACT

A distributed antenna system is provided that frequency shifts the output of one or more microcells to a 60 GHz or higher frequency range for transmission to a set of distributed antennas. The cellular band outputs of these microcell base station devices are used to modulate a 60 GHz (or higher) carrier wave, yielding a group of subcarriers on the 60 GHz carrier wave. This group will then be transmitted in the air via analog microwave RF unit, after which it can be repeated or radiated to the surrounding area. The repeaters amplify the signal and resend it on the air again toward the next repeater. In places where a microcell is required, the 60 GHz signal is shifted in frequency back to its original
(Continued)

frequency (e.g., the 1.9 GHz cellular band) and radiated locally to nearby mobile devices.

20 Claims, 31 Drawing Sheets

Related U.S. Application Data continuation-in-part of application No. 13/907,246, filed on May 31, 2013, now Pat. No. 9,525,524.

(51) Int. Cl.
  *H04L 5/00* (2006.01)
  *H04B 7/155* (2006.01)
  *H04B 7/26* (2006.01)
  *H04J 1/16* (2006.01)
  *H04W 88/08* (2009.01)

(52) U.S. Cl.
  CPC ......... *H04B 7/2612* (2013.01); *H04L 5/0003* (2013.01); *H04L 5/0023* (2013.01); *H04L 5/0048* (2013.01); *H04W 88/085* (2013.01)

(58) Field of Classification Search
  USPC .................. 370/252, 329, 386, 430, 315
  See application file for complete search history.

(56) References Cited

U.S. PATENT DOCUMENTS

| | | |
|---|---|---|
| 2,867,776 A | 1/1959 | Wilkinson, Jr. |
| 2,912,695 A | 11/1959 | Cutler |
| 3,201,724 A | 8/1965 | Hafner |
| 4,783,665 A | 11/1988 | Lier et al. |
| 7,009,471 B2 | 3/2006 | Elmore |
| 7,043,271 B1 | 5/2006 | Seto et al. |
| 7,280,033 B2 | 10/2007 | Berkman et al. |
| 7,567,154 B2 | 7/2009 | Elmore |
| 7,590,404 B1 | 9/2009 | Johnson et al. |
| 7,925,235 B2 | 4/2011 | Konya et al. |
| 8,159,385 B2 | 4/2012 | Farneth et al. |
| 8,212,635 B2 | 7/2012 | Miller, II et al. |
| 8,237,617 B1 | 8/2012 | Johnson et al. |
| 8,344,829 B2 | 1/2013 | Miller, II et al. |
| 8,358,640 B1 | 1/2013 | Breau et al. |
| 8,897,697 B1 | 11/2014 | Bennett et al. |
| 9,113,347 B2 | 8/2015 | Henry |
| 9,520,945 B2 | 12/2016 | Gerszberg et al. |
| 9,525,524 B2 | 12/2016 | Barzegar et al. |
| 9,544,006 B2 | 1/2017 | Henry et al. |
| 9,564,947 B2 | 2/2017 | Stuckman et al. |
| 9,577,306 B2 | 2/2017 | Willis, III et al. |
| 9,608,740 B2 | 3/2017 | Henry et al. |
| 9,615,269 B2 | 4/2017 | Henry et al. |
| 9,627,768 B2 | 4/2017 | Henry et al. |
| 9,640,850 B2 | 5/2017 | Henry et al. |
| 9,653,770 B2 | 5/2017 | Henry et al. |
| 9,680,670 B2 | 6/2017 | Henry et al. |
| 9,692,101 B2 | 6/2017 | Henry et al. |
| 9,705,571 B2 | 7/2017 | Gerszberg et al. |
| 9,742,462 B2 | 8/2017 | Bennett et al. |
| 9,748,626 B2 | 8/2017 | Henry et al. |
| 9,768,833 B2 | 9/2017 | Fuchs et al. |
| 9,769,020 B2 | 9/2017 | Henry et al. |
| 9,780,834 B2 | 10/2017 | Henry et al. |
| 9,793,951 B2 | 10/2017 | Henry et al. |
| 9,793,954 B2 | 10/2017 | Bennett et al. |
| 9,847,566 B2 | 12/2017 | Henry et al. |
| 9,853,342 B2 | 12/2017 | Henry et al. |
| 9,860,075 B1 | 1/2018 | Gerszberg et al. |
| 9,866,309 B2 | 1/2018 | Bennett et al. |
| 9,871,282 B2 | 1/2018 | Henry et al. |
| 9,876,264 B2 | 1/2018 | Barnickel et al. |
| 9,876,570 B2 | 1/2018 | Henry et al. |
| 9,882,257 B2 | 1/2018 | Henry et al. |
| 9,917,341 B2 | 3/2018 | Henry et al. |
| 9,991,580 B2 | 6/2018 | Henry et al. |
| 9,997,819 B2 | 6/2018 | Bennett et al. |
| 9,998,172 B1 | 6/2018 | Barzegar et al. |
| 9,998,870 B1 | 6/2018 | Bennett et al. |
| 9,999,038 B2 | 6/2018 | Barzegar et al. |
| 10,003,364 B1 | 6/2018 | Willis, III et al. |
| 10,009,063 B2 | 6/2018 | Gerszberg et al. |
| 10,009,065 B2 | 6/2018 | Henry et al. |
| 10,009,901 B2 | 6/2018 | Gerszberg |
| 10,027,397 B2 | 7/2018 | Kim |
| 10,027,427 B2 | 7/2018 | Vannucci et al. |
| 10,033,107 B2 | 7/2018 | Henry et al. |
| 10,033,108 B2 | 7/2018 | Henry et al. |
| 10,044,409 B2 | 8/2018 | Barzegar et al. |
| 10,051,483 B2 | 8/2018 | Barzegar et al. |
| 10,051,488 B1 | 8/2018 | Vannucci et al. |
| 10,062,970 B1 | 8/2018 | Vannucci et al. |
| 10,069,535 B2 | 9/2018 | Vannucci et al. |
| 10,079,661 B2 | 9/2018 | Gerszberg et al. |
| 10,090,606 B2 | 10/2018 | Henry et al. |
| 10,096,883 B2 | 10/2018 | Henry et al. |
| 10,103,777 B1 | 10/2018 | Henry et al. |
| 10,103,801 B2 | 10/2018 | Bennett et al. |
| 10,123,217 B1 | 11/2018 | Barzegar et al. |
| 10,129,057 B2 | 11/2018 | Willis, III et al. |
| 10,135,145 B2 | 11/2018 | Henry et al. |
| 10,136,434 B2 | 11/2018 | Gerszberg et al. |
| 10,142,086 B2 | 11/2018 | Bennett et al. |
| 10,148,016 B2 | 12/2018 | Johnson et al. |
| 10,154,493 B2 | 12/2018 | Bennett et al. |
| 10,170,840 B2 | 1/2019 | Henry et al. |
| 10,171,158 B1 | 1/2019 | Barzegar et al. |
| 10,200,106 B1 | 2/2019 | Barzegar et al. |
| 10,205,212 B2 | 2/2019 | Henry et al. |
| 10,205,231 B1 | 2/2019 | Henry et al. |
| 10,205,655 B2 | 2/2019 | Barzegar et al. |
| 10,224,981 B2 | 3/2019 | Henry et al. |
| 10,230,426 B1 | 3/2019 | Henry et al. |
| 10,230,428 B1 | 3/2019 | Barzegar et al. |
| 10,243,270 B2 | 3/2019 | Henry et al. |
| 10,244,408 B1 | 3/2019 | Vannucci et al. |
| 10,264,586 B2 | 4/2019 | Beattie, Jr. et al. |
| 10,276,907 B2 | 4/2019 | Bennett et al. |
| 10,284,261 B1 | 5/2019 | Barzegar et al. |
| 10,291,286 B2 | 5/2019 | Henry et al. |
| 10,305,190 B2 | 5/2019 | Britz et al. |
| 10,305,192 B1 | 5/2019 | Rappaport |
| 10,305,197 B2 | 5/2019 | Henry et al. |
| 10,312,567 B2 | 6/2019 | Bennett et al. |
| 2003/0147655 A1 | 8/2003 | Shattil et al. |
| 2003/0231601 A1* | 12/2003 | Kim ............... H04B 10/25752 370/277 |
| 2004/0218688 A1 | 11/2004 | Santhoff et al. |
| 2005/0111533 A1 | 5/2005 | Berkman et al. |
| 2005/0258920 A1 | 11/2005 | Elmore et al. |
| 2006/0083269 A1 | 4/2006 | Kang et al. |
| 2008/0002652 A1 | 1/2008 | Gupta et al. |
| 2008/0113616 A1 | 5/2008 | Kim et al. |
| 2008/0211727 A1 | 9/2008 | Elmore et al. |
| 2008/0252541 A1 | 10/2008 | Diaz et al. |
| 2008/0279292 A1 | 11/2008 | Tanabe et al. |
| 2009/0079660 A1 | 3/2009 | Elmore et al. |
| 2009/0258652 A1* | 10/2009 | Lambert ............... H04W 88/04 455/446 |
| 2010/0124920 A1 | 5/2010 | Feher et al. |
| 2010/0159823 A1 | 6/2010 | Smith et al. |
| 2010/0225426 A1 | 9/2010 | Unger et al. |
| 2010/0277003 A1 | 11/2010 | Von Novak et al. |
| 2011/0051780 A1 | 3/2011 | Kawasaki |
| 2011/0091217 A1* | 4/2011 | Liu ............... H04B 10/25752 398/116 |
| 2011/0110404 A1 | 5/2011 | Washiro |
| 2011/0132658 A1 | 6/2011 | Miller, II et al. |
| 2011/0136432 A1 | 6/2011 | Miller, II et al. |
| 2011/0140911 A1 | 6/2011 | Pant et al. |
| 2011/0182174 A1 | 7/2011 | Pi et al. |
| 2011/0187578 A1 | 8/2011 | Farneth et al. |

(56) References Cited

U.S. PATENT DOCUMENTS

| | | |
|---|---|---|
| 2012/0133373 A1 | 5/2012 | Ali et al. |
| 2012/0300870 A1* | 11/2012 | Dickey .................. H04L 27/12 375/295 |
| 2013/0064311 A1 | 3/2013 | Turner et al. |
| 2014/0179302 A1 | 6/2014 | Polehn et al. |
| 2014/0233678 A1 | 8/2014 | Campos et al. |
| 2014/0328423 A1 | 11/2014 | Agee et al. |
| 2016/0080839 A1 | 3/2016 | Fuchs et al. |
| 2016/0112093 A1 | 4/2016 | Barzegar et al. |
| 2016/0142196 A1 | 5/2016 | Saban et al. |
| 2016/0164571 A1 | 6/2016 | Bennett et al. |
| 2016/0164573 A1 | 6/2016 | Birk et al. |
| 2016/0254889 A1 | 9/2016 | Shattil |
| 2016/0269156 A1 | 9/2016 | Barzegar et al. |
| 2016/0294517 A1 | 10/2016 | Barzegar et al. |
| 2016/0323015 A1 | 11/2016 | Henry et al. |
| 2016/0360511 A1 | 12/2016 | Barzegar |
| 2017/0018856 A1 | 1/2017 | Henry et al. |
| 2017/0064716 A1 | 3/2017 | Niewczas |
| 2017/0156069 A1 | 6/2017 | Moshfeghi |
| 2018/0048497 A1 | 2/2018 | Henry et al. |
| 2018/0054232 A1 | 2/2018 | Henry et al. |
| 2018/0054233 A1 | 2/2018 | Henry et al. |
| 2018/0054234 A1 | 2/2018 | Stuckman et al. |
| 2018/0062886 A1 | 3/2018 | Shala et al. |
| 2018/0069594 A1 | 3/2018 | Henry et al. |
| 2018/0074234 A1 | 3/2018 | Henry et al. |
| 2018/0074568 A1 | 3/2018 | Priyadarshi et al. |
| 2018/0076982 A1 | 3/2018 | Henry et al. |
| 2018/0076988 A1 | 3/2018 | Willis, III et al. |
| 2018/0108997 A1 | 4/2018 | Henry et al. |
| 2018/0108998 A1 | 4/2018 | Henry et al. |
| 2018/0108999 A1 | 4/2018 | Henry et al. |
| 2018/0115040 A1 | 4/2018 | Bennett et al. |
| 2018/0115044 A1 | 4/2018 | Henry et al. |
| 2018/0115058 A1 | 4/2018 | Henry et al. |
| 2018/0115060 A1 | 4/2018 | Bennett et al. |
| 2018/0115075 A1 | 4/2018 | Bennett et al. |
| 2018/0115081 A1 | 4/2018 | Johnson et al. |
| 2018/0123207 A1 | 5/2018 | Henry et al. |
| 2018/0123208 A1 | 5/2018 | Henry et al. |
| 2018/0123643 A1 | 5/2018 | Henry et al. |
| 2018/0123836 A1 | 5/2018 | Henry et al. |
| 2018/0151957 A1 | 5/2018 | Bennett et al. |
| 2018/0159195 A1 | 6/2018 | Henry et al. |
| 2018/0159196 A1 | 6/2018 | Henry et al. |
| 2018/0159197 A1 | 6/2018 | Henry et al. |
| 2018/0159228 A1 | 6/2018 | Britz et al. |
| 2018/0159229 A1 | 6/2018 | Britz |
| 2018/0159230 A1 | 6/2018 | Henry et al. |
| 2018/0159232 A1 | 6/2018 | Henry et al. |
| 2018/0159235 A1 | 6/2018 | Wolniansky |
| 2018/0159238 A1 | 6/2018 | Wolniansky |
| 2018/0159240 A1 | 6/2018 | Henry et al. |
| 2018/0159243 A1 | 6/2018 | Britz et al. |
| 2018/0159615 A1 | 6/2018 | Kim |
| 2018/0160430 A1 | 6/2018 | Barzegar et al. |
| 2018/0166761 A1 | 6/2018 | Henry et al. |
| 2018/0166784 A1 | 6/2018 | Johnson et al. |
| 2018/0166785 A1 | 6/2018 | Henry et al. |
| 2018/0166787 A1 | 6/2018 | Johnson et al. |
| 2018/0167130 A1 | 6/2018 | Vannucci |
| 2018/0167148 A1 | 6/2018 | Vannucci et al. |
| 2018/0302162 A1 | 10/2018 | Gerszberg et al. |
| 2019/0013577 A1 | 1/2019 | Henry et al. |
| 2019/0013837 A1 | 1/2019 | Henry et al. |
| 2019/0069296 A1 | 2/2019 | Barzegar et al. |
| 2019/0074563 A1 | 3/2019 | Henry et al. |
| 2019/0074564 A1 | 3/2019 | Henry et al. |
| 2019/0074565 A1 | 3/2019 | Henry et al. |
| 2019/0074580 A1 | 3/2019 | Henry et al. |
| 2019/0074878 A1 | 3/2019 | Henry et al. |
| 2019/0081747 A1 | 3/2019 | Barzegar et al. |
| 2019/0104012 A1 | 4/2019 | Barzegar et al. |
| 2019/0104419 A1 | 4/2019 | Barzegar et al. |
| 2019/0115642 A1 | 4/2019 | Henry et al. |
| 2019/0123442 A1 | 4/2019 | Vannucci et al. |
| 2019/0123783 A1 | 4/2019 | Henry et al. |
| 2019/0131717 A1 | 5/2019 | Vannucci |
| 2019/0131718 A1 | 5/2019 | Vannucci |
| 2019/0140679 A1 | 5/2019 | Vannucci et al. |
| 2019/0141714 A1 | 5/2019 | Willis, III et al. |
| 2019/0174506 A1 | 6/2019 | Willis, III et al. |
| 2019/0181683 A1 | 6/2019 | Vannucci et al. |
| 2019/0215109 A1* | 7/2019 | Hadani ................ H04L 5/0005 |

FOREIGN PATENT DOCUMENTS

| | | |
|---|---|---|
| CN | 101938835 | 1/2011 |
| CN | 102934508 | 2/2013 |
| CN | 103036837 | 4/2013 |
| CN | 105594138 A | 5/2016 |
| EP | 0756392 | 1/1997 |
| IN | 7352/CHENP/2015 A | 7/2016 |
| JP | 2002111579 A | 4/2002 |
| JP | 2005503709 A | 2/2005 |
| WO | 8605327 A1 | 9/1986 |
| WO | 2008117973 A1 | 10/2008 |
| WO | 2018106455 A1 | 6/2018 |
| WO | 2018106684 A1 | 6/2018 |
| WO | 2018106915 A1 | 6/2018 |
| WO | 2019050752 A1 | 3/2019 |

OTHER PUBLICATIONS

"Article 34 Amendment filed Apr. 10, 2018", for PCT Application No. PCT/US17/36266 filed Jun. 7, 2017, Apr. 10, 2018, 14 pages.

"International Preliminary Report on Patentability", PCT/US2014/039746, dated Dec. 10, 2015.

"International Search Report & Written Opinion", PCT/US2014/039746, dated Jan. 12, 2015.

Akalin, Tahsin et al., "Single-Wire Transmission Lines at Terahertz Frequencies", IEEE Transactions on Microwave Theory and Techniques, vol. 54, No. 6, 2006, 2762-2767.

Japan Patent Office, "JP Office Action dated Feb. 14, 2017", Feb. 14, 2017, 1-12.

Patent Cooperation Treaty, "International Search Report dated Sep. 4, 2017", PCT Application No. PCT/US17/36266 filed Jun. 7, 2017, pp. 1-12.

Wang, Kanglin, "Dispersion of Surface Plasmon Polaritons on Metal Wires in the Terahertz Frequency Range", Physical Review Letters, PRL 96, 157401, 2006, 4 pages.

"International Search Report and Written Opinion", PCT/US2018/015634, dated Jun. 25, 2018, 8 pages.

"State Intellectual Property Office of the People's Republic of China", Office Action dated Oct. 8, 2018 for Application No. 201480030493.1, dated Oct. 8, 2018, 6 pages.

Villaran, Michael et al., "Condition Monitoring of Cables Task 3 Report: Condition Monitoring Techniques for Electric Cables", Brookhaven National Laboratory, Technical Report, Nov. 30, 2009, 89 pages.

* cited by examiner

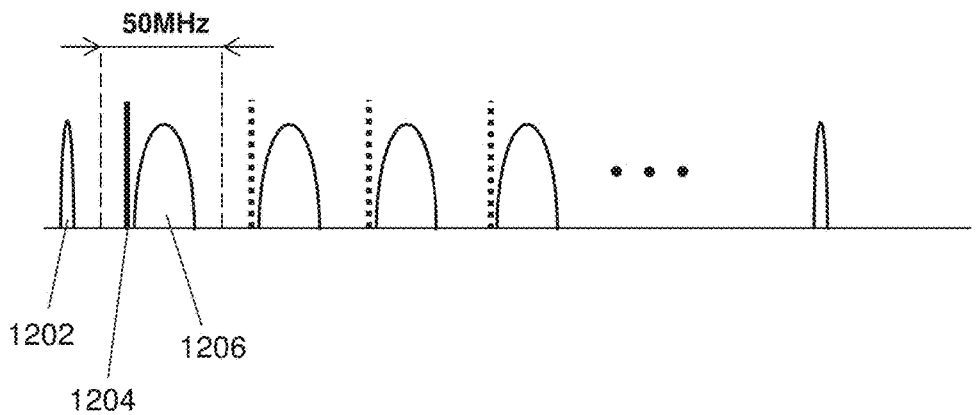
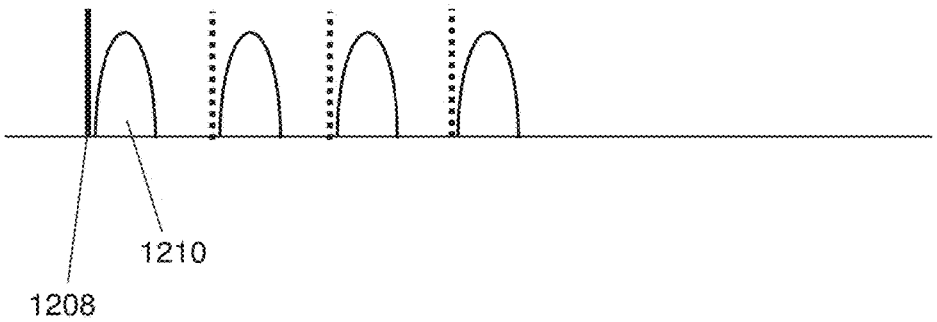
FIG. 12A

REMOTE DISTRIBUTED ANTENNA SYSTEM

CROSS-REFERENCE TO RELATED APPLICATION(S)

This application is a continuation of U.S. patent application Ser. No. 15/179,193, filed Jun. 10, 2016, which is a continuation-in-part of U.S. patent application Ser. No. 13/907,246, filed May 31, 2013 (now U.S. Pat. No. 9,525,524). All sections of the aforementioned application(s) and patent(s) are incorporated herein by reference in their entirety.

TECHNICAL FIELD

The subject disclosure relates to wireless communications, e.g., to providing a remote distributed antenna system using signals in defined bands, such as microwaves.

BACKGROUND

As smart phones and other portable devices increasingly become ubiquitous, and data usage skyrockets, macrocell base stations and existing wireless infrastructure are being overwhelmed. To provide additional mobile bandwidth, small cell deployment is being pursued, with microcells and picocells providing coverage for much smaller areas than traditional macrocells, but at high expense.

BRIEF DESCRIPTION OF THE DRAWINGS

FIG. 12A is a graphical diagram illustrating an example, non-limiting embodiment of downlink and uplink communication techniques for enabling a base station to communicate with communication nodes in accordance with various aspects described herein.

DETAILED DESCRIPTION

Figure 1:
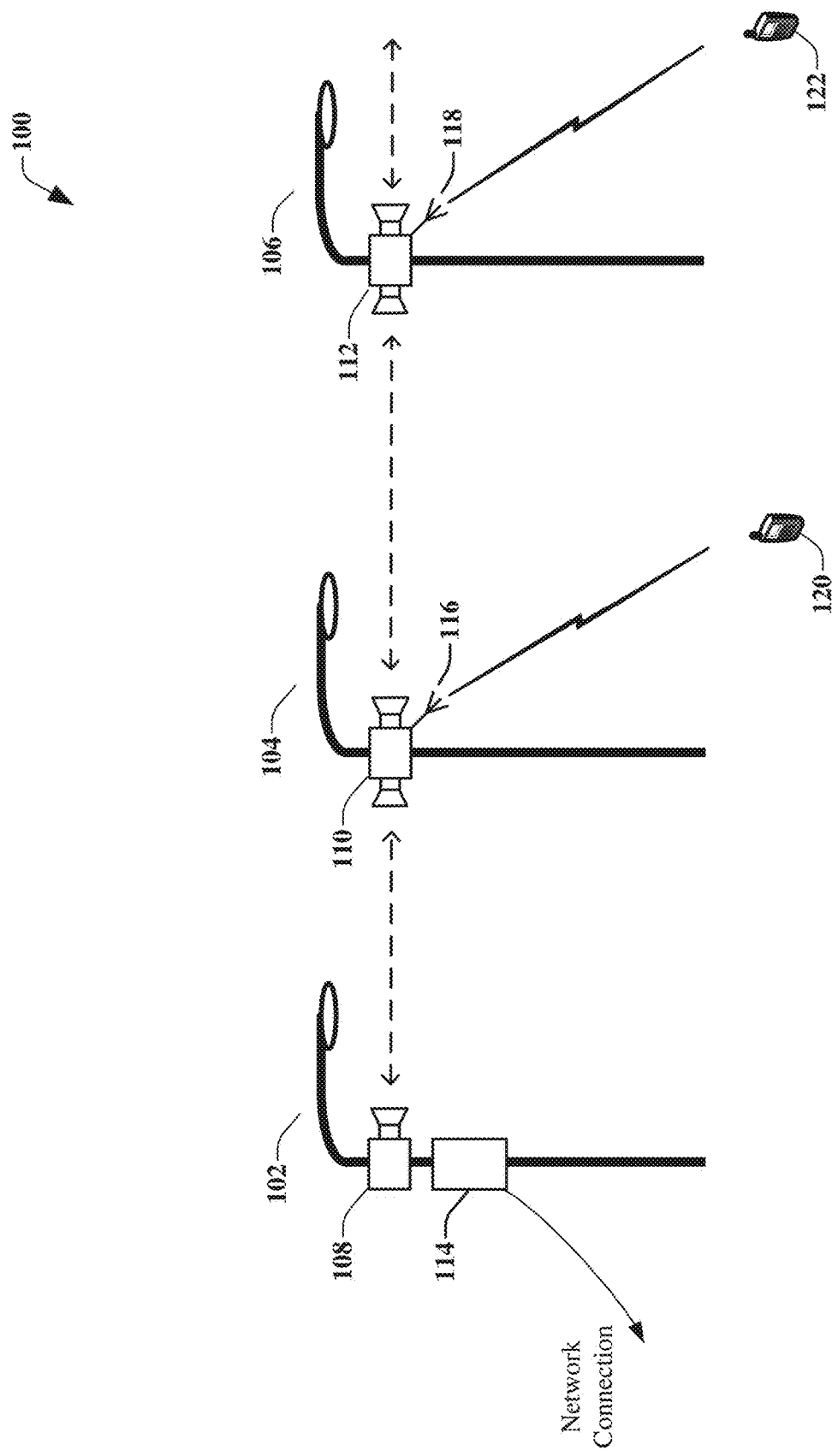
FIG. 1 is a block diagram illustrating an example, non-limiting embodiment of a distributed antenna system in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To provide network connectivity for increasing numbers of mobile devices, a distributed antenna system is provided that allows one or more base stations to have antennas that are distributed over a wide area. Small cell deployments can be used to supplement the traditional macrocellular deployments and require a pervasive and high capacity network to support them.

Various embodiments disclosed herein relate to a microwave system that carries the output signals of one or more microcells (or picocells, femtocells, and other types of small cell deployments) on a carrier wave that has a frequency corresponding to a millimeter-wave band (e.g., 60 GHz and higher). However, various embodiments disclosed here can operate at nearly any microwave frequency. A cluster of one or more microcell base station devices can be housed at a launching point, and serve several microcells in its vicinity. The RF (radio frequency) outputs of these microcell base station devices can be used to modulate a 60 GHz (or higher) carrier wave, yielding a group of subcarriers on the 60 GHz carrier wave. This group will then be transmitted in the air via an especially designed analog microwave RF unit, after which it can be repeated or radiated to the surrounding area. The repeaters amplify the signal and resend it on the air again toward the next repeater. In places where a microcell is required, the 60 GHz signal is shifted in frequency back to its original frequency (e.g., the 1.9 GHz cellular band) and radiated locally to nearby mobile devices.

As the 60 GHz carrier hops from one antenna site to the next, various subcarriers can be added or dropped depending on the traffic requirements of that site. The selection of channels to be added or dropped can be controlled dynamically as traffic loads shift. The return signals from the mobile devices can be modulated to another frequency in the 60 GHz range and can be sent back in the opposite direction to the original launching point. In another embodiment, time-division duplexing can be used and the return signals can be at the same frequency as the original signals. The repeaters thus essentially space shift the microcell base station devices from the launching point location to other places via radio hops from one utility pole to another. The launcher and repeaters can frequency shift the cellular signals via an analog process (modulating the carrier wave) in such a way the system is scalable and flexible, allowing additional microcells and antenna sites to be added as well as being communication protocol agnostic. The system disclosed herein will work for current cellular communication protocols just as well as it will work for future deployments.

For these considerations as well as other considerations, in one or more embodiments, a system includes a memory to store instructions and a processor, coupled to the memory to facilitate execution of the instructions to perform operations including facilitating receipt of a first signal from a base station device, wherein the first signal is determined to be in a cellular band. The operations include modulating a carrier wave signal with the first signal and generating a transmission based on the carrier wave signal and the first signal. The operations can also include directing the transmission to a remote antenna wirelessly.

Another embodiment includes a memory to store instructions and a processor, coupled to the memory to facilitate execution of the instructions to perform operations including receiving a first wireless transmission. The operations can also include extracting a signal from the first wireless transmission, where the signal is in a cellular band frequency. The operations can also include transmitting the signal to a mobile device and retransmitting the first wireless transmission.

In another embodiment, a method includes receiving, by a device including a processor, a defined high frequency transmission directed to a remote antenna. The method can also include identifying a signal from a plurality of signals, that is determined to be associated with the remote antenna, where the plurality of signals are carried in a plurality of channels with the defined high frequency transmission. The method can then include extracting the signal, transmitting the signal directed to a mobile device, and retransmitting the defined high frequency transmission directed to another remote antenna.

Turning now to FIG. 1, illustrated is an example, non-limiting embodiment of a distributed antenna system 100 in accordance with various aspects described herein. System 100 includes one or more microcell base stations (shown in more detail in FIGS. 3 and 5) at base station device 114 that is communicably coupled to a network connection via a physical connection (e.g., wired or optical) to a mobile network. In some embodiments, the base station device 114 can be communicably coupled to a macrocell site or the site's network connection. Macrocells can have dedicated connections to the mobile network, and base station device 114 can share the macrocell site's connection. Base station device 114 can be mounted on, or attached to light pole 102. In some embodiments, the base station device 114 can be mounted on utility poles, or other raised structures. In some embodiments, the base station device 114 can be installed on or near the ground.

Base station device 114 can provide connectivity for mobile devices 120 and 122. Antennas 116 and 118, mounted on or near launcher 108 or repeaters 110 and 112 on light poles (or utility poles or other structures) 102, 104, and 106 can receive signals from base station device 114 and transmit those signals to mobile devices 120 and 122 over a much wider area than if the antennas 116 and 118 were located at or near base station device 114.

It is to be appreciated that FIG. 1 displays three light poles, with one base station device, for purposes of simplicity. In other embodiments, light pole 102 can have more base station devices, and one or more light poles with distributed antennas are possible. In some embodiments, there can be launchers and/or repeaters without antennas. Antennas can be communicably coupled to launchers and/or repeaters in areas where microcell deployments are required or can be spaced out to avoid excessive overlap.

Launcher 108 can receive the signals from the base station device 114 that are directed at mobile devices 120 and 122 and modulate a 60 GHz carrier wave, yielding a group of subcarriers on the 60 GHz carrier. The launcher 108 can then transmit the carrier wave to repeaters within range, in this case, repeater 110. Repeater 110 can extract the signal directed toward mobile device 120 from the carrier wave, and radiate the signal to the mobile device 120 via antenna 116. Repeater 110 can then retransmit the carrier wave to repeater 112, where repeater 112 extracts the signal directed at mobile device 122 and radiates the signal via antenna 118.

Repeater 112 can then retransmit the carrier wave transmission to the next repeater. The repeaters 110 and 112 can also amplify the transmission before retransmitting using a combination of low noise amplifiers and power amplifiers.

In various embodiments, the repeaters 110 and 112 and/or antennas 116 and 118 can be assigned to channels that correspond to predetermined bandwidth ranges in the carrier wave. The repeaters 110 and 112 can extract the assigned signals from the carrier wave, wherein the signals correspond to the channels and or bandwidths corresponding to the repeaters and/or antennas. In this way, the antennas 116 and 118 radiate the correct signal for the microcell area. In other embodiments, the carrier wave can include a control channel that contains metadata that indicates which of the subcarriers correspond to the antennas 116 and 118, and so repeaters 110 and 112 extract the appropriate signal.

As the 60 GHz carrier wave hops from one radiator site to another, various subcarriers can be added or dropped, depending on the traffic requirements of that site. The selection of channels to be added or dropped can be controlled dynamically as traffic load shifts.

When mobile devices 120 and/or 122 send signals back to the mobile network, antennas 116 and/or 118 receive those signals and repeaters 110 and/or 112 use the signals to modulate another carrier wave (e.g., are shifted to 60 GHz in the analog domain) and then the carrier wave is transmitted back to the launcher 108 where the signals from mobile devices 120 an/or 122 are extracted and delivered to base station device 114.

Figure 2:
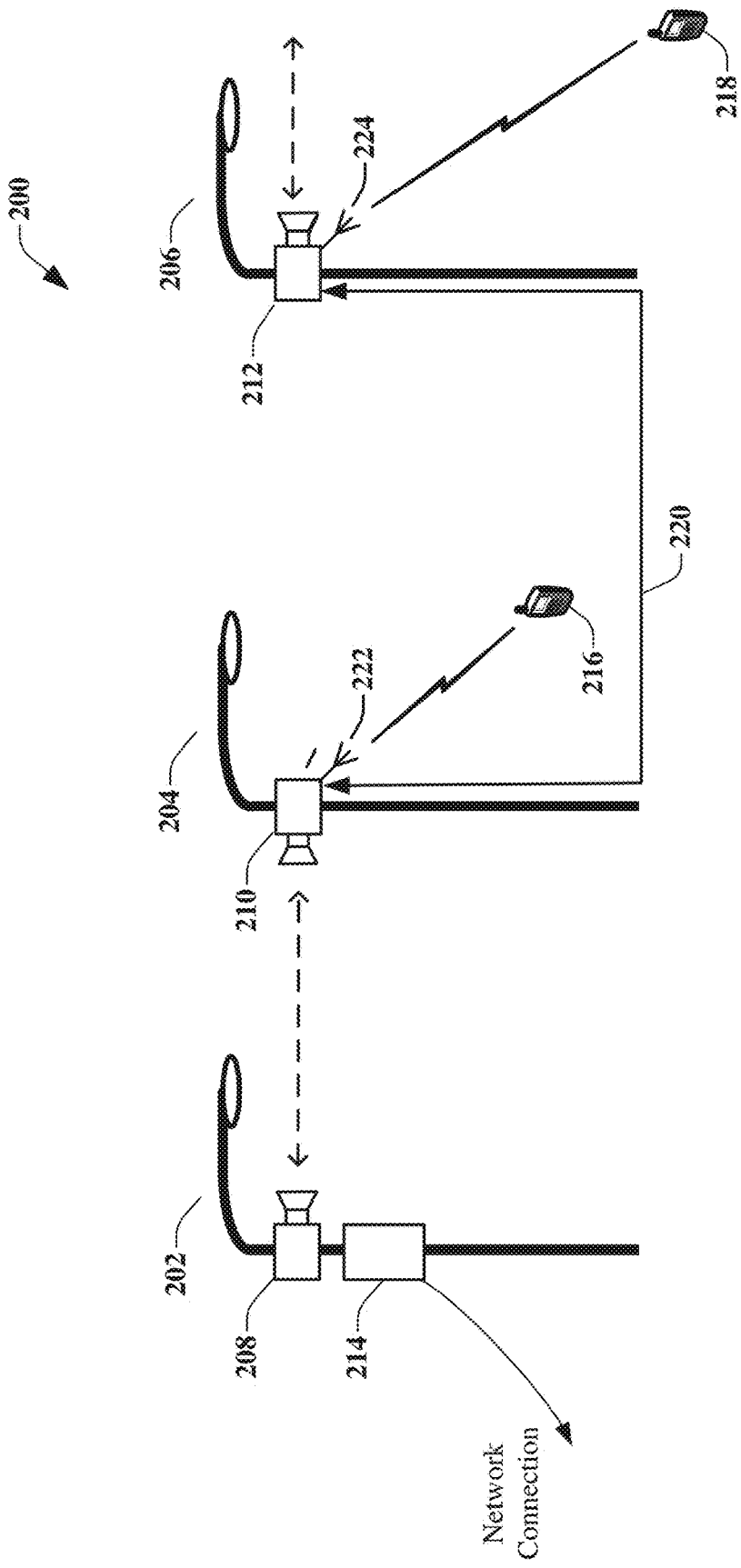
FIG. 2 is a block diagram illustrating an example, non-limiting embodiment of a distributed antenna system in accordance with various aspects described herein.

Turning now to FIG. 2, a block diagram illustrating an example, non-limiting embodiment of a distributed antenna system 200 in accordance with various aspects described herein is shown. System 200 includes one or more microcell base station devices (shown in more detail in FIGS. 3 and 5) at base station 214 that is communicably coupled to a network connection via a physical connection (e.g., wired or optical) to a mobile network. In some embodiments, the base station 214 can be communicably coupled to a macrocell site or the site's network connection. Macrocells can have dedicated connections to the mobile network, and base station 214 can share the macrocell site's network connection. Base station 214 can be mounted on, or attached to light pole 202. In some embodiments, the base station 214 can be mounted on utility poles, or other raised structures. In some embodiments, the base station 214 can be installed on or near the ground.

FIG. 2 depicts a different embodiment than that shown in FIG. 1. In FIG. 2, unlike in FIG. 1, the transmission hop between light poles 204 and 206 can be implemented using a carrier wave that is sent via a power line (e.g., a surface wave), or via an underground conduit (e.g., a pipe) as a guided electromagnetic wave. In some embodiments, the transmission 220 can be sent down a wire or other traditional datalink.

Whatever the transmission means, the functionality is similar to FIG. 1, where launcher 208 can receive the signals from the base station 214 that are directed at mobile devices 216 and 218 and modulate a 60 GHz carrier wave, yielding a group of subcarriers on the 60 GHz carrier. The launcher 208 can then transmit the carrier wave to repeaters within range, in this case, repeater 222. Repeater 210 can extract the signal directed toward mobile device 216 from the carrier wave, and radiate the signal to the mobile device 216 via antenna 222. Repeater 210 can then retransmit the carrier wave via the physical link or as a surface wave over a power line to repeater 212, where repeater 212 extracts the signal directed at mobile device 218 and radiates the signal via antenna 224. Repeater 212 can then retransmit the carrier wave transmission to the next repeater. The repeaters 210 and 212 can also amplify the transmission before retransmitting using a combination of low noise amplifiers and power amplifiers.

Figure 3:
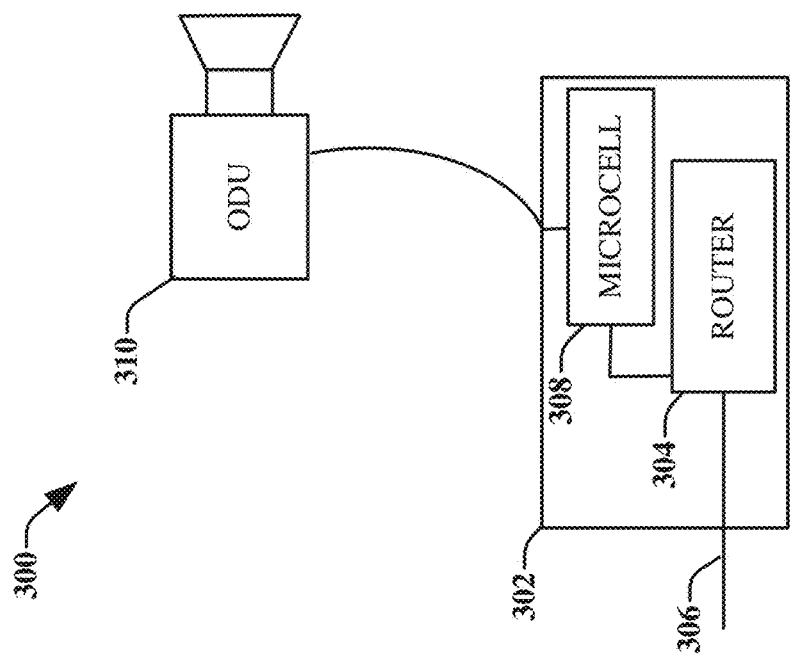
FIG. 3 is a block diagram illustrating an example, non-limiting embodiment of a distributed antenna launcher system in accordance with various aspects described herein.

Turning now to FIG. 3, illustrated is a block diagram of an example, non-limiting embodiment of a distributed antenna launcher system 300 in accordance with various aspects described herein. FIG. 3 shows in more detail the base station 104 and launcher 106 described in FIG. 1. A base station 302 can include a router 304 and a microcell base station device 308 (or picocell, femtocell, or other small cell deployment). The base station 302 can receive an external network connection 306 that is linked to existing infrastructure. The network connection 306 can be physical (such as fiber or cable) or wireless (such as a high-bandwidth microwave connection). The existing infrastructure that the network connection 306 can be linked to, can in some embodiments be macrocell sites. For those macrocell sites that have high data rate network connections, base station 302 can share the network connection with the macrocell site.

Figure 7:
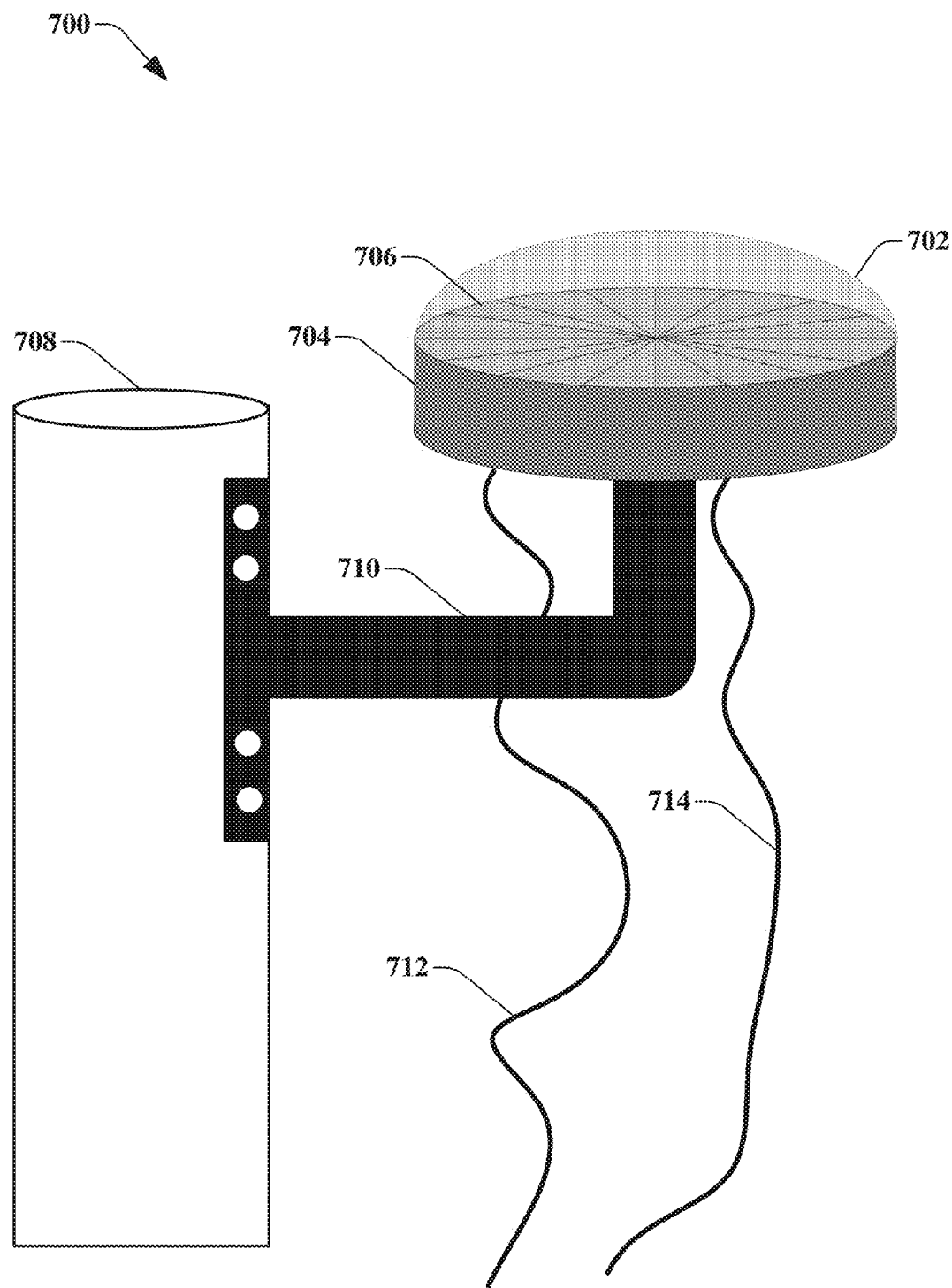
FIG. 7 is a block diagram illustrating an example, non-limiting embodiment of a millimeter band antenna apparatus in accordance with various aspects described herein.

The router 304 can provide connectivity for microcell base station device 308 which facilitates communications with the mobile devices. While FIG. 3 shows that base station 302 has one microcell base station device, in other embodiments, the base station 302 can include two or more microcell base station devices. The RF output of microcell base station device 308 can be used to modulate a 60 GHz signal and be connected via fiber to an out door unit ("ODU") 310. ODU 310 can be any of a variety of microwave antennas that can receive and transmit microwave signals. In some embodiments, ODU unit can be a millimeter-wave band antenna apparatus as shown in FIG. 7.

Figure 4:
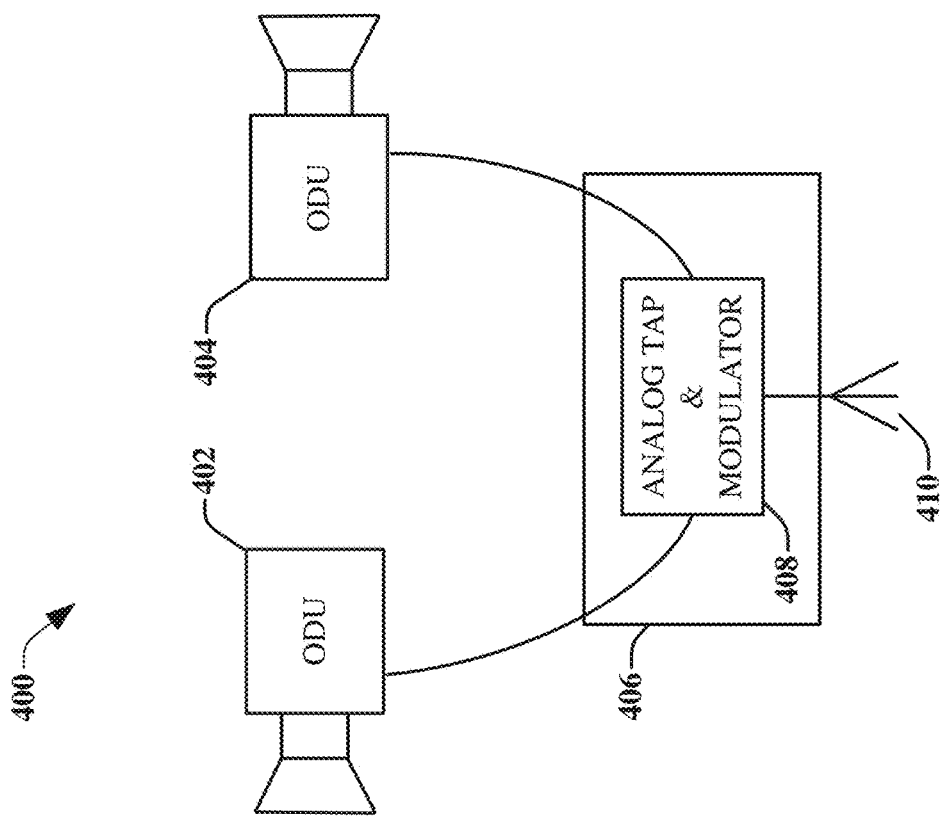
FIG. 4 is a block diagram illustrating an example, non-limiting embodiment of a distributed antenna repeater system in accordance with various aspects described herein.

Turning now to FIG. 4, a block diagram illustrating an example, non-limiting embodiment of a distributed antenna repeater system 400 in accordance with various aspects described herein is shown. ODU 402 can receive a millimeter-wave transmission sent from another ODU at a repeater or a launcher. The transmission can be a carrier wave with a plurality of subcarrier signals. A repeater 406 can receive the transmission and an analog tap and modulator 408 can extract a signal from the plurality of subcarrier signals and radiate the signal via an antenna 410 to a mobile device. The analog tap and modulator 408 can also amplify the transmission received by ODU 402 and retransmit the carrier wave to another repeater or launcher via ODU 404.

Antenna 410 can also receive a communication protocol signal from a mobile device, and analog tap and modulator 408 can use the signal to modulate another carrier wave, and ODUs 402 or 404 can send the carrier wave transmission on to a base station device.

Figure 5:
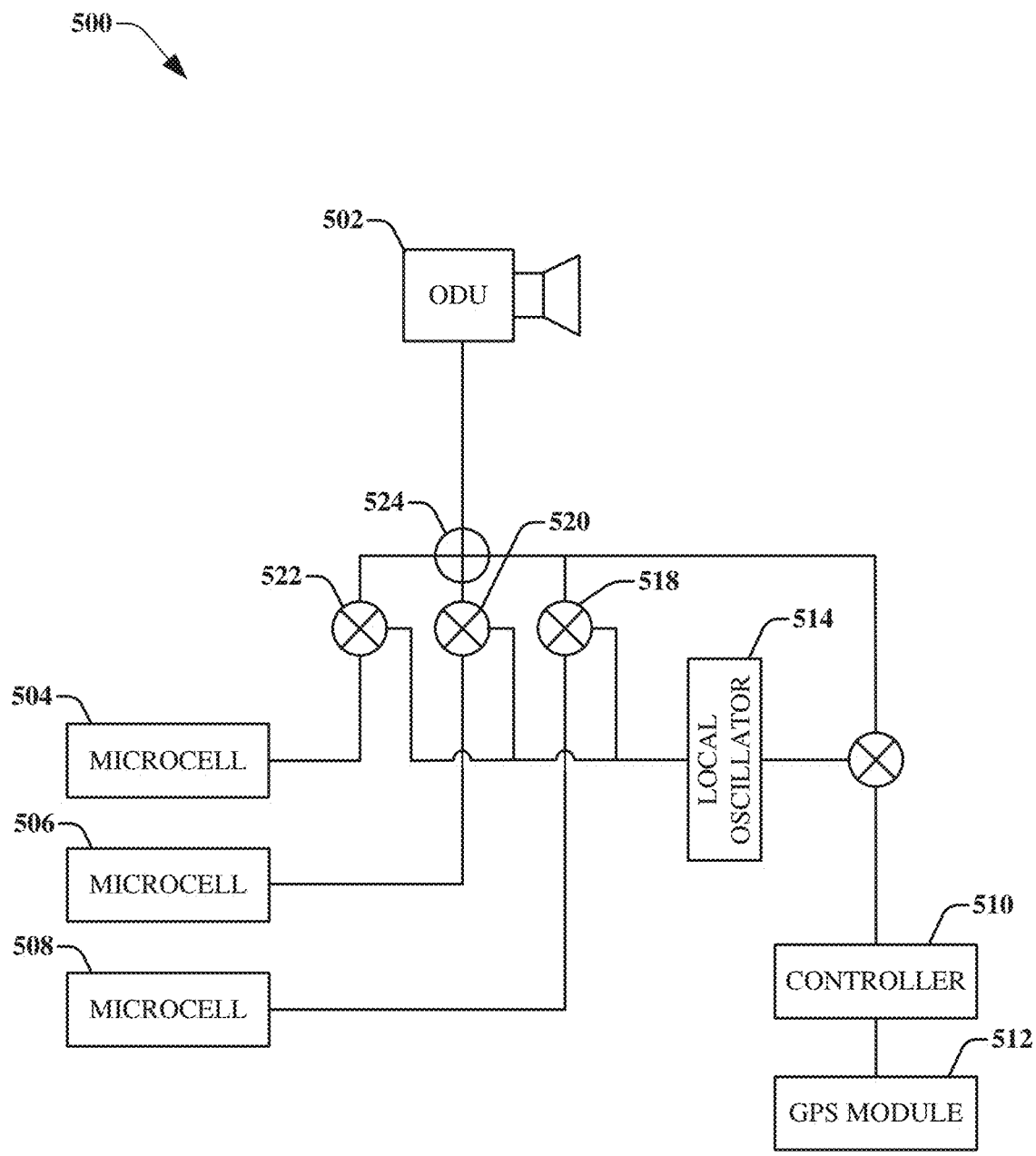
FIG. 5 is a block diagram illustrating an example, non-limiting embodiment of a distributed antenna launcher system in accordance with various aspects described herein.

With reference to FIG. 5, a block diagram illustrating an example, non-limiting embodiment of a distributed antenna launcher system 500 in accordance with various aspects described herein is shown. System 500 includes microcell base station devices 504, 506, and 508 that transmit to and receive signals from mobile devices that are in their respective cells. It is to be appreciated that system 500 is shown with 3 microcell base station devices purely for exemplary reasons. In other embodiments, a base station site, or cluster can contain one or more microcell base station devices.

The outputs of the microcell base station devices 504, 506, and 508 can be combined with a millimeter wave carrier wave generated by a local oscillator 514 at frequency mixers 522, 520, and 518 respectively. Frequency mixers 522, 520, and 518 can use heterodyning techniques to frequency shift the signals from microcell base station devices 504, 506, and 508. This can be done in the analog domain, and as a result the frequency shifting can be done without regard to the type of communications protocol that microcell base station devices 504, 506, and 508 use. Over time, as new communications technologies are developed, the microcell base station devices 504, 506, and 508 can be upgraded or replaced and the frequency shifting and transmission apparatus can remain, simplifying upgrades.

The controller 510 can generate the control signal that accompanies the carrier wave, and GPS module 512 can synchronize the frequencies for the control signal such that the exact frequencies can be determined. The GPS module 512 can also provide a time reference for the distributed antenna system.

Multiplexer/demultiplexer 524 can frequency division multiplex the signals from frequency mixers 518, 520, and 522 in accordance with the control signal from controller 510. Each of the signals can assigned channels on the carrier wave, and the control signal can provide information indicating the microcell signals that correspond to each channel.

ODU unit 502 can also receive transmissions sent by repeaters, where the transmission's carrier wave are carrying signals directed at the microcell base station devices 504, 506, and 508 from mobile devices. Multiplexer/demultiplexer 524 can separate the subcarrier signals from each other and direct them to the correct microcells based on the channels of the signals, or based on metadata in the control signal. The frequency mixers 518, 520, and 522 can then extract the signals from the carrier wave and direct the signals to the corresponding microcells.

Figure 6:
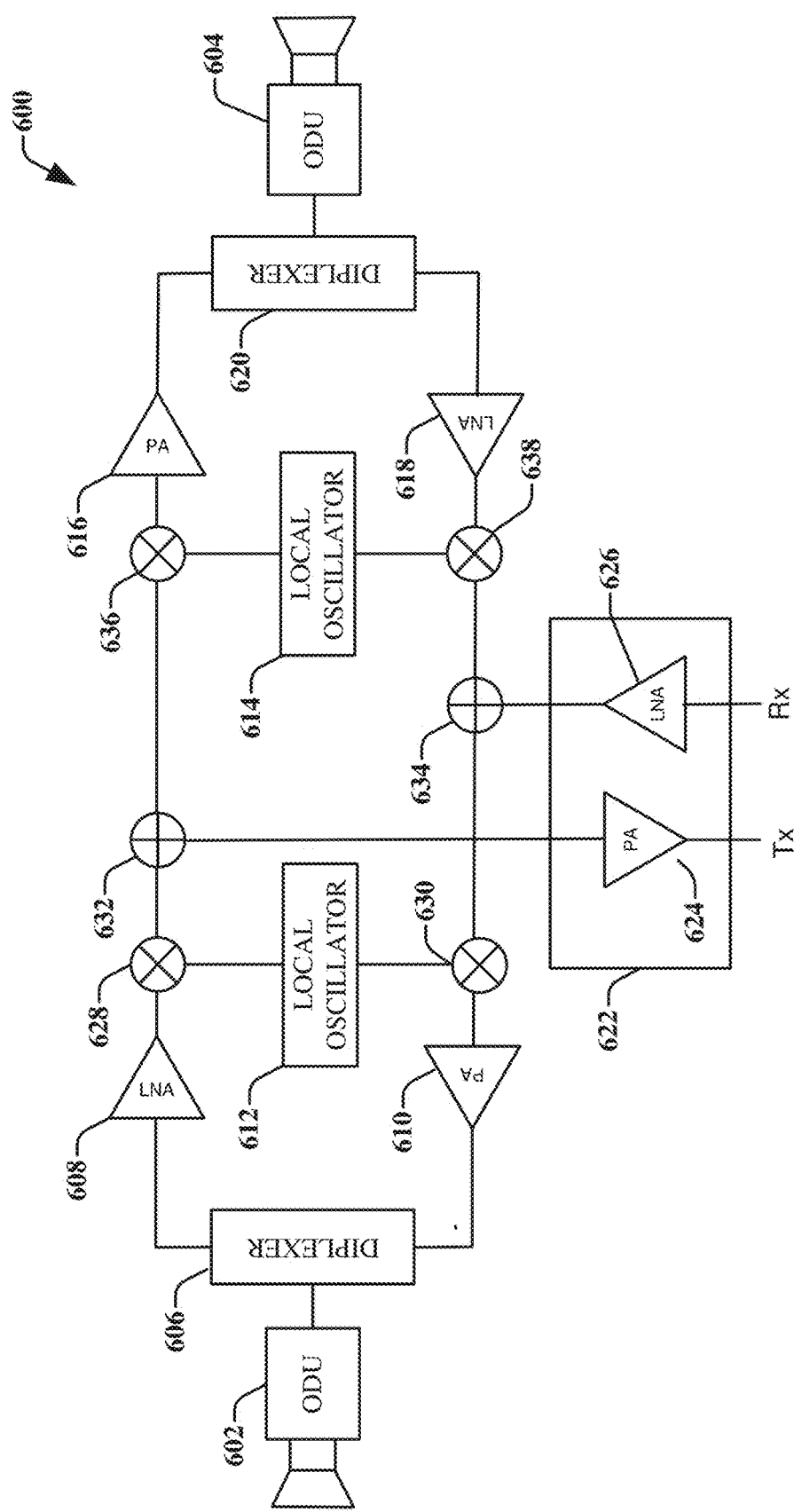
FIG. 6 is a block diagram illustrating an example, non-limiting embodiment of a distributed antenna repeater system in accordance with various aspects described herein.

Turning now to FIG. 6, a block diagram illustrating an example, non-limiting embodiment of a distributed antenna repeater system 600 in accordance with various aspects described herein is shown. Repeater system 600 includes ODUs 602 and 604 that receive and transmit transmissions from launchers and other repeaters.

In various embodiments, ODU 602 can receive a transmission from a launcher with a plurality of subcarriers. Diplexer 606 can separate the transmission from other transmissions that the ODU 602 is sending, and direct the transmission to low noise amplifier ("LNA") 608. A frequency mixer 628, with help from a local oscillator 612, can downshift the transmission (which is at or above 60 GHz) to the cellular band (~1.9 GHz). An extractor 632 can extract the signal on the subcarrier that corresponds to antenna 622 and direct the signal to the antenna 622. For the signals that are not being radiated at this antenna location, extractor 632 can redirect them to another frequency mixer 636, where the signals are used to modulate a carrier wave generated by local oscillator 614. The carrier wave, with its subcarriers, is directed to a power amplifier ("PA") 616 and is retransmitted by ODU 604 to another repeater, via diplexer 620.

At the antenna 622, a PA 624 can boost the signal for transmission to the mobile device. An LNA 626 can be used to amplify weak signals that are received from the mobile device and then send the signal to a multiplexer 634 which merges the signal with signals that have been received from ODU 604. The signals received from ODU 604 have been split by diplexer 620, and then passed through LNA 618, and downshifted in frequency by frequency mixer 638. When the signals are combined by multiplexer 634, they are upshifted in frequency by frequency mixer 630, and then boosted by PA 610, and transmitted back to the launcher or another repeater by ODU 602.

Turning now to FIG. 7, a block diagram illustrating an example, non-limiting embodiment of a millimeter-wave band antenna apparatus 700 in accordance with various aspects described herein is shown. The radio repeater 704 can have a plastic cover 702 to protect the radio antennas 706. The radio repeater 704 can be mounted to a utility pole, light pole, or other structure 708 with a mounting arm 710. The radio repeater can also receive power via power cord 712 and output the signal to a nearby microcell using fiber or cable 714.

In some embodiments, the radio repeater 704 can include 16 antennas. These antennas can be arranged radially, and each can have approximately 24 degrees of azimuthal beamwidth. There can thus be a small overlap between each antennas beamwidths. The radio repeater 704, when transmitting, or receiving transmissions, can automatically select the best sector antenna to use for the connections based on signal measurements such as signal strength, signal to noise ratio, etc. Since the radio repeater 704 can automatically select the antennas to use, in one embodiment, precise antenna alignment is not implemented, nor are stringent requirements on mounting structure twist, tilt, and sway.

In some embodiments, the radio repeater 704 can include an apparatus such as repeater system 600 or 400 within the apparatus, thus enabling a self-contained unit to be a repeater in the distributed antenna network, in addition to facilitating communications with mobile devices.

Figure 8:
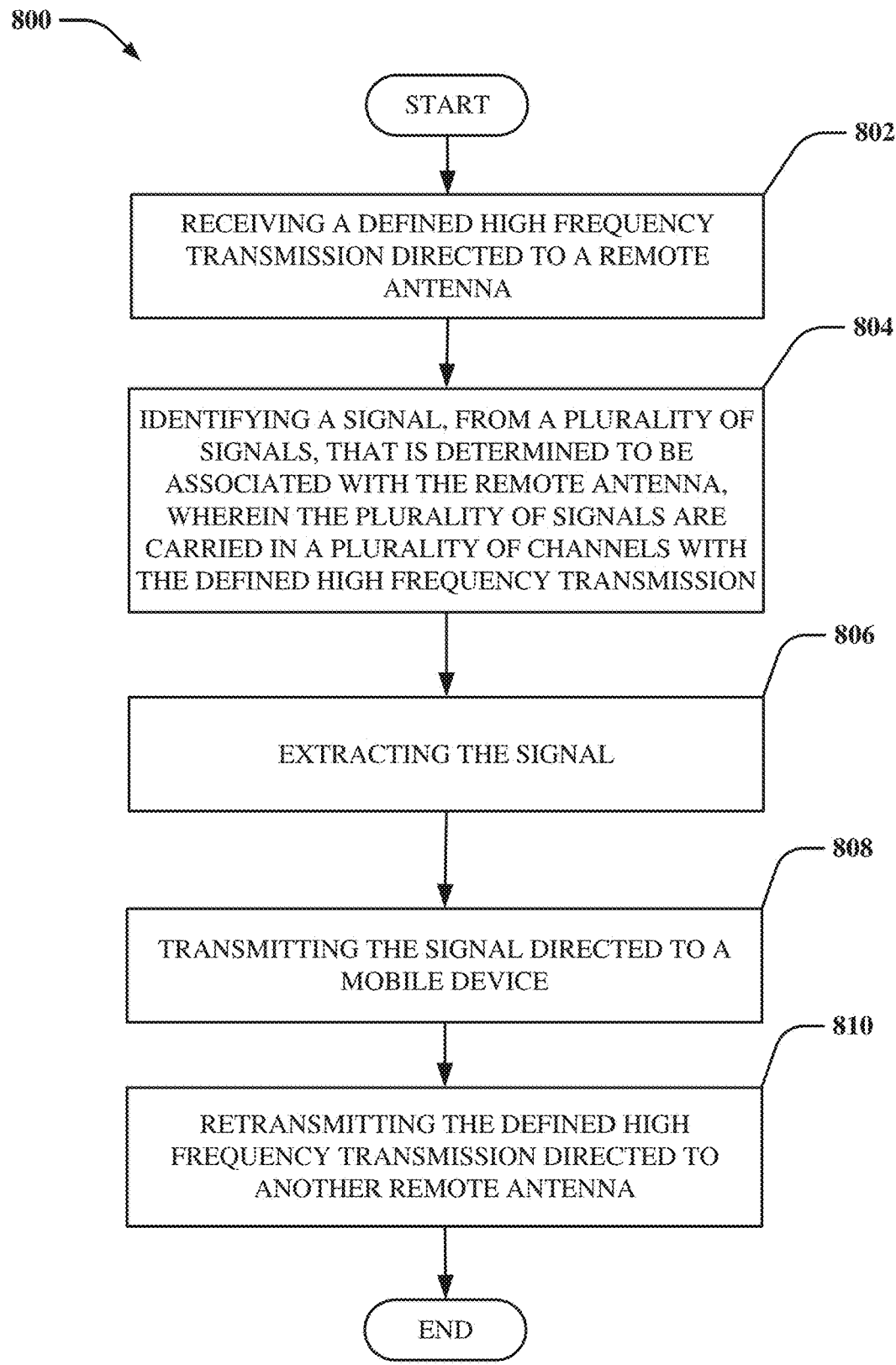
FIG. 8 illustrates a flow diagram of an example, non-limiting embodiment of a method for providing a distributed antenna system as described herein.

FIG. 8 illustrates a process in connection with the aforementioned systems. The process in FIG. 8 can be implemented for example by systems 100, 200, 300, 400, 500, 600, and 700 illustrated in FIGS. 1-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates a flow diagram of an example, non-limiting embodiment of a method for providing a distributed antenna system as described herein. Methodology 800 can include step 802, where a defined high frequency transmission is received from a remote antenna. The first defined frequency transmission can be at or greater than 60 GHz. The transmission can be received by an outdoor microwave transceiver (e.g., ODU 602 or radio repeater 704). At step 804, a signal, from a plurality of signals in the transmission, is identified and determined to be associated with the remote antenna (e.g., based on the control channel), and wherein the plurality of signals are carried in a plurality of channels with the defined high frequency transmission. The plurality of channels can be frequency division multiplexed together in some embodiments. The channel that the signals are occupying can determine which remote antenna the signals are directed towards, and at step 806, a frequency mixer (e.g., 628) and multiplexer/demultiplexer (e.g., 632) can extract the signal from the plurality of signals and shift the signal back to the native frequency of around 1.9 GHz. At step 808, the signal can be transmitted (e.g., by antenna 622) to a mobile device that the signal is directed towards. At 810, the defined frequency transmission can be retransmitted on towards another remote antenna and/or repeater in the chain.

Figure 9:
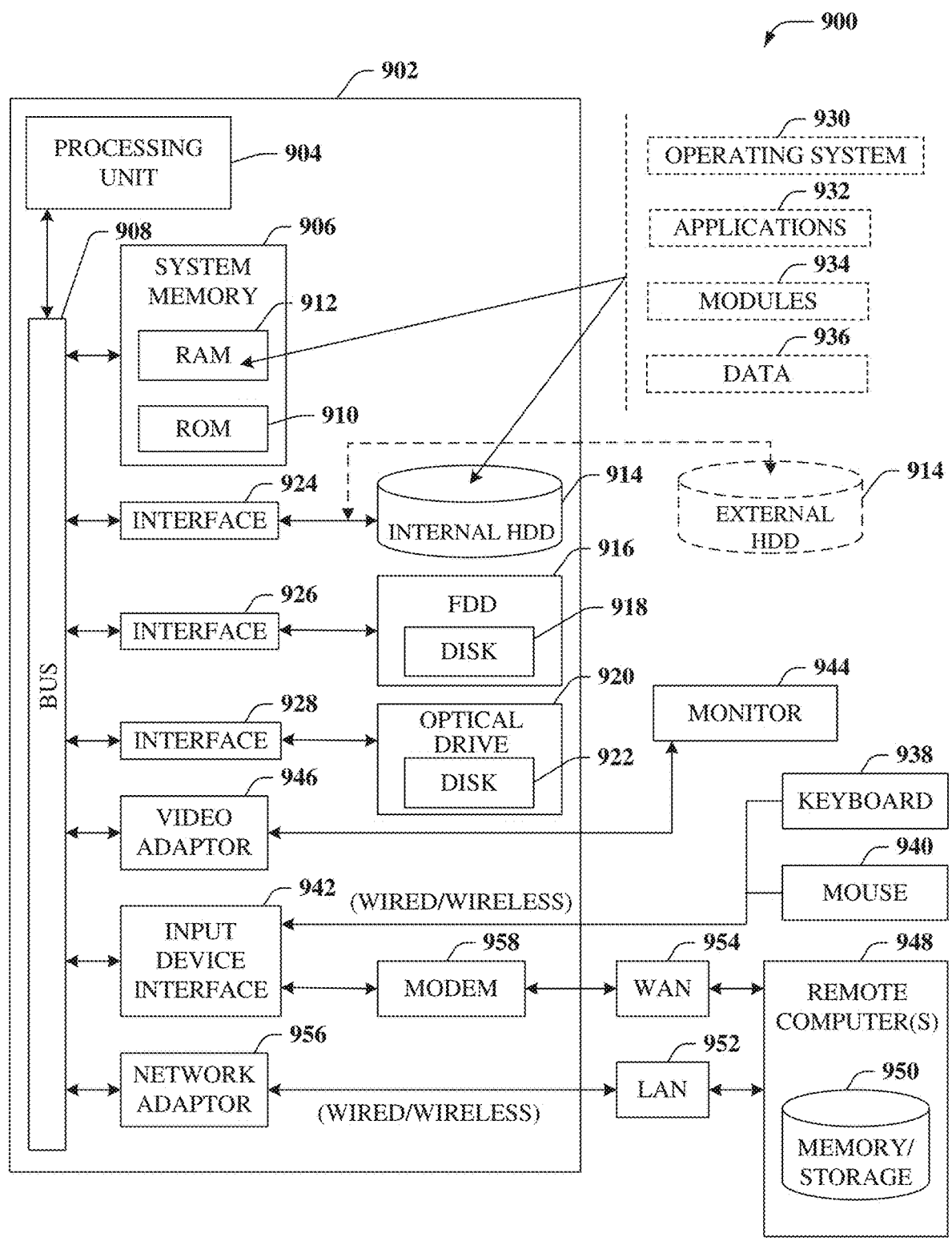
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the distributed antenna system disclosed in any of the previous systems 100, 200, 300, 400, 500, 600 and/or 700.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 10:
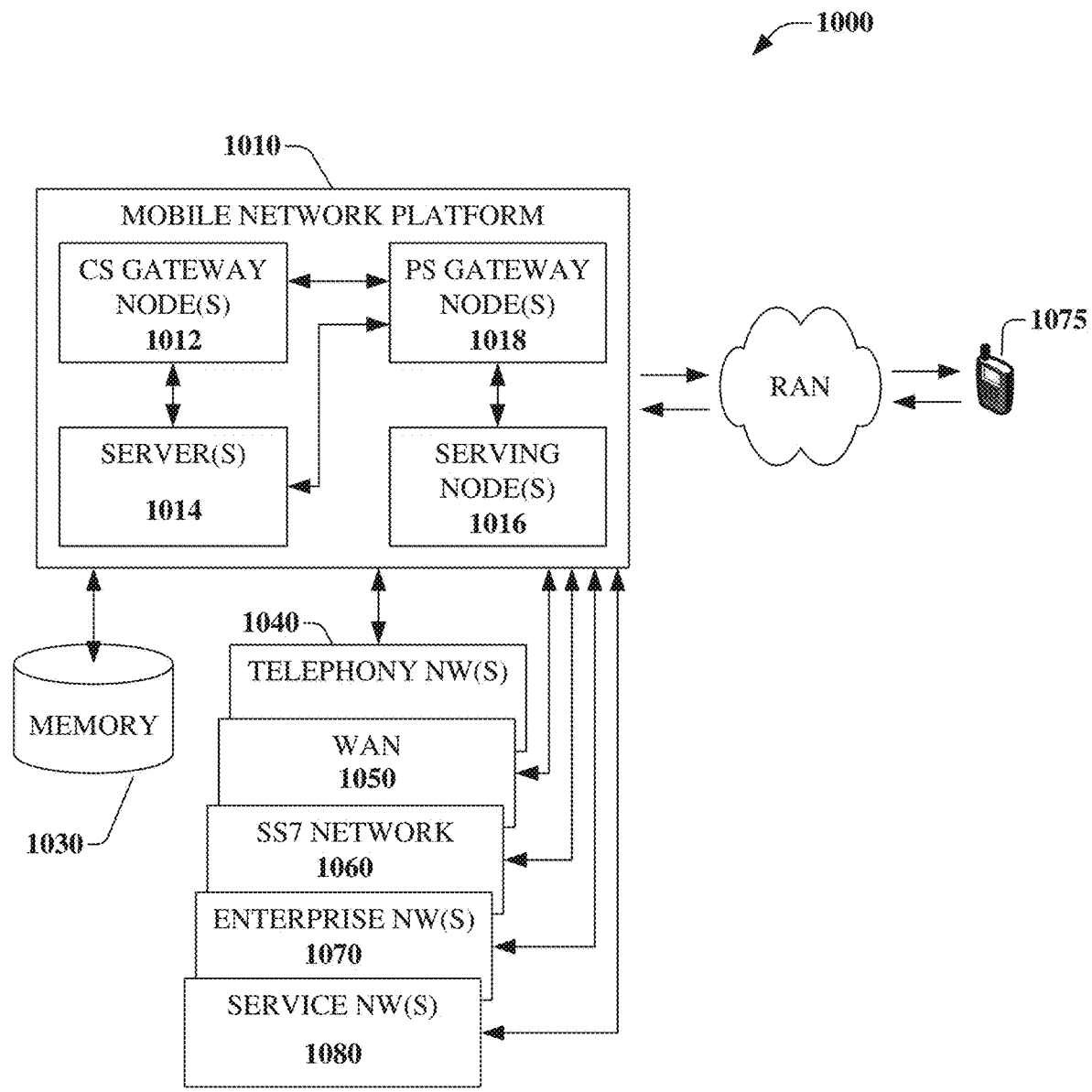
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

Figure 11A:
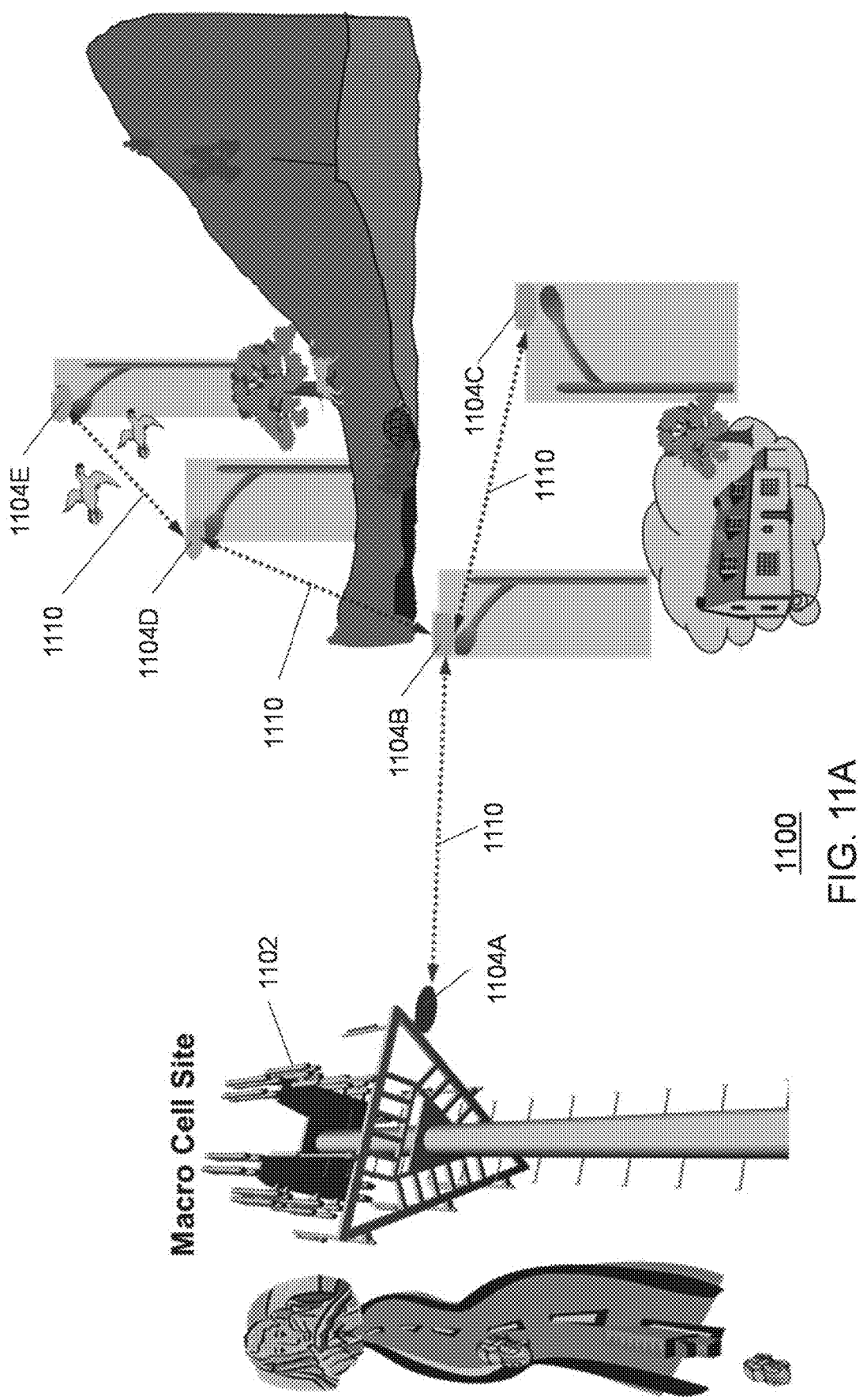
FIG. 11A is a block diagram illustrating an example, non-limiting embodiment of a communication system in accordance with various aspects described herein.

Turning now to FIG. 11A, a block diagram illustrating an example, non-limiting embodiment of a communication system 1100 in accordance with various aspects of the subject disclosure is shown. The communication system 1100 can include a macro base station 1102 such as a base station or access point having antennas that covers one or more sectors (e.g., 6 or more sectors). The macro base station 1102 can be communicatively coupled to a communication node 1104A that serves as a master or distribution node for other communication nodes 1104B-E distributed at differing geographic locations inside or beyond a coverage area of the macro base station 1102. The communication nodes 1104 operate as a distributed antenna system configured to handle communications traffic associated with client devices such as mobile devices (e.g., cell phones) and/or fixed/stationary devices (e.g., a communication device in a residence, or commercial establishment) that are wirelessly coupled to any of the communication nodes 1104. In particular, the wireless resources of the macro base station 1102 can be made available to mobile devices by allowing and/or redirecting certain mobile and/or stationary devices to utilize the wireless resources of a communication node 1104 in a communication range of the mobile or stationary devices.

The communication nodes 1104A-E can be communicatively coupled to each other over an interface 1110. In one embodiment, the interface 1110 can comprise a wired or tethered interface (e.g., fiber optic cable). In other embodiments, the interface 1110 can comprise a wireless RF interface forming a radio distributed antenna system. In various embodiments, the communication nodes 1804A-E can be configured to provide communication services to mobile and stationary devices according to instructions provided by the macro base station 1102. In other examples of operation however, the communication nodes 1104A-E operate merely as analog repeaters to spread the coverage of the macro base station 1102 throughout the entire range of the individual communication nodes 1104A-E.

The micro base stations (depicted as communication nodes 1104) can differ from the macro base station in several ways. For example, the communication range of the micro base stations can be smaller than the communication range of the macro base station. Consequently, the power consumed by the micro base stations can be less than the power consumed by the macro base station. The macro base station optionally directs the micro base stations as to which mobile and/or stationary devices they are to communicate with, and which carrier frequency, spectral segment(s) and/or timeslot schedule of such spectral segment(s) are to be used by the micro base stations when communicating with certain mobile or stationary devices. In these cases, control of the micro base stations by the macro base station can be performed in a master-slave configuration or other suitable control configurations. Whether operating independently or under the control of the macro base station 1102, the resources of the micro base stations can be simpler and less costly than the resources utilized by the macro base station 1102.

Figure 11B:
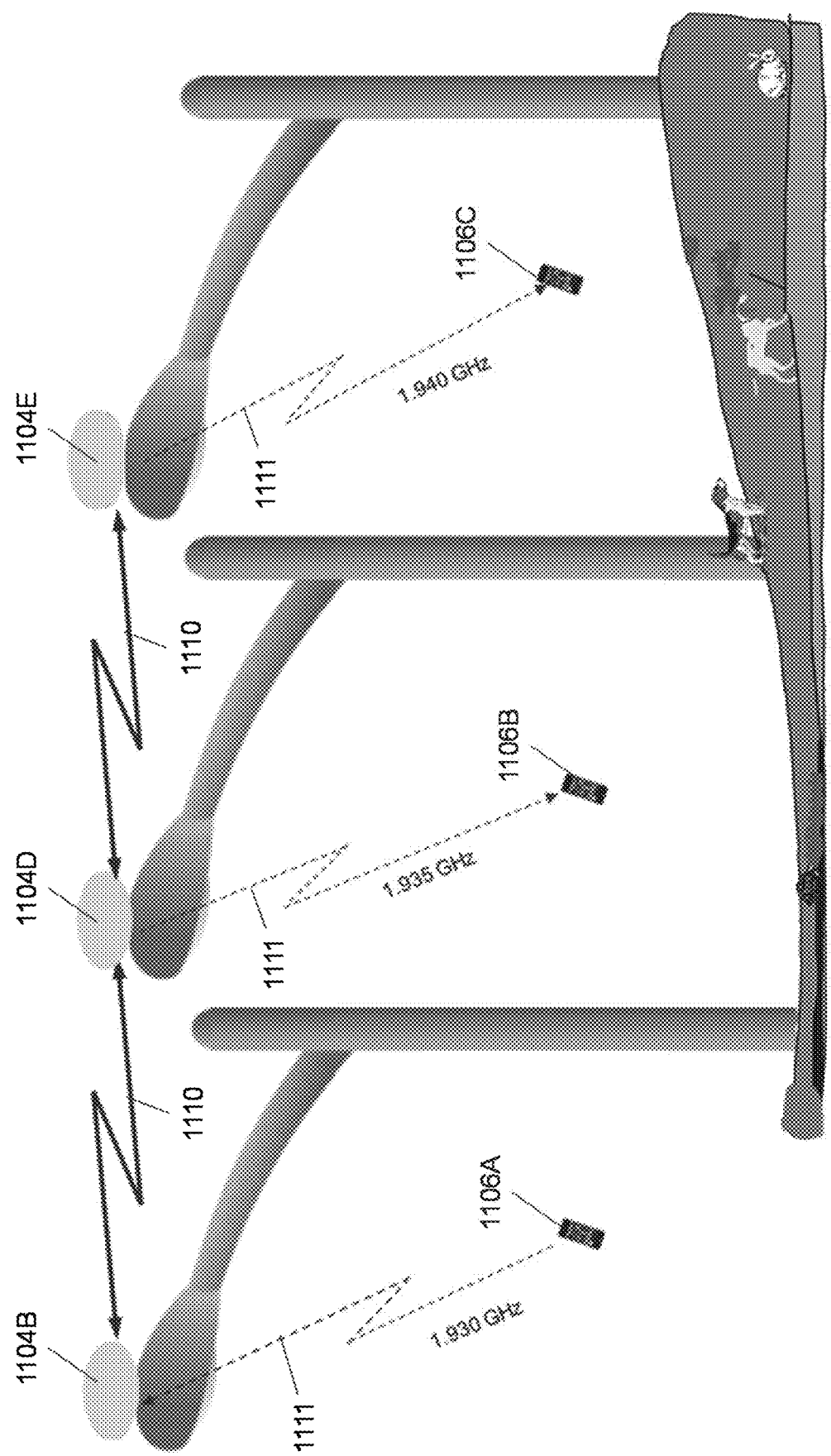
FIG. 11B is a block diagram illustrating an example, non-limiting embodiment of a portion of the communication system of FIG. 11A in accordance with various aspects described herein.

Turning now to FIG. 11B, a block diagram illustrating an example, non-limiting embodiment of the communication nodes 1104B-E of the communication system 1100 of FIG. 11A is shown. In this illustration, the communication nodes 1104B-E are placed on a utility fixture such as a light post. In other embodiments, some of the communication nodes 1104B-E can be placed on a building or a utility post or pole that is used for distributing power and/or communication lines. The communication nodes 1104B-E in these illustrations can be configured to communicate with each other over the interface 1110, which in this illustration is shown as a wireless interface. The communication nodes 1104B-E can also be configured to communicate with mobile or stationary devices 1106A-C over a wireless interface 1111 that conforms to one or more communication protocols (e.g., fourth generation (4G) wireless signals such as LTE signals or other 4G signals, fifth generation (5G) wireless signals, WiMAX, 802.11 signals, ultra-wideband signals, etc.). The communication nodes 1104 can be configured to exchange signals over the interface 1110 at an operating frequency that may be higher (e.g., 28 GHz, 38 GHz, 60 GHz, 80 GHz or higher) than the operating frequency used for communicating with the mobile or stationary devices (e.g., 1.9 GHz) over interface 1111. The high carrier frequency and a wider bandwidth can be used for communicating between the communication nodes 1104 enabling the communication nodes 1104 to provide communication services to multiple mobile or stationary devices via one or more differing frequency bands, (e.g. a 900 MHz band, 1.9 GHz band, a 2.4 GHz band, and/or a 5.8 GHz band, etc.) and/or one or more differing protocols, as will be illustrated by spectral downlink and uplink diagrams of FIG. 12A described below. In other embodiments, particularly where the interface 1110 is implemented via a guided wave communications system on a wire, a wideband spectrum in a lower frequency range (e.g. in the range of 2-6 GHz, 4-10 GHz, etc.) can be employed.

Figure 11C:
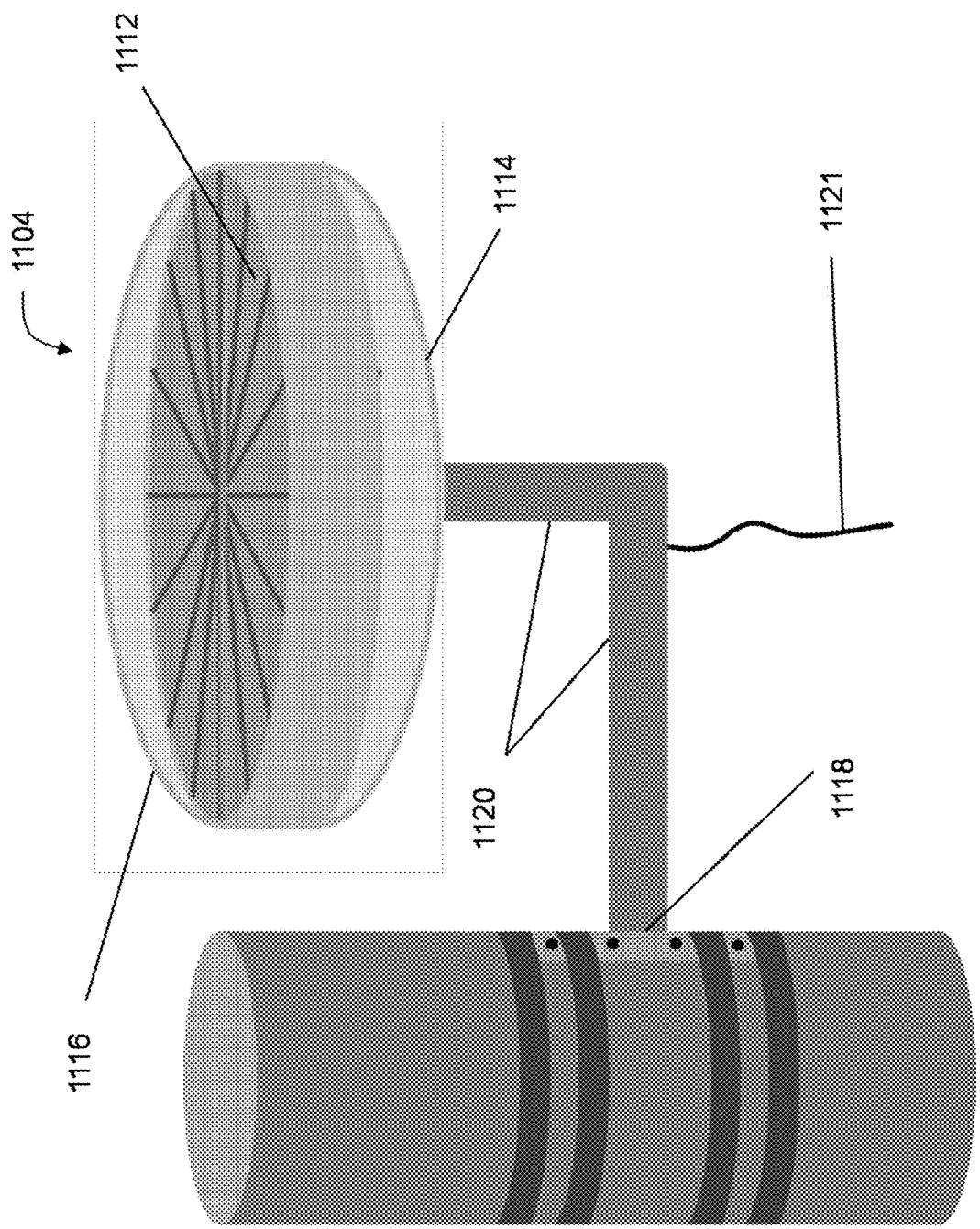
FIGS. 11C and 11D are block diagrams illustrating example, non-limiting embodiments of a communication node of the communication system of FIG. 11A in accordance with various aspects described herein.
Figure 11D:
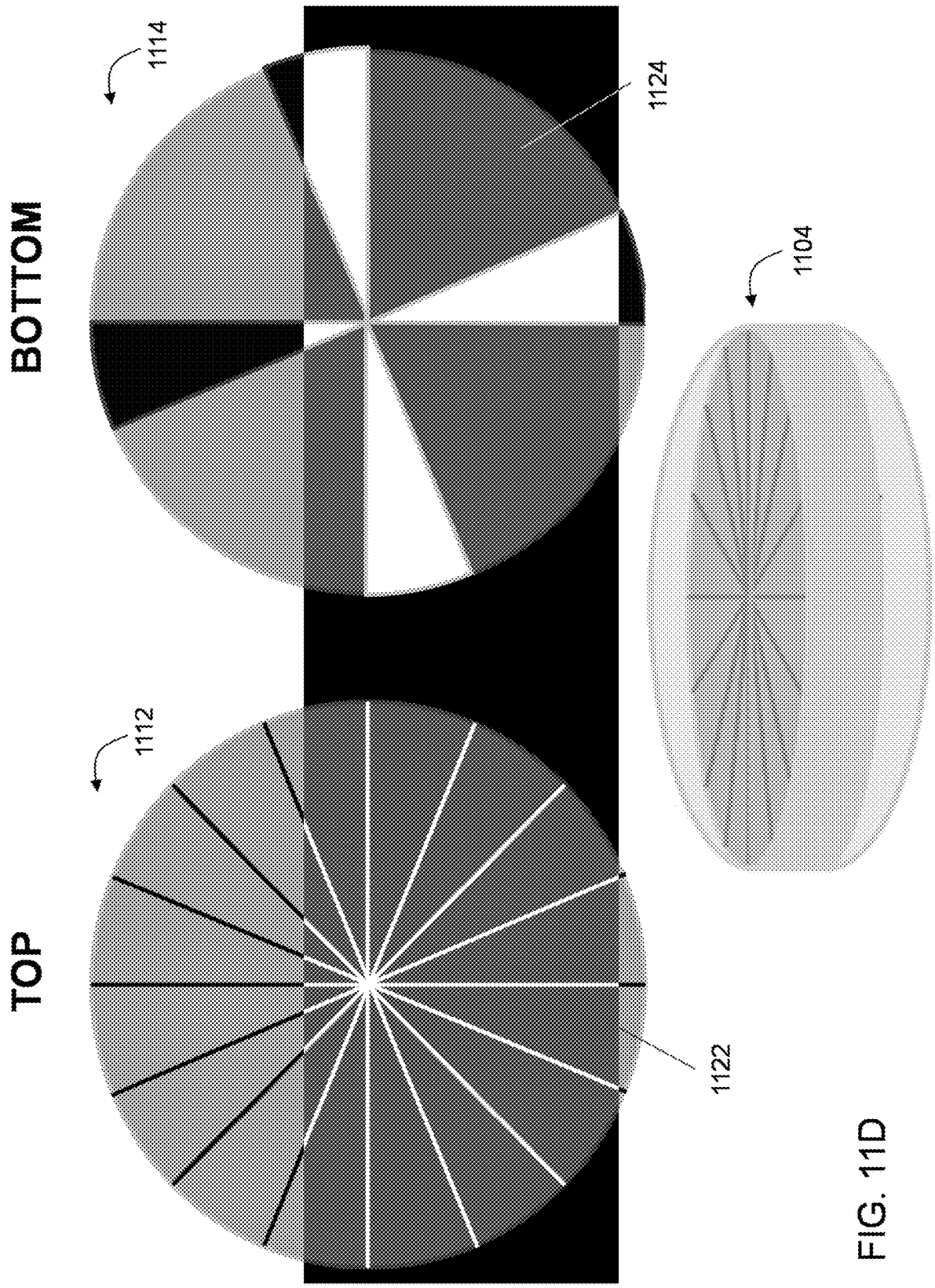

Turning now to FIGS. 11C-11D, block diagrams illustrating example, non-limiting embodiments of a communication node 1104 of the communication system 1100 of FIG. 11A is shown. The communication node 1104 can be attached to a support structure 1118 of a utility fixture such as a utility post or pole as shown in FIG. 11C. The communication node 1104 can be affixed to the support structure 1118 with an arm 1120 constructed of plastic or other suitable material that attaches to an end of the communication node 1104. The communication node 1104 can further include a plastic housing assembly 1116 that covers components of the communication node 1104. The communication node 1104 can be powered by a power line 1121 (e.g., 110/220 VAC). The power line 1121 can originate from a light pole or can be coupled to a power line of a utility pole.

In an embodiment where the communication nodes 1104 communicate wirelessly with other communication nodes 1104 as shown in FIG. 11B, a top side 1112 of the communication node 1104 (illustrated also in FIG. 11D) can comprise a plurality of antennas 1122 (e.g., 16 dielectric antennas devoid of metal surfaces) coupled to one or more transceivers such as, for example, in whole or in part, the transceiver 1100 illustrated in FIG. 11. Each of the plurality of antennas 1122 of the top side 1112 can operate as a sector of the communication node 1104, each sector configured for communicating with at least one communication node 1104 in a communication range of the sector. Alternatively, or in combination, the interface 1110 between communication nodes 1104 can be a tethered interface (e.g., a fiber optic cable, or a power line used for transport of guided electromagnetic waves as previously described). In other embodiments, the interface 1110 can differ between communication nodes 1104. That is, some communications nodes 1104 may communicate over a wireless interface, while others communicate over a tethered interface. In yet other embodiments, some communications nodes 1104 may utilize a combined wireless and tethered interface.

A bottom side 1114 of the communication node 1104 can also comprise a plurality of antennas 1124 for wirelessly communicating with one or more mobile or stationary devices 1106 at a carrier frequency that is suitable for the mobile or stationary devices 1106. As noted earlier, the carrier frequency used by the communication node 1104 for communicating with the mobile or station devices over the wireless interface 1111 shown in FIG. 11B can be different from the carrier frequency used for communicating between the communication nodes 1104 over interface 1110. The plurality of antennas 1124 of the bottom portion 1114 of the communication node 1104 can also utilize a transceiver such as, for example, in whole or in part, the transceiver 1100 illustrated in FIG. 11.

Turning now to FIG. 12A, a block diagram illustrating an example, non-limiting embodiment of downlink and uplink communication techniques for enabling a base station to communicate with the communication nodes 1104 of FIG. 11A is shown. In the illustrations of FIG. 12A, downlink signals (i.e., signals directed from the macro base station 1102 to the communication nodes 1104) can be spectrally divided into control channels 1202, downlink spectral segments 1206 each including modulated signals which can be frequency converted to their original/native frequency band for enabling the communication nodes 1104 to communicate with one or more mobile or stationary devices 1206, and pilot signals 1204 which can be supplied with some or all of the spectral segments 1206 for mitigating distortion created between the communication nodes 1204. The pilot signals 1204 can be processed by the top side 1116 (tethered or wireless) transceivers of downstream communication nodes 1104 to remove distortion from a receive signal (e.g., phase distortion). Each downlink spectral segment 1206 can be allotted a bandwidth 1205 sufficiently wide (e.g., 50 MHz) to include a corresponding pilot signal 1204 and one or more downlink modulated signals located in frequency channels (or frequency slots) in the spectral segment 1206. The modulated signals can represent cellular channels, WLAN channels or other modulated communication signals (e.g., 10-20 MHz), which can be used by the communication nodes 1104 for communicating with one or more mobile or stationary devices 1106.

Uplink modulated signals generated by mobile or stationary communication device in their native/original frequency bands can be frequency converted and thereby located in frequency channels (or frequency slots) in the uplink spectral segment 1210. The uplink modulated signals can represent cellular channels, WLAN channels or other modulated communication signals. Each uplink spectral segment 1210 can be allotted a similar or same bandwidth 1205 to include a pilot signal 1208 which can be provided with some or each spectral segment 1210 to enable upstream communication nodes 1104 and/or the macro base station 1102 to remove distortion (e.g., phase error).

In the embodiment shown, the downlink and uplink spectral segments 1206 and 1210 each comprise a plurality of frequency channels (or frequency slots), which can be occupied with modulated signals that have been frequency converted from any number of native/original frequency bands (e.g. a 900 MHz band, 1.9 GHz band, a 2.4 GHz band, and/or a 5.8 GHz band, etc.). The modulated signals can be up-converted to adjacent frequency channels in downlink and uplink spectral segments 1206 and 1210. In this fashion, while some adjacent frequency channels in a downlink spectral segment 1206 can include modulated signals originally in a same native/original frequency band, other adjacent frequency channels in the downlink spectral segment 1206 can also include modulated signals originally in different native/original frequency bands, but frequency converted to be located in adjacent frequency channels of the downlink spectral segment 1206. For example, a first modulated signal in a 1.9 GHz band and a second modulated signal in the same frequency band (i.e., 1.9 GHz) can be frequency converted and thereby positioned in adjacent frequency channels of a downlink spectral segment 1206. In another illustration, a first modulated signal in a 1.9 GHz band and a second communication signal in a different frequency band (i.e., 2.4 GHz) can be frequency converted and thereby positioned in adjacent frequency channels of a downlink spectral segment 1206. Accordingly, frequency channels of a downlink spectral segment 1206 can be occupied with any combination of modulated signals of the same or differing signaling protocols and of a same or differing native/original frequency bands.

Similarly, while some adjacent frequency channels in an uplink spectral segment 1210 can include modulated signals originally in a same frequency band, adjacent frequency channels in the uplink spectral segment 1210 can also include modulated signals originally in different native/original frequency bands, but frequency converted to be located in adjacent frequency channels of an uplink segment 1210. For example, a first communication signal in a 2.4 GHz band and a second communication signal in the same frequency band (i.e., 2.4 GHz) can be frequency converted and thereby positioned in adjacent frequency channels of an uplink spectral segment 1210. In another illustration, a first communication signal in a 1.9 GHz band and a second communication signal in a different frequency band (i.e., 2.4 GHz) can be frequency converted and thereby positioned in adjacent frequency channels of the uplink spectral segment 1206. Accordingly, frequency channels of an uplink spectral segment 1210 can be occupied with any combination of modulated signals of a same or differing signaling protocols and of a same or differing native/original frequency bands. It should be noted that a downlink spectral segment 1206 and an uplink spectral segment 1210 can themselves be adjacent to one another and separated by only a guard band or otherwise separated by a larger frequency spacing, depending on the spectral allocation in place.

Figure 12B:
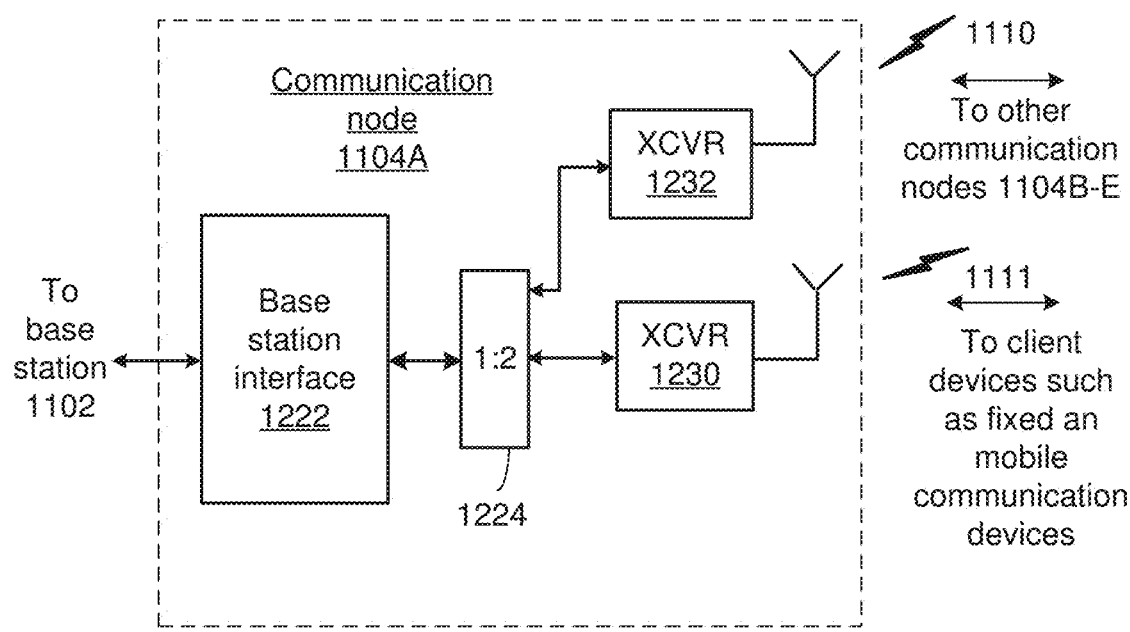
FIG. 12B is a block diagram illustrating an example, non-limiting embodiment of a communication node in accordance with various aspects described herein.

Turning now to FIG. 12B, a block diagram 1220 illustrating an example, non-limiting embodiment of a communication node is shown. In particular, the communication node device such as communication node 1104A of a radio distributed antenna system includes a base station interface 1222, duplexer/diplexer assembly 1224, and two transceivers 1230 and 1232. It should be noted however, that when the communication node 1104A is collocated with a base station, such as a macro base station 1102, the duplexer/diplexer assembly 1224 and the transceiver 1230 can be omitted and the transceiver 1232 can be directly coupled to the base station interface 1222.

In various embodiments, the base station interface 1222 receives a first modulated signal having one or more down link channels in a first spectral segment for transmission to a client device such as one or more mobile communication devices. The first spectral segment represents an original/native frequency band of the first modulated signal. The first modulated signal can include one or more downlink communication channels conforming to a signaling protocol such as a LTE or other 4G wireless protocol, a 5G wireless communication protocol, an ultra-wideband protocol, a WiMAX protocol, a 802.11 or other wireless local area network protocol and/or other communication protocol. The duplexer/diplexer assembly 1224 transfers the first modulated signal in the first spectral segment to the transceiver 1230 for direct communication with one or more mobile communication devices in range of the communication node 1104A as a free space wireless signal. In various embodiments, the transceiver 1230 is implemented via analog circuitry that merely provides: filtration to pass the spectrum of the downlink channels and the uplink channels of modulated signals in their original/native frequency bands while attenuating out-of-band signals, power amplification, transmit/receive switching, duplexing, diplexing, and impedance matching to drive one or more antennas that sends and receives the wireless signals of interface 1110.

In other embodiments, the transceiver 1232 is configured to perform frequency conversion of the first modulated signal in the first spectral segment to the first modulated signal at a first carrier frequency based on, in various embodiments, an analog signal processing of the first modulated signal without modifying the signaling protocol of the first modulated signal. The first modulated signal at the first carrier frequency can occupy one or more frequency channels of a downlink spectral segment 1206. The first carrier frequency can be in a millimeter-wave or microwave frequency band. As used herein analog signal processing includes filtering, switching, duplexing, diplexing, amplification, frequency up and down conversion, and other analog processing that does not require digital signal processing, such as including without limitation either analog to digital conversion, digital to analog conversion, or digital frequency conversion. In other embodiments, the transceiver 1232 can be configured to perform frequency conversion of the first modulated signal in the first spectral segment to the first carrier frequency by applying digital signal processing to the first modulated signal without utilizing any form of analog signal processing and without modifying the signaling protocol of the first modulated signal. In yet other embodiments, the transceiver 1232 can be configured to perform frequency conversion of the first modulated signal in the first spectral segment to the first carrier frequency by applying a combination of digital signal processing and analog processing to the first modulated signal and without modifying the signaling protocol of the first modulated signal.

The transceiver 1232 can be further configured to transmit one or more control channels, one or more corresponding reference signals, such as pilot signals or other reference signals, and/or one or more clock signals together with the first modulated signal at the first carrier frequency to a network element of the distributed antenna system, such as one or more downstream communication nodes 1104B-E, for wireless distribution of the first modulated signal to one or more other mobile communication devices once frequency converted by the network element to the first spectral segment. In particular, the reference signal enables the network element to reduce a phase error (and/or other forms of signal distortion) during processing of the first modulated signal from the first carrier frequency to the first spectral segment. The control channel can include instructions to direct the communication node of the distributed antenna system to convert the first modulated signal at the first carrier frequency to the first modulated signal in the first spectral segment, to control frequency selections and reuse patterns, handoff and/or other control signaling. In embodiments where the instructions transmitted and received via the control channel are digital signals, the transceiver can 1232 can include a digital signal processing component that provides analog to digital conversion, digital to analog conversion and that processes the digital data sent and/or received via the control channel. The clock signals supplied with the downlink spectral segment 1206 can be utilized to synchronize timing of digital control channel processing by the downstream communication nodes 1104B-E to recover the instructions from the control channel and/or to provide other timing signals.

In various embodiments, the transceiver 1232 can receive a second modulated signal at a second carrier frequency from a network element such as a communication node 1104B-E. The second modulated signal can include one or more uplink frequency channels occupied by one or more modulated signals conforming to a signaling protocol such as a LTE or other 4G wireless protocol, a 5G wireless communication protocol, an ultra-wideband protocol, a 802.11 or other wireless local area network protocol and/or other communication protocol. In particular, the mobile or stationary communication device generates the second modulated signal in a second spectral segment such as an original/native frequency band and the network element frequency converts the second modulated signal in the second spectral segment to the second modulated signal at the second carrier frequency and transmits the second modulated signal at the second carrier frequency as received by the communication node 1104A. The transceiver 1232 operates to convert the second modulated signal at the second carrier frequency to the second modulated signal in the second spectral segment and sends the second modulated signal in the second spectral segment, via the duplexer/diplexer assembly 1224 and base station interface 1222, to a base station, such as macro base station 1102, for processing.

Consider the following examples where the communication node 1104A is implemented in a distributed antenna system. The uplink frequency channels in an uplink spectral segment 1210 and downlink frequency channels in a downlink spectral segment 1206 can be occupied with signals modulated and otherwise formatted in accordance with a DOCSIS 2.0 or higher standard protocol, a WiMAX standard protocol, an ultra-wideband protocol, a 802.11 standard protocol, a 4G or 5G voice and data protocol such as an LTE protocol and/or other standard communication protocol. In addition to protocols that conform with current standards, any of these protocols can be modified to operate in conjunction with the system of FIG. 11A. For example, a 802.11 protocol or other protocol can be modified to include additional guidelines and/or a separate data channel to provide collision detection/multiple access over a wider area (e.g. allowing network elements or communication devices communicatively coupled to the network elements that are communicating via a particular frequency channel of a downlink spectral segment 1206 or uplink spectral segment 1210 to hear one another). In various embodiments all of the uplink frequency channels of the uplink spectral segment 1210 and downlink frequency channel of the downlink spectral segment 1206 can all be formatted in accordance with the same communications protocol. In the alternative however, two or more differing protocols can be employed on both the uplink spectral segment 1210 and the downlink spectral segment 1206 to, for example, be compatible with a wider range of client devices and/or operate in different frequency bands.

When two or more differing protocols are employed, a first subset of the downlink frequency channels of the downlink spectral segment 1206 can be modulated in accordance with a first standard protocol and a second subset of the downlink frequency channels of the downlink spectral segment 1206 can be modulated in accordance with a second standard protocol that differs from the first standard protocol. Likewise a first subset of the uplink frequency channels of the uplink spectral segment 1210 can be received by the system for demodulation in accordance with the first standard protocol and a second subset of the uplink frequency channels of the uplink spectral segment 1210 can be received in accordance with a second standard protocol for demodulation in accordance with the second standard protocol that differs from the first standard protocol.

In accordance with these examples, the base station interface 1222 can be configured to receive modulated signals such as one or more downlink channels in their original/native frequency bands from a base station such as macro base station 1102 or other communications network element. Similarly, the base station interface 1222 can be configured to supply to a base station modulated signals received from another network element that is frequency converted to modulated signals having one or more uplink channels in their original/native frequency bands. The base station interface 1222 can be implemented via a wired or wireless interface that bidirectionally communicates communication signals such as uplink and downlink channels in their original/native frequency bands, communication control signals and other network signaling with a macro base station or other network element. The duplexer/diplexer assembly 1224 is configured to transfer the downlink channels in their original/native frequency bands to the transceiver 1232 which frequency converts the frequency of the downlink channels from their original/native frequency bands into the frequency spectrum of interface 1110—in this case a wireless communication link used to transport the communication signals downstream to one or more other communication nodes 1104B-E of the distributed antenna system in range of the communication device 1104A.

In various embodiments, the transceiver 1232 includes an analog radio that frequency converts the downlink channel signals in their original/native frequency bands via mixing or other heterodyne action to generate frequency converted downlink channels signals that occupy downlink frequency channels of the downlink spectral segment 1206. In this illustration, the downlink spectral segment 1206 is within the downlink frequency band of the interface 1110. In an embodiment, the downlink channel signals are up-converted from their original/native frequency bands to a 28 GHz, 38 GHz, 60 GHz, 70 GHz or 80 GHz band of the downlink spectral segment 1206 for line-of-sight wireless communications to one or more other communication nodes 1104B-E. It is noted, however, that other frequency bands can likewise be employed for a downlink spectral segment 1206 (e.g., 3 GHz to 5 GHz). For example, the transceiver 1232 can be configured for down-conversion of one or more downlink channel signals in their original/native spectral bands in instances where the frequency band of the interface 1110 falls below the original/native spectral bands of the one or more downlink channels signals.

The transceiver 1232 can be coupled to multiple individual antennas, such as antennas 1122 presented in conjunction with FIG. 11D, for communicating with the communication nodes 1104B, a phased antenna array or steerable beam or multi-beam antenna system for communicating with multiple devices at different locations. The duplexer/diplexer assembly 1224 can include a duplexer, triplexer, splitter, switch, router and/or other assembly that operates as a "channel duplexer" to provide bi-directional communications over multiple communication paths via one or more original/native spectral segments of the uplink and downlink channels.

In addition to forwarding frequency converted modulated signals downstream to other communication nodes 1104B-E at a carrier frequency that differs from their original/native spectral bands, the communication node 1104A can also communicate all or a selected portion of the modulated signals unmodified from their original/native spectral bands to client devices in a wireless communication range of the communication node 1104A via the wireless interface 1111. The duplexer/diplexer assembly 1224 transfers the modulated signals in their original/native spectral bands to the transceiver 1230. The transceiver 1230 can include a channel selection filter for selecting one or more downlink channels and a power amplifier coupled to one or more antennas, such as antennas 1124 presented in conjunction with FIG. 11D, for transmission of the downlink channels via wireless interface 1111 to mobile or fixed wireless devices.

In addition to downlink communications destined for client devices, communication node 1104A can operate in a reciprocal fashion to handle uplink communications originating from client devices as well. In operation, the transceiver 1232 receives uplink channels in the uplink spectral segment 1210 from communication nodes 1104B-E via the uplink spectrum of interface 1110. The uplink frequency channels in the uplink spectral segment 1210 include modulated signals that were frequency converted by communication nodes 1104B-E from their original/native spectral bands to the uplink frequency channels of the uplink spectral segment 1210. In situations where the interface 1110 operates in a higher frequency band than the native/original spectral segments of the modulated signals supplied by the client devices, the transceiver 1232 down-converts the up-converted modulated signals to their original frequency bands. In situations, however, where the interface 1110 operates in a lower frequency band than the native/original spectral segments of the modulated signals supplied by the client devices, the transceiver 1232 up-converts the down-converted modulated signals to their original frequency bands. Further, the transceiver 1230 operates to receive all or selected ones of the modulated signals in their original/native frequency bands from client devices via the wireless interface 1111. The duplexer/diplexer assembly 1224 transfers the modulated signals in their original/native frequency bands received via the transceiver 1230 to the base station interface 1222 to be sent to the macro base station 1102 or other network element of a communications network. Similarly, modulated signals occupying uplink frequency channels in an uplink spectral segment 1210 that are frequency converted to their original/native frequency bands by the transceiver 1232 are supplied to the duplexer/diplexer assembly 1224 for transfer to the base station interface 1222 to be sent to the macro base station 1102 or other network element of a communications network.

Figure 12C:
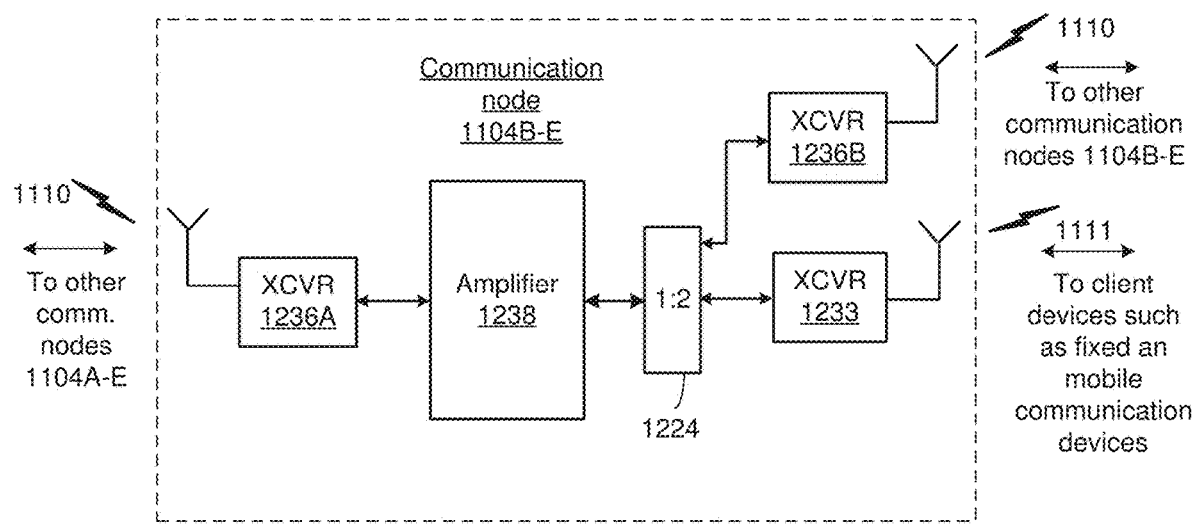
FIG. 12C is a block diagram illustrating an example, non-limiting embodiment of a communication node in accordance with various aspects described herein.

Turning now to FIG. 12C, a block diagram 1235 illustrating an example, non-limiting embodiment of a communication node is shown. In particular, the communication node device such as communication node 1104B, 1104C, 1104D or 1104E of a radio distributed antenna system includes transceiver 1233, duplexer/diplexer assembly 1224, an amplifier 1238 and two transceivers 1236A and 1236B.

In various embodiments, the transceiver 1236A receives, from a communication node 1104A or an upstream communication node 1104B-E, a first modulated signal at a first carrier frequency corresponding to the placement of the channels of the first modulated signal in the converted spectrum of the distributed antenna system (e.g., frequency channels of one or more downlink spectral segments 1206). The first modulated signal includes first communications data provided by a base station and directed to a mobile communication device. The transceiver 1236A is further configured to receive, from a communication node 1104A one or more control channels and one or more corresponding reference signals, such as pilot signals or other reference signals, and/or one or more clock signals associated with the first modulated signal at the first carrier frequency. The first modulated signal can include one or more downlink communication channels conforming to a signaling protocol such as a LTE or other 4G wireless protocol, a 5G wireless communication protocol, an ultra-wideband protocol, a WiMAX protocol, a 802.11 or other wireless local area network protocol and/or other communication protocol.

As previously discussed, the reference signal enables the network element to reduce a phase error (and/or other forms of signal distortion) during processing of the first modulated signal from the first carrier frequency to the first spectral segment (i.e., original/native spectrum). The control channel includes instructions to direct the communication node of the distributed antenna system to convert the first modulated signal at the first carrier frequency to the first modulated signal in the first spectral segment, to control frequency selections and reuse patterns, handoff and/or other control signaling. The clock signals can synchronize timing of digital control channel processing by the downstream communication nodes 1104B-E to recover the instructions from the control channel and/or to provide other timing signals.

The amplifier 1238 can be a bidirectional amplifier that amplifies the first modulated signal at the first carrier frequency together with the reference signals, control channels and/or clock signals for coupling via the duplexer/diplexer assembly 1224 to transceiver 1236B, which in this illustration, serves as a repeater for retransmission of the amplified first modulated signal at the first carrier frequency together with the reference signals, control channels and/or clock signals to one or more others of the communication nodes 1104B-E that are downstream from the communication node 1104B-E that is shown and that operate in a similar fashion.

The amplified first modulated signal at the first carrier frequency together with the reference signals, control channels and/or clock signals are also coupled via the duplexer/diplexer assembly 1224 to the transceiver 1233. The transceiver 1233 performs digital signal processing on the control channel to recover the instructions, such as in the form of digital data, from the control channel. The clock signal is used to synchronize timing of the digital control channel processing. The transceiver 1233 then performs frequency conversion of the first modulated signal at the first carrier frequency to the first modulated signal in the first spectral segment in accordance with the instructions and based on an analog (and/or digital) signal processing of the first modulated signal and utilizing the reference signal to reduce distortion during the converting process. The transceiver 1233 wirelessly transmits the first modulated signal in the first spectral segment for direct communication with one or more mobile communication devices in range of the communication node 1104B-E as free space wireless signals.

In various embodiments, the transceiver 1236B receives a second modulated signal at a second carrier frequency in an uplink spectral segment 1210 from other network elements such as one or more other communication nodes 1104B-E that are downstream from the communication node 1104B-E that is shown. The second modulated signal can include one or more uplink communication channels conforming to a signaling protocol such as a LTE or other 4G wireless protocol, a 5G wireless communication protocol, an ultra-wideband protocol, a 802.11 or other wireless local area network protocol and/or other communication protocol. In particular, one or more mobile communication devices generate the second modulated signal in a second spectral segment such as an original/native frequency band and the downstream network element performs frequency conversion on the second modulated signal in the second spectral segment to the second modulated signal at the second carrier frequency and transmits the second modulated signal at the second carrier frequency in an uplink spectral segment 1210 as received by the communication node 1104B-E shown. The transceiver 1236B operates to send the second modulated signal at the second carrier frequency to amplifier 1238, via the duplexer/diplexer assembly 1224, for amplification and retransmission via the transceiver 1236A back to the communication node 1104A or upstream communication nodes 1104B-E for further retransmission back to a base station, such as macro base station 1102, for processing.

The transceiver 1233 may also receive a second modulated signal in the second spectral segment from one or more mobile communication devices in range of the communication node 1104B-E. The transceiver 1233 operates to perform frequency conversion on the second modulated signal in the second spectral segment to the second modulated signal at the second carrier frequency, for example, under control of the instructions received via the control channel, inserts the reference signals, control channels and/or clock signals for use by communication node 1104A in reconverting the second modulated signal back to the original/native spectral segments and sends the second modulated signal at the second carrier frequency, via the duplexer/diplexer assembly 1224 and amplifier 1238, to the transceiver 1236A for amplification and retransmission back to the communication node 1104A or upstream communication nodes 1104B-E for further retransmission back to a base station, such as macro base station 1102, for processing.

Figure 12D:
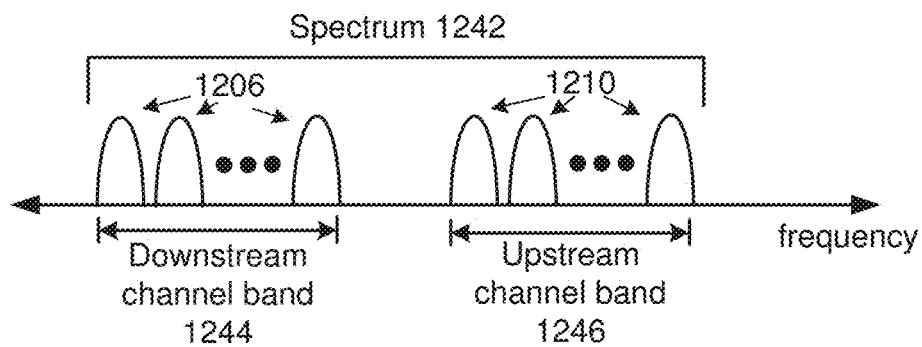
FIG. 12D is a graphical diagram illustrating an example, non-limiting embodiment of a frequency spectrum in accordance with various aspects described herein.

Turning now to FIG. 12D, a graphical diagram 1240 illustrating an example, non-limiting embodiment of a frequency spectrum is shown. In particular, a spectrum 1242 is shown for a distributed antenna system that conveys modulated signals that occupy frequency channels of a downlink segment 1206 or uplink spectral segment 1210 after they have been converted in frequency (e.g. via up-conversion or down-conversion) from one or more original/native spectral segments into the spectrum 1242.

In the example presented, the downstream (downlink) channel band 1244 includes a plurality of downstream frequency channels represented by separate downlink spectral segments 1206. Likewise the upstream (uplink) channel band 1246 includes a plurality of upstream frequency channels represented by separate uplink spectral segments 1210. The spectral shapes of the separate spectral segments are meant to be placeholders for the frequency allocation of each modulated signal along with associated reference signals, control channels and clock signals. The actual spectral response of each frequency channel in a downlink spectral segment 1206 or uplink spectral segment 1210 will vary based on the protocol and modulation employed and further as a function of time.

The number of the uplink spectral segments 1210 can be less than or greater than the number of the downlink spectral segments 1206 in accordance with an asymmetrical communication system. In this case, the upstream channel band 1246 can be narrower or wider than the downstream channel band 1244. In the alternative, the number of the uplink spectral segments 1210 can be equal to the number of the downlink spectral segments 1206 in the case where a symmetrical communication system is implemented. In this case, the width of the upstream channel band 1246 can be equal to the width of the downstream channel band 1244 and bit stuffing or other data filling techniques can be employed to compensate for variations in upstream traffic. While the downstream channel band 1244 is shown at a lower frequency than the upstream channel band 1246, in other embodiments, the downstream channel band 1144 can be at a higher frequency than the upstream channel band 1246. In addition, the number of spectral segments and their respective frequency positions in spectrum 1242 can change dynamically over time. For example, a general control channel can be provided in the spectrum 1242 (not shown) which can indicate to communication nodes 1104 the frequency position of each downlink spectral segment 1206 and each uplink spectral segment 1210. Depending on traffic conditions, or network requirements necessitating a reallocation of bandwidth, the number of downlink spectral segments 1206 and uplink spectral segments 1210 can be changed by way of the general control channel. Additionally, the downlink spectral segments 1206 and uplink spectral segments 1210 do not have to be grouped separately. For instance, a general control channel can identify a downlink spectral segment 1206 being followed by an uplink spectral segment 1210 in an alternating fashion, or in any other combination which may or may not be symmetric. It is further noted that instead of utilizing a general control channel, multiple control channels can be used, each identifying the frequency position of one or more spectral segments and the type of spectral segment (i.e., uplink or downlink).

Further, while the downstream channel band 1244 and upstream channel band 1246 are shown as occupying a single contiguous frequency band, in other embodiments, two or more upstream and/or two or more downstream channel bands can be employed, depending on available spectrum and/or the communication standards employed. Frequency channels of the uplink spectral segments 1210 and downlink spectral segments 1206 can be occupied by frequency converted signals modulated formatted in accordance with a DOCSIS 2.0 or higher standard protocol, a WiMAX standard protocol, an ultra-wideband protocol, a 802.11 standard protocol, a 4G or 5G voice and data protocol such as an LTE protocol and/or other standard communication protocol. In addition to protocols that conform with current standards, any of these protocols can be modified to operate in conjunction with the system shown. For example, a 802.11 protocol or other protocol can be modified to include additional guidelines and/or a separate data channel to provide collision detection/multiple access over a wider area (e.g. allowing devices that are communicating via a particular frequency channel to hear one another). In various embodiments all of the uplink frequency channels of the uplink spectral segments 1210 and downlink frequency channel of the downlink spectral segments 1206 are all formatted in accordance with the same communications protocol. In the alternative however, two or more differing protocols can be employed on both the uplink frequency channels of one or more uplink spectral segments 1210 and downlink frequency channels of one or more downlink spectral segments 1206 to, for example, be compatible with a wider range of client devices and/or operate in different frequency bands.

It should be noted that, the modulated signals can be gathered from differing original/native spectral segments for aggregation into the spectrum 1242. In this fashion, a first portion of uplink frequency channels of an uplink spectral segment 1210 may be adjacent to a second portion of uplink frequency channels of the uplink spectral segment 1210 that have been frequency converted from one or more differing original/native spectral segments. Similarly, a first portion of downlink frequency channels of a downlink spectral segment 1206 may be adjacent to a second portion of downlink frequency channels of the downlink spectral segment 1206 that have been frequency converted from one or more differing original/native spectral segments. For example, one or more 2.4 GHz 802.11 channels that have been frequency converted may be adjacent to one or more 5.8 GHz 802.11 channels that have also been frequency converted to a spectrum 1242 that is centered at 80 GHz. It should be noted that each spectral segment can have an associated reference signal such as a pilot signal that can be used in generating a local oscillator signal at a frequency and phase that provides the frequency conversion of one or more frequency channels of that spectral segment from its placement in the spectrum 1242 back into it original/native spectral segment.

Figure 12E:
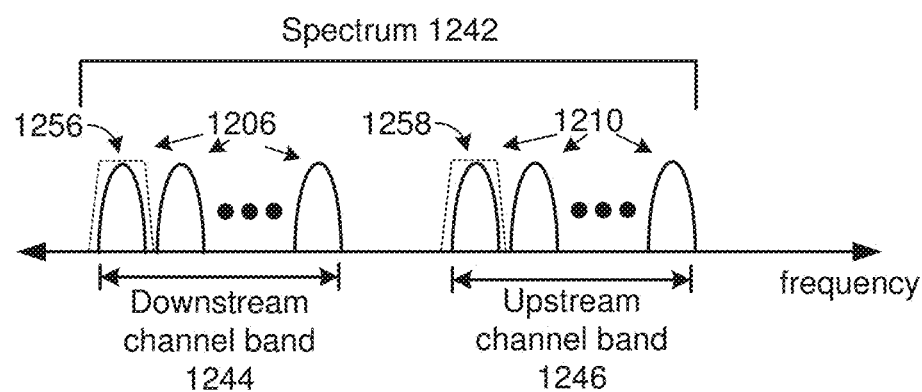
FIG. 12E is a graphical diagram illustrating an example, non-limiting embodiment of a frequency spectrum in accordance with various aspects described herein.

Turning now to FIG. 12E, a graphical diagram 1250 illustrating an example, non-limiting embodiment of a frequency spectrum is shown. In particular a spectral segment selection is presented as discussed in conjunction with signal processing performed on the selected spectral segment by transceivers 1230 of communication node 1140A or transceiver 1232 of communication node 1104B-E. As shown, a particular uplink frequency portion 1258 including one of the uplink spectral segments 1210 of uplink frequency channel band 1246 and a particular downlink frequency portion 1256 including one of the downlink spectral segments 1206 of downlink channel frequency band 1244 is selected to be passed by channel selection filtration, with the remaining portions of uplink frequency channel band 1246 and downlink channel frequency band 1244 being filtered out—i.e. attenuated so as to mitigate adverse effects of the processing of the desired frequency channels that are passed by the transceiver. It should be noted that while a single particular uplink spectral segment 1210 and a particular downlink spectral segment 1206 are shown as being selected, two or more uplink and/or downlink spectral segments may be passed in other embodiments.

While the transceivers 1230 and 1232 can operate based on static channel filters with the uplink and downlink frequency portions 1258 and 1256 being fixed, as previously discussed, instructions sent to the transceivers 1230 and 1232 via the control channel can be used to dynamically configure the transceivers 1230 and 1232 to a particular frequency selection. In this fashion, upstream and downstream frequency channels of corresponding spectral segments can be dynamically allocated to various communication nodes by the macro base station 1102 or other network element of a communication network to optimize performance by the distributed antenna system.

Figure 12F:
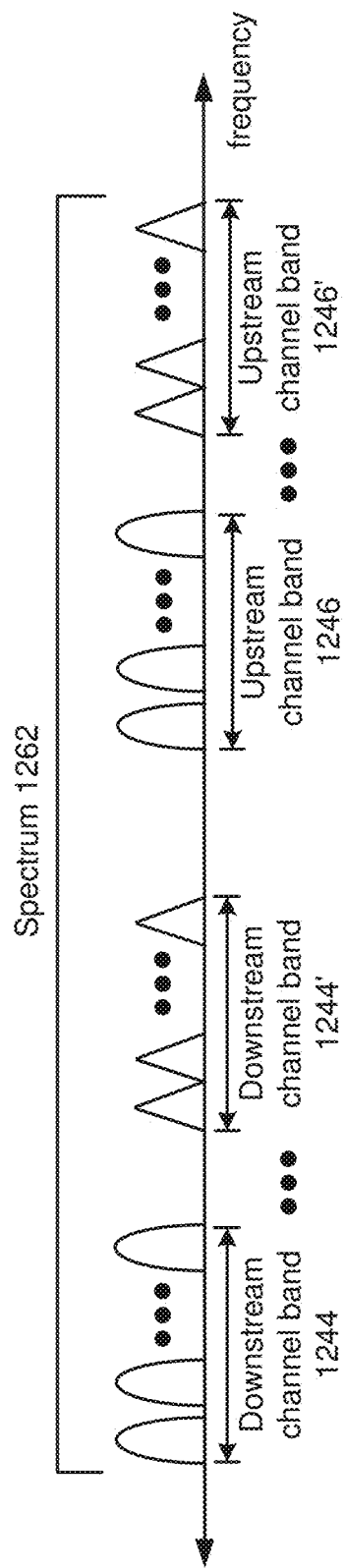
FIG. 12F is a graphical diagram illustrating an example, non-limiting embodiment of a frequency spectrum in accordance with various aspects described herein.

Turning now to FIG. 12F, a graphical diagram 1260 illustrating an example, non-limiting embodiment of a frequency spectrum is shown. In particular, a spectrum 1262 is shown for a distributed antenna system that conveys modulated signals occupying frequency channels of uplink or downlink spectral segments after they have been converted in frequency (e.g. via up-conversion or down-conversion) from one or more original/native spectral segments into the spectrum 1262.

As previously discussed two or more different communication protocols can be employed to communicate upstream and downstream data. When two or more differing protocols are employed, a first subset of the downlink frequency channels of a downlink spectral segment 1206 can be occupied by frequency converted modulated signals in accordance with a first standard protocol and a second subset of the downlink frequency channels of the same or a different downlink spectral segment 1210 can be occupied by frequency converted modulated signals in accordance with a second standard protocol that differs from the first standard protocol. Likewise a first subset of the uplink frequency channels of an uplink spectral segment 1210 can be received by the system for demodulation in accordance with the first standard protocol and a second subset of the uplink frequency channels of the same or a different uplink spectral segment 1210 can be received in accordance with a second standard protocol for demodulation in accordance with the second standard protocol that differs from the first standard protocol.

In the example shown, the downstream channel band 1244 includes a first plurality of downstream spectral segments represented by separate spectral shapes of a first type representing the use of a first communication protocol. The downstream channel band 1244' includes a second plurality of downstream spectral segments represented by separate spectral shapes of a second type representing the use of a second communication protocol. Likewise the upstream channel band 1246 includes a first plurality of upstream spectral segments represented by separate spectral shapes of the first type representing the use of the first communication protocol. The upstream channel band 1246' includes a second plurality of upstream spectral segments represented by separate spectral shapes of the second type representing the use of the second communication protocol. These separate spectral shapes are meant to be placeholders for the frequency allocation of each individual spectral segment along with associated reference signals, control channels and/or clock signals. While the individual channel bandwidth is shown as being roughly the same for channels of the first and second type, it should be noted that upstream and downstream channel bands 1244, 1244', 1246 and 1246' may be of differing bandwidths. Additionally, the spectral segments in these channel bands of the first and second type may be of differing bandwidths, depending on available spectrum and/or the communication standards employed.

Figure 12G:
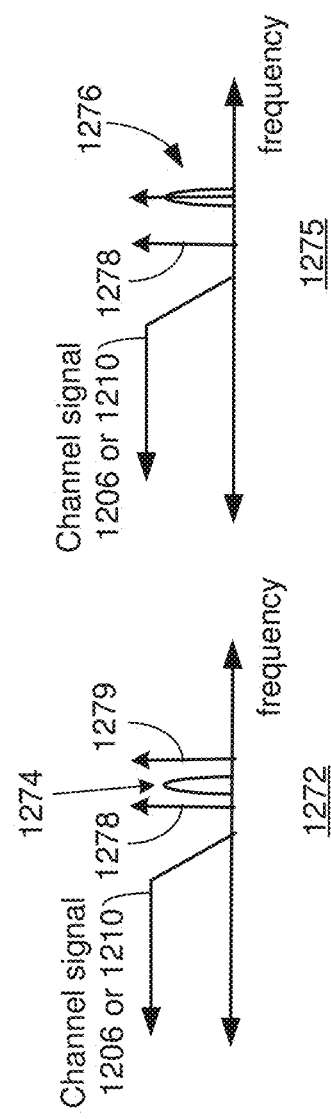
FIG. 12G is a graphical diagram illustrating an example, non-limiting embodiment of a frequency spectrum in accordance with various aspects described herein.

Turning now to FIG. 12G, a graphical diagram 1270 illustrating an example, non-limiting embodiment of a frequency spectrum is shown. In particular a portion of the spectrum 1242 or 1262 of FIGS. 12D-12F is shown for a distributed antenna system that conveys modulated signals in the form of channel signals that have been converted in frequency (e.g. via up-conversion or down-conversion) from one or more original/native spectral segments.

The portion 1272 includes a portion of a downlink or uplink spectral segment 1206 and 1210 that is represented by a spectral shape and that represents a portion of the bandwidth set aside for a control channel, reference signal, and/or clock signal. The spectral shape 1274, for example, represents a control channel that is separate from reference signal 1279 and a clock signal 1278. It should be noted that the clock signal 1278 is shown with a spectral shape representing a sinusoidal signal that may require conditioning into the form of a more traditional clock signal. In other embodiments however, a traditional clock signal could be sent as a modulated carrier wave such by modulating the reference signal 1279 via amplitude modulation or other modulation technique that preserves the phase of the carrier for use as a phase reference. In other embodiments, the clock signal could be transmitted by modulating another carrier wave or as another signal. Further, it is noted that both the clock signal 1278 and the reference signal 1279 are shown as being outside the frequency band of the control channel 1274.

In another example, the portion 1275 includes a portion of a downlink or uplink spectral segment 1206 and 1210 that is represented by a portion of a spectral shape that represents a portion of the bandwidth set aside for a control channel, reference signal, and/or clock signal. The spectral shape 1276 represents a control channel having instructions that include digital data that modulates the reference signal, via amplitude modulation, amplitude shift keying or other modulation technique that preserves the phase of the carrier for use as a phase reference. The clock signal 1278 is shown as being outside the frequency band of the spectral shape 1276. The reference signal, being modulated by the control channel instructions, is in effect a subcarrier of the control channel and is in-band to the control channel. Again, the clock signal 1278 is shown with a spectral shape representing a sinusoidal signal, in other embodiments however, a traditional clock signal could be sent as a modulated carrier wave or other signal. In this case, the instructions of the control channel can be used to modulate the clock signal 1278 instead of the reference signal.

Consider the following example, where the control channel 1276 is carried via modulation of a reference signal in the form of a continuous wave (CW) from which the phase distortion in the receiver is corrected during frequency conversion of the downlink or uplink spectral segment back to its original/native spectral segment. The control channel 1276 can be modulated with a robust modulation such as pulse amplitude modulation, binary phase shift keying, amplitude shift keying or other modulation scheme to carry instructions between network elements of the distributed antenna system such as network operations, administration and management traffic and other control data. In various embodiments, the control data can include:

Status information that indicates online status, offline status, and network performance parameters of each network element.

Network device information such as module names and addresses, hardware and software versions, device capabilities, etc.

Spectral information such as frequency conversion factors, channel spacing, guard bands, uplink/downlink allocations, uplink and downlink channel selections, etc.

Environmental measurements such as weather conditions, image data, power outage information, line of sight blockages, etc.

In a further example, the control channel data can be sent via ultra-wideband (UWB) signaling. The control channel data can be transmitted by generating radio energy at specific time intervals and occupying a larger bandwidth, via pulse-position or time modulation, by encoding the polarity or amplitude of the UWB pulses and/or by using orthogonal pulses. In particular, UWB pulses can be sent sporadically at relatively low pulse rates to support time or position modulation, but can also be sent at rates up to the inverse of the UWB pulse bandwidth. In this fashion, the control channel can be spread over an UWB spectrum with relatively low power, and without interfering with CW transmissions of the reference signal and/or clock signal that may occupy in-band portions of the UWB spectrum of the control channel.

Figure 12H:
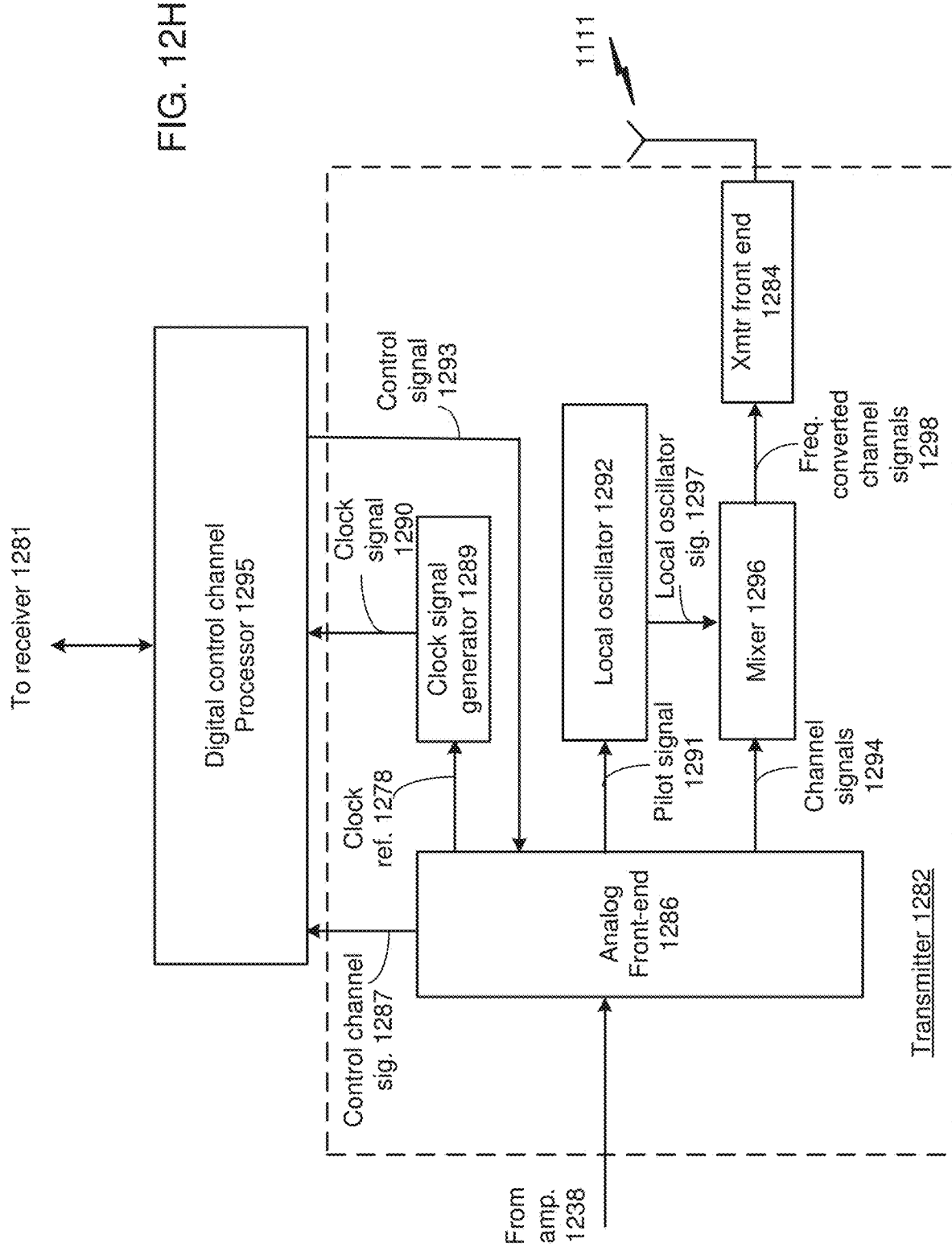
FIG. 12H is a block diagram illustrating an example, non-limiting embodiment of a transmitter in accordance with various aspects described herein.

Turning now to FIG. 12H, a block diagram 1280 illustrating an example, non-limiting embodiment of a transmitter is shown. In particular, a transmitter 1282 is shown for use with, for example, a receiver 1281 and a digital control channel processor 1295 in a transceiver, such as transceiver 1233 presented in conjunction with FIG. 12C. As shown, the transmitter 1282 includes an analog front-end 1286, clock signal generator 1289, a local oscillator 1292, a mixer 1296, and a transmitter front end 1284.

The amplified first modulated signal at the first carrier frequency together with the reference signals, control channels and/or clock signals are coupled from the amplifier 1238 to the analog front-end 1286. The analog front end 1286 includes one or more filters or other frequency selection to separate the control channel signal 1287, a clock reference signal 1278, a pilot signal 1291 and one or more selected channels signals 1294.

The digital control channel processor 1295 performs digital signal processing on the control channel to recover the instructions, such as via demodulation of digital control channel data, from the control channel signal 1287. The clock signal generator 1289 generates the clock signal 1290, from the clock reference signal 1278, to synchronize timing of the digital control channel processing by the digital control channel processor 1295. In embodiments where the clock reference signal 1278 is a sinusoid, the clock signal generator 1289 can provide amplification and limiting to create a traditional clock signal or other timing signal from the sinusoid. In embodiments where the clock reference signal 1278 is a modulated carrier signal, such as a modulation of the reference or pilot signal or other carrier wave, the clock signal generator 1289 can provide demodulation to create a traditional clock signal or other timing signal.

In various embodiments, the control channel signal 1287 can be either a digitally modulated signal in a range of frequencies separate from the pilot signal 1291 and the clock reference 1288 or as modulation of the pilot signal 1291. In operation, the digital control channel processor 1295 provides demodulation of the control channel signal 1287 to extract the instructions contained therein in order to generate a control signal 1293. In particular, the control signal 1293 generated by the digital control channel processor 1295 in response to instructions received via the control channel can be used to select the particular channel signals 1294 along with the corresponding pilot signal 1291 and/or clock reference 1288 to be used for converting the frequencies of channel signals 1294 for transmission via wireless interface 1111. It should be noted that in circumstances where the control channel signal 1287 conveys the instructions via modulation of the pilot signal 1291, the pilot signal 1291 can be extracted via the digital control channel processor 1295 rather than the analog front-end 1286 as shown.

The digital control channel processor 1295 may be implemented via a processing module such as a microprocessor, micro-controller, digital signal processor, microcomputer, central processing unit, field programmable gate array, programmable logic device, state machine, logic circuitry, digital circuitry, an analog to digital converter, a digital to analog converter and/or any device that manipulates signals (analog and/or digital) based on hard coding of the circuitry and/or operational instructions. The processing module may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that the memory and/or memory element storing the corresponding operational instructions may be embedded within, or external to, the microprocessor, micro-controller, digital signal processor, microcomputer, central processing unit, field programmable gate array, programmable logic device, state machine, logic circuitry, digital circuitry, an analog to digital converter, a digital to analog converter or other device. Still further note that, the memory element may store, and the processing module executes, hard coded and/or operational instructions corresponding to at least some of the steps and/or functions described herein and such a memory device or memory element can be implemented as an article of manufacture.

The local oscillator 1292 generates the local oscillator signal 1297 utilizing the pilot signal 1291 to reduce distortion during the frequency conversion process. In various embodiments the pilot signal 1291 is at the correct frequency and phase of the local oscillator signal 1297 to generate the local oscillator signal 1297 at the proper frequency and phase to convert the channel signals 1294 at the carrier frequency associated with their placement in the spectrum of the distributed antenna system to their original/native spectral segments for transmission to fixed or mobile communication devices. In this case, the local oscillator 1292 can employ bandpass filtration and/or other signal conditioning to generate a sinusoidal local oscillator signal 1297 that preserves the frequency and phase of the pilot signal 1291. In other embodiments, the pilot signal 1291 has a frequency and phase that can be used to derive the local oscillator signal 1297. In this case, the local oscillator 1292 employs frequency division, frequency multiplication or other frequency synthesis, based on the pilot signal 1291, to generate the local oscillator signal 1297 at the proper frequency and phase to convert the channel signals 1294 at the carrier frequency associated with their placement in the spectrum of the distributed antenna system to their original/native spectral segments for transmission to fixed or mobile communication devices.

The mixer 1296 operates based on the local oscillator signal 1297 to shift the channel signals 1294 in frequency to generate frequency converted channel signals 1298 at their corresponding original/native spectral segments. While a single mixing stage is shown, multiple mixing stages can be employed to shift the channel signals to baseband and/or one or more intermediate frequencies as part of the total frequency conversion. The transmitter (Xmtr) front-end 1284 includes a power amplifier and impedance matching to wirelessly transmit the frequency converted channel signals 1298 as a free space wireless signals via one or more antennas, such as antennas 1124, to one or more mobile or fixed communication devices in range of the communication node 1104B-E.

Figure 12I:
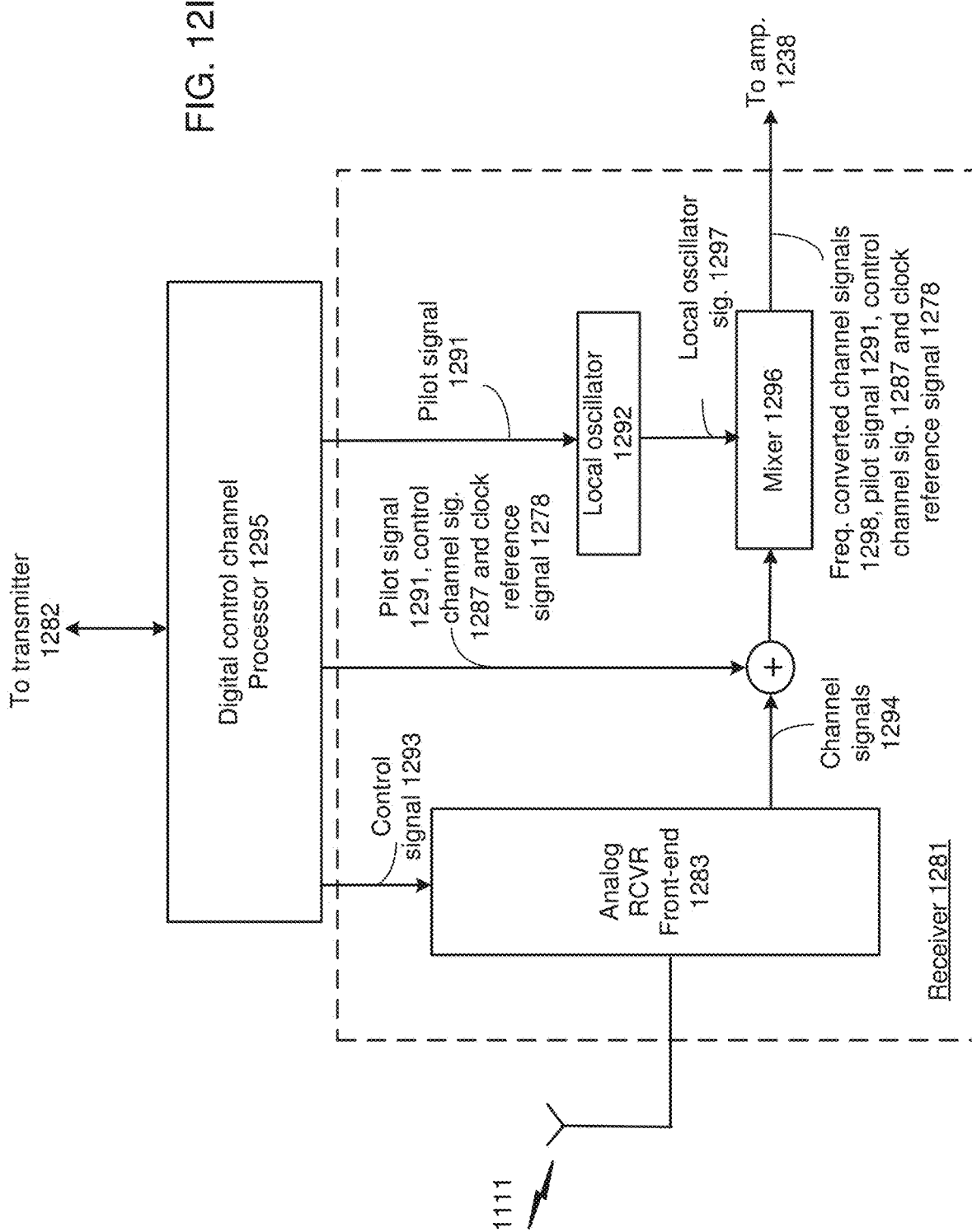
FIG. 12I is a block diagram illustrating an example, non-limiting embodiment of a receiver in accordance with various aspects described herein.

Turning now to FIG. 12I, a block diagram 1285 illustrating an example, non-limiting embodiment of a receiver is shown. In particular, a receiver 1281 is shown for use with, for example, transmitter 1282 and digital control channel processor 1295 in a transceiver, such as transceiver 1233 presented in conjunction with FIG. 12C. As shown, the receiver 1281 includes an analog receiver (RCVR) front-end 1283, local oscillator 1292, and mixer 1296. The digital control channel processor 1295 operates under control of instructions from the control channel to generate the pilot signal 1291, control channel signal 1287 and clock reference signal 1278.

The control signal 1293 generated by the digital control channel processor 1295 in response to instructions received via the control channel can also be used to select the particular channel signals 1294 along with the corresponding pilot signal 1291 and/or clock reference 1288 to be used for converting the frequencies of channel signals 1294 for reception via wireless interface 1111. The analog receiver front end 1283 includes a low noise amplifier and one or more filters or other frequency selection to receive one or more selected channels signals 1294 under control of the control signal 1293.

The local oscillator 1292 generates the local oscillator signal 1297 utilizing the pilot signal 1291 to reduce distortion during the frequency conversion process. In various embodiments the local oscillator employs bandpass filtration and/or other signal conditioning, frequency division, frequency multiplication or other frequency synthesis, based on the pilot signal 1291, to generate the local oscillator signal 1297 at the proper frequency and phase to frequency convert the channel signals 1294, the pilot signal 1291, control channel signal 1287 and clock reference signal 1278 to the spectrum of the distributed antenna system for transmission to other communication nodes 1104A-E. In particular, the mixer 1296 operates based on the local oscillator signal 1297 to shift the channel signals 1294 in frequency to generate frequency converted channel signals 1298 at the desired placement within spectrum spectral segment of the distributed antenna system for coupling to the amplifier 1238, to transceiver 1236A for amplification and retransmission via the transceiver 1236A back to the communication node 1104A or upstream communication nodes 1104B-E for further retransmission back to a base station, such as macro base station 1102, for processing. Again, while a single mixing stage is shown, multiple mixing stages can be employed to shift the channel signals to baseband and/or one or more intermediate frequencies as part of the total frequency conversion.

Figure 13A:
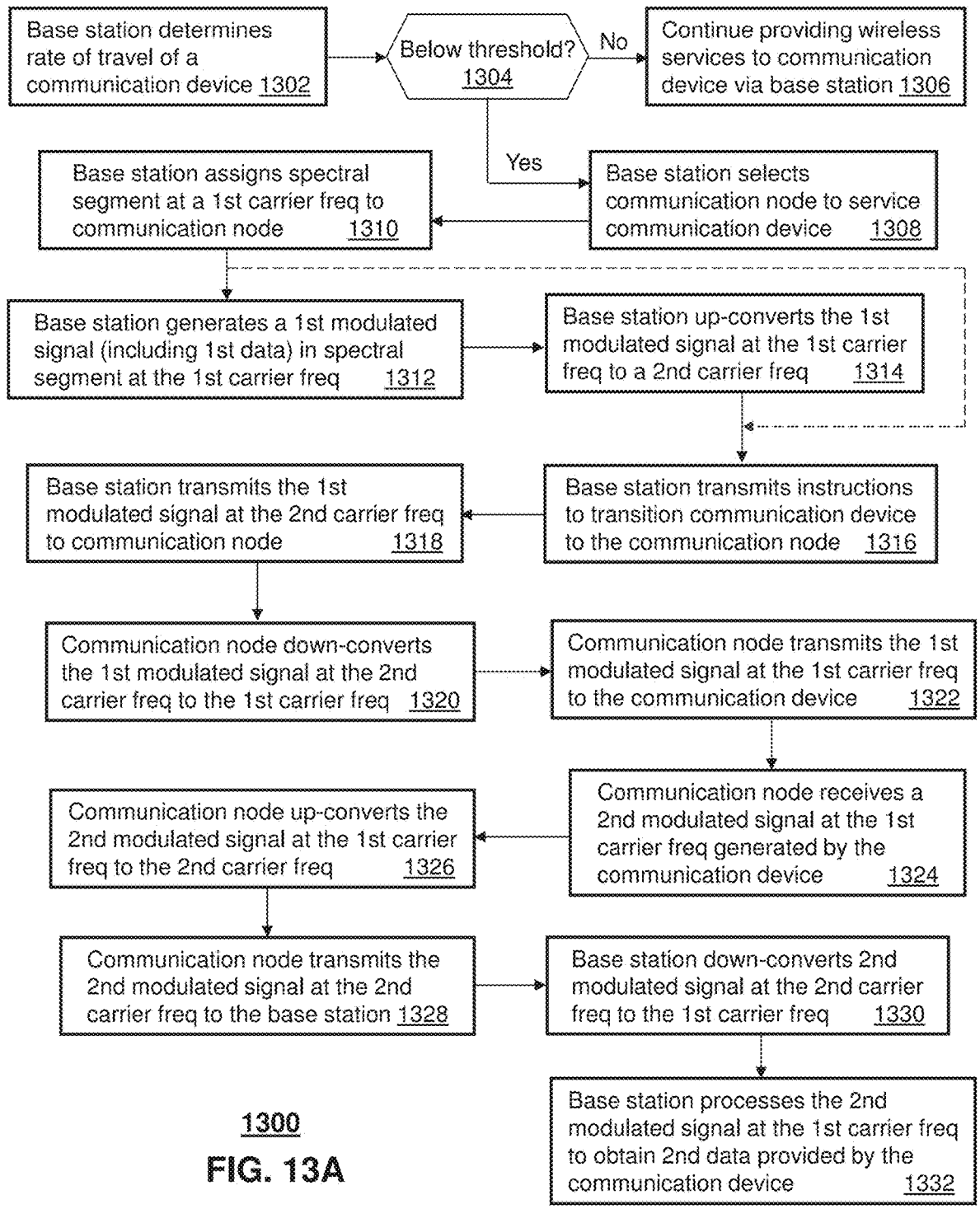
FIG. 13A illustrates a flow diagram of an example, non-limiting embodiment of a method in accordance with various aspects described herein.

Turning now to FIG. 13A, a flow diagram of an example, non-limiting embodiment of a method 1300, is shown. Method 1300 can be used with one or more functions and features presented in conjunction with FIGS. 1-12. Method 1300 can begin with step 1302 in which a base station, such as the macro base station 1102 of FIG. 11A, determines a rate of travel of a communication device. The communication device can be a mobile communication device such as one of the mobile devices 1106 illustrated in FIG. 11B, or stationary communication device (e.g., a communication device in a residence, or commercial establishment). The base station can communicate directly with the communication device utilizing wireless cellular communications technology (e.g., LTE), which enables the base station to monitor the movement of the communication device by receiving location information from the communication device, and/or to provide the communication device wireless communication services such as voice and/or data services. During a communication session, the base station and the communication device exchange wireless signals that operate at a certain native/original carrier frequency (e.g., a 900 MHz band, 1.9 GHz band, a 2.4 GHz band, and/or a 5.8 GHz band, etc.) utilizing one or more spectral segments (e.g., resource blocks) of a certain bandwidth (e.g., 10-20 MHz). In some embodiments, the spectral segments are used according to a time slot schedule assigned to the communication device by the base station.

The rate of travel of the communication device can be determined at step 1302 from GPS coordinates provided by the communication device to the base station by way of cellular wireless signals. If the rate of travel is above a threshold (e.g., 25 miles per hour) at step 1304, the base station can continue to provide wireless services to the communication device at step 1306 utilizing the wireless resources of the base station. If, on the other hand, the communication device has a rate of travel below the threshold, the base station can be configured to further determine whether the communication device can be redirected to a communication node to make available the wireless resources of the base station for other communication devices.

For example, suppose the base station detects that the communication device has a slow rate of travel (e.g., 3 mph or near stationary). Under certain circumstances, the base station may also determine that a current location of the communication device places the communication device in a communication range of a particular communication node 1104. The base station may also determine that the slow rate of travel of the communication device will maintain the communication device within the communication range of the particular communication node 1104 for a sufficiently long enough time (another threshold test that can be used by the base station) to justify redirecting the communication device to the particular communication node 1104. Once such a determination is made, the base station can proceed to step 1308 and select the communication node 1104 that is in the communication range of the communication device for providing communication services thereto.

Accordingly, the selection process performed at step 1308 can be based on a location of the communication device determined from GPS coordinates provided to the base station by the communication device. The selection process can also be based on a trajectory of travel of the communication device, which may be determined from several instances of GPS coordinates provided by the communication device. In some embodiments, the base station may determine that the trajectory of the communication device will eventually place the communication device in a communication range of a subsequent communication node 1104 neighboring the communication node selected at step 1308. In this embodiment, the base station can inform multiple communication nodes 1104 of this trajectory to enable the communication nodes 1104 coordinate a handoff of communication services provided to the communication device.

Once one or more communication nodes 1104 have been selected at step 1308, the base station can proceed to step 1310 where it assigns one or more spectral segments (e.g., resource blocks) for use by the communication device at a first carrier frequency (e.g., 1.9 GHz). It is not necessary for the first carrier frequency and/or spectral segments selected by the base station to be the same as the carrier frequency and/or spectral segments in use between the base station and the communication device. For example, suppose the base station and the communication device are utilizing a carrier frequency at 1.9 GHz for wireless communications between each other. The base station can select a different carrier frequency (e.g., 900 MHz) at step 1310 for the communication node selected at step 1308 to communicate with the communication device. Similarly, the base station can assign spectral segment(s) (e.g., resource blocks) and/or a timeslot schedule of the spectral segment(s) to the communication node that differs from the spectral segment(s) and/or timeslot schedule in use between the base station and the communication device.

At step 1312, the base station can generate first modulated signal(s) in the spectral segment(s) assigned in step 1310 at the first carrier frequency. The first modulated signal(s) can include data directed to the communication device, the data representative of a voice communication session, a data communication session, or a combination thereof. At step 1314, the base station can up-convert (with a mixer, bandpass filter and other circuitry) the first modulated signal(s) at the first native carrier frequency (e.g., 1.9 GHz) to a second carrier frequency (e.g., 80 GHz) for transport of such signals in one or more frequency channels of a downlink spectral segment 1206 which is directed to the communication node 1104 selected at step 1308. Alternatively, the base station can provide the first modulated signal(s) at the first carrier frequency to the first communication node 1104A (illustrated in FIG. 11A) for up-conversion to the second carrier frequency for transport in one or more frequency channels of a downlink spectral segment 1206 directed to the communication node 1104 selected at step 1308.

At step 1316, the base station can also transmit instructions to transition the communication device to the communication node 1104 selected at step 1308. The instructions can be directed to the communication device while the communication device is in direct communications with the base station utilizing the wireless resources of the base station. Alternatively, the instructions can be communicated to the communication node 1104 selected at step 1308 by way of a control channel 1202 of the downlink spectral segment 1206 illustrated in FIG. 12A. Step 1316 can occur before, after or contemporaneously with steps 1312-1314.

Once the instructions have been transmitted, the base station can proceed to step 1318 where it transmits in one or more frequency channels of a downlink spectral segment 1206 the first modulated signal at the second carrier frequency (e.g., 80 GHz) for transmission by the first communication node 1104A (illustrated in FIG. 11A). Alternatively, the first communication node 1104A can perform the up-conversion at step 1314 for transport of the first modulated signal at the second carrier frequency in one or more frequency channels of a downlink spectral segment 1206 upon receiving from the base station the first modulated signal(s) at the first native carrier frequency. The first communication node 1104A can serve as a master communication node for distributing downlink signals generated by the base station to downstream communication nodes 1104 according to the downlink spectral segments 1206 assigned to each communication node 1104 at step 1310. The assignment of the downlink spectral segments 1206 can be provided to the communication nodes 1104 by way of instructions transmitted by the first communication node 1104A in the control channel 1202 illustrated in FIG. 12A. At step 1318, the communication node 1104 receiving the first modulated signal(s) at the second carrier frequency in one or more frequency channels of a downlink spectral segment 1206 can be configured to down-convert it to the first carrier frequency, and utilize the pilot signal supplied with the first modulated signal(s) to remove distortions (e.g., phase distortion) caused by the distribution of the downlink spectral segments 1206 over communication hops between the communication nodes 1104B-D. In particular, the pilot signal can be derived from the local oscillator signal used to generate the frequency up-conversion (e.g. via frequency multiplication and/or division). When down conversion is required the pilot signal can be used to recreate a frequency and phase correct version of the local oscillator signal (e.g. via frequency multiplication and/or division) to return the modulated signal to its original portion of the frequency band with minimal phase error. In this fashion, the frequency channels of a communication system can be converted in frequency for transport via the distributed antenna system and then returned to their original position in the spectrum for transmission to wireless client device.

Once the down-conversion process is completed, the communication node 1104 can transmit at step 1322 the first modulated signal at the first native carrier frequency (e.g., 1.9 GHz) to the communication device utilizing the same spectral segment assigned to the communication node 1104. Step 1322 can be coordinated so that it occurs after the communication device has transitioned to the communication node 1104 in accordance with the instructions provided at step 1316. To make such a transition seamless, and so as to avoid interrupting an existing wireless communication session between the base station and the communication device, the instructions provided in step 1316 can direct the communication device and/or the communication node 1104 to transition to the assigned spectral segment(s) and/or time slot schedule as part of and/or subsequent to a registration process between the communication device and the communication node 1104 selected at step 1308. In some instances such a transition may require that the communication device to have concurrent wireless communications with the base station and the communication node 1104 for a short period of time.

Once the communication device successfully transitions to the communication node 1104, the communication device can terminate wireless communications with the base station, and continue the communication session by way of the communication node 1104. Termination of wireless services between the base station and the communication device makes certain wireless resources of the base station available for use with other communication devices. It should be noted that although the base station has in the foregoing steps delegated wireless connectivity to a select communication node 1104, the communication session between base station and the communication device continues as before by way of the network of communication nodes 1104 illustrated in FIG. 11A. The difference is, however, that the base station no longer needs to utilize its own wireless resources to communicate with the communication device.

In order to provide bidirectional communications between the base station and the communication device, by way of the network of communication nodes 1104, the communication node 1104 and/or the communication device can be instructed to utilize one or more frequency channels of one or more uplink spectral segments 1210 on the uplink illustrated in FIG. 12A. Uplink instructions can be provided to the communication node 1104 and/or communication device at step 1316 as part of and/or subsequent to the registration process between the communication device and the communication node 1104 selected at step 1308. Accordingly, when the communication device has data it needs to transmit to the base station, it can wirelessly transmit second modulated signal(s) at the first native carrier frequency which can be received by the communication node 1104 at step 1324. The second modulated signal(s) can be included in one or more frequency channels of one or more uplink spectral segments 1210 specified in the instructions provided to the communication device and/or communication node at step 1316.

To convey the second modulated signal(s) to the base station, the communication node 1104 can up-convert these signals at step 1326 from the first native carrier frequency (e.g., 1.9 GHz) to the second carrier frequency (e.g., 80 GHz). To enable upstream communication nodes and/or the base station to remove distortion, the second modulated signal(s) at the second carrier frequency can be transmitted at step 1328 by the communication node 1104 with one or more uplink pilot signals 1208. Once the base station receives the second modulated signal(s) at the second carrier frequency via communication node 1104A, it can down-convert these signals at step 1330 from the second carrier frequency to the first native carrier frequency to obtain data provided by the communication device at step 1332. Alternatively, the first communication node 1104A can perform the down-conversion of the second modulated signal(s) at the second carrier frequency to the first native carrier frequency and provide the resulting signals to the base station. The base station can then process the second modulated signal(s) at the first native carrier frequency to retrieve data provided by the communication device in a manner similar or identical to how the base station would have processed signals from the communication device had the base station been in direct wireless communications with the communication device.

The foregoing steps method 1300 provide a way for a base station 1102 to make available wireless resources (e.g., sector antennas, spectrum) for fast moving communication devices and in some embodiments increase bandwidth utilization by redirecting slow moving communication devices to one or more communication nodes 1104 communicatively coupled to the base station 1102. For example, suppose a base station 1102 has ten (10) communication nodes 1104 that it can redirect mobile and/or stationary communication devices to. Further suppose that the 10 communication nodes 1104 have substantially non-overlapping communication ranges.

Further suppose, the base station 1102 has set aside certain spectral segments (e.g., resource blocks 5, 7 and 9) during particular timeslots and at a particular carrier frequency, which it assigns to all 10 communication nodes 1104. During operations, the base station 1102 can be configured not to utilize resource blocks 5, 7 and 9 during the timeslot schedule and carrier frequency set aside for the communication nodes 1104 to avoid interference. As the base station 1102 detects slow moving or stationary communication devices, it can redirect the communication devices to different ones of the 10 communication nodes 1104 based on the location of the communication devices. When, for example, the base station 1102 redirects communications of a particular communication device to a particular communication node 1104, the base station 1102 can up-convert resource blocks 5, 7 and 9 during the assigned timeslots and at the carrier frequency to one or more spectral range(s) on the downlink (see FIG. 12A) assigned to the communication node 1104 in question.

The communication node 1104 in question can also be assigned to one or more frequency channels of one or more uplink spectral segments 1210 on the uplink which it can use to redirect communication signals provided by the communication device to the base station 1102. Such communication signals can be up-converted by the communication node 1104 according to the assigned uplink frequency channels in one or more corresponding uplink spectral segments 1210 and transmitted to the base station 1102 for processing. The downlink and uplink frequency channel assignments can be communicated by the base station 1102 to each communication node 1104 by way of a control channel as depicted in FIG. 12A. The foregoing downlink and uplink assignment process can also be used for the other communication nodes 1104 for providing communication services to other communication devices redirected by the base station 1102 thereto.

In this illustration, the reuse of resource blocks 5, 7 and 9 during a corresponding timeslot schedule and carrier frequency by the 10 communication nodes 1104 can effectively increase bandwidth utilization by the base station 1102 up to a factor of 10. Although the base station 1102 can no longer use resource blocks 5, 7 and 9 it set aside for the 10 communication nodes 1104 for wirelessly communicating with other communication devices, its ability to redirect communication devices to 10 different communication nodes 1104 reusing these resource blocks effectively increases the bandwidth capabilities of the base station 1102. Accordingly, method 1300 in certain embodiments can increase bandwidth utilization of a base station 1102 and make available resources of the base station 1102 for other communication devices.

It will be appreciated that in some embodiments, the base station 1102 can be configured to reuse spectral segments assigned to communication nodes 1104 by selecting one or more sectors of an antenna system of the base station 1102 that point away from the communication nodes 1104 assigned to the same spectral segments. Accordingly, the base station 1102 can be configured in some embodiments to avoid reusing certain spectral segments assigned to certain communication nodes 1104 and in other embodiments reuse other spectral segments assigned to other communication nodes 1104 by selecting specific sectors of the antenna system of the base station 1102. Similar concepts can be applied to sectors of the antenna system 1124 employed by the communication nodes 1104. Certain reuse schemes can be employed between the base station 1102 and one or more communication nodes 1104 based on sectors utilized by the base station 1102 and/or the one or more communication nodes 1104.

Method 1300 also enables the reuse of legacy systems when communication devices are redirected to one or more communication nodes. For example, the signaling protocol (e.g., LTE) utilized by the base station to wirelessly communicate with the communication device can be preserved in the communication signals exchanged between the base station and the communication nodes 1104. Accordingly, when assigning spectral segments to the communication nodes 1104, the exchange of modulated signals in these segments between the base station and the communication nodes 1104 can be the same signals that would have been used by the base station to perform direct wireless communications with the communication device. Thus, legacy base stations can be updated to perform the up and down-conversion process previously described, with the added feature of distortion mitigation, while all other functions performed in hardware and/or software for processing modulated signals at the first native carrier frequency can remain substantially unaltered. It should also be noted that, in further embodiments, channels from an original frequency band can be converted to another frequency band utilizing by the same protocol. For example, LTE channels in the 2.5 GHz band can be up-converted into a 80 GHZ band for transport and then down-converted as 5.8 GHz LTE channels if required for spectral diversity.

It is further noted that method 1300 can be adapted without departing from the scope of the subject disclosure. For example, when the base station detects that a communication device has a trajectory that will result in a transition from the communication range of one communication node to another, the base station (or the communication nodes in question) can monitor such a trajectory by way of periodic GPS coordinates provided by the communication device, and accordingly coordinate a handoff of the communication device to the other communication node. Method 1300 can also be adapted so that when the communication device is near a point of transitioning from the communication range of one communication node to another, instructions can be transmitted by the base station (or the active communication node) to direct the communication device and/or the other communication node to utilize certain spectral segments and/or timeslots in the downlink and uplink channels to successfully transition communications without interrupting an existing communication session.

It is further noted that method 1300 can also be adapted to coordinate a handoff of wireless communications between the communication device and a communication node 1104 back to the base station when the base station or the active communication node 1104 detects that the communication device will at some point transition outside of a communication range of the communication node and no other communication node is in a communication range of the communication device. Other adaptations of method 1300 are contemplated by the subject disclosure. It is further noted that when a carrier frequency of a downlink or uplink spectral segment is lower than a native frequency band of a modulated signal, a reverse process of frequency conversion would be required. That is, when transporting a modulated signal in a downlink or uplink spectral segment frequency down-conversion will be used instead of up-conversion. And when extracting a modulated signal in a downlink or uplink spectral segment frequency up-conversion will be used instead of down-conversion. Method 1300 can further be adapted to use the clock signal referred to above for synchronizing the processing of digital data in a control channel. Method 1300 can also be adapted to use a reference signal that is modulated by instructions in the control channel or a clock signal that is modulated by instructions in the control channel.

Method 1300 can further be adapted to avoid tracking of movement of a communication device and instead direct multiple communication nodes 1104 to transmit the modulated signal of a particular communication device at its native frequency without knowledge of which communication node is in a communication range of the particular communication device. Similarly, each communication node can be instructed to receive modulated signals from the particular communication device and transport such signals in certain frequency channels of one or more uplink spectral segments 1210 without knowledge as to which communication node will receive modulated signals from the particular communication device. Such an implementation can help reduce the implementation complexity and cost of the communication nodes 1104.

While for purposes of simplicity of explanation, the respective processes are shown and described as a series of blocks in FIG. 13A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 13B:
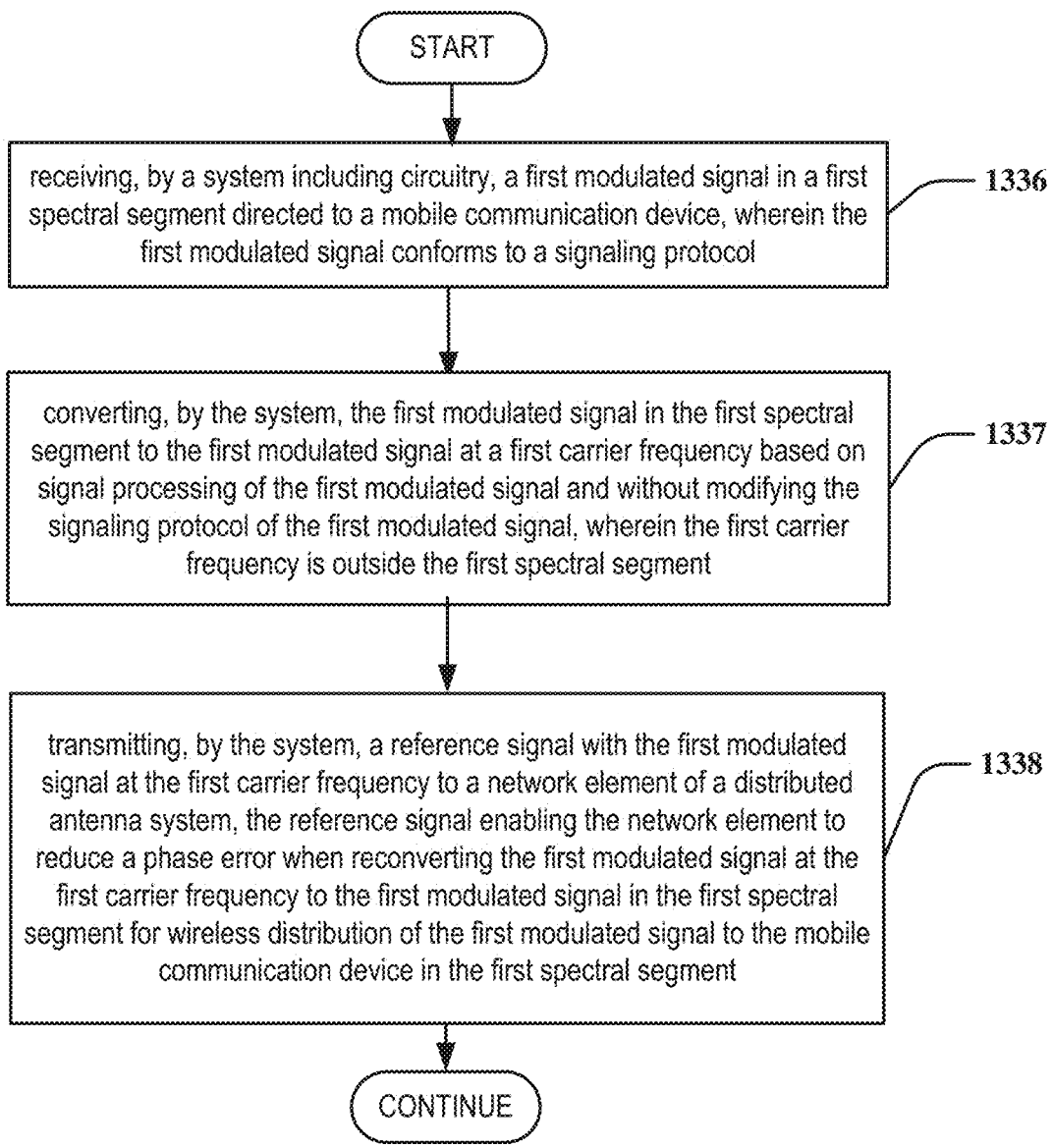
FIG. 13B illustrates a flow diagram of an example, non-limiting embodiment of a method in accordance with various aspects described herein.

Turning now to FIG. 13B, a flow diagram of an example, non-limiting embodiment of a method 1335, is shown. Method 1335 can be used with one or more functions and features presented in conjunction with FIGS. 1-12. Step 1336 includes receiving, by a system including circuitry, a first modulated signal in a first spectral segment directed to a mobile communication device, wherein the first modulated signal conforms to a signaling protocol. Step 1337 includes converting, by the system, the first modulated signal in the first spectral segment to the first modulated signal at a first carrier frequency based on a signal processing of the first modulated signal and without modifying the signaling protocol of the first modulated signal, wherein the first carrier frequency is outside the first spectral segment. Step 1338 includes transmitting, by the system, a reference signal with the first modulated signal at the first carrier frequency to a network element of a distributed antenna system, the reference signal enabling the network element to reduce a phase error when reconverting the first modulated signal at the first carrier frequency to the first modulated signal in the first spectral segment for wireless distribution of the first modulated signal to the mobile communication device in the first spectral segment.

In various embodiments, the signal processing does not require either analog to digital conversion or digital to analog conversion. The transmitting can comprise transmitting to the network element the first modulated signal at the first carrier frequency as a free space wireless signal. The first carrier frequency can be in a millimeter-wave frequency band.

The first modulated signal can be generated by modulating signals in a plurality of frequency channels according to the signaling protocol to generate the first modulated signal in the first spectral segment. The signaling protocol can comprise a Long-Term Evolution (LTE) wireless protocol or a fifth generation cellular communications protocol.

Converting by the system can comprise up-converting the first modulated signal in the first spectral segment to the first modulated signal at the first carrier frequency or down-converting the first modulated signal in the first spectral segment to the first modulated signal at the first carrier frequency. Converting by the network element can comprises down-converting the first modulated signal at the first carrier frequency to the first modulated signal in the first spectral segment or up-converting the first modulated signal at the first carrier frequency to the first modulated signal in the first spectral segment.

The method can further include receiving, by the system, a second modulated signal at a second carrier frequency from the network element, wherein the mobile communication device generates the second modulated signal in a second spectral segment, and wherein the network element converts the second modulated signal in the second spectral segment to the second modulated signal at the second carrier frequency and transmits the second modulated signal at the second carrier frequency. The method can further include converting, by the system, the second modulated signal at the second carrier frequency to the second modulated signal in the second spectral segment; and sending, by the system, the second modulated signal in the second spectral segment to a base station for processing.

The second spectral segment can differ from the first spectral segment, and wherein the first carrier frequency can differ from the second carrier frequency. The system can be mounted to a first utility pole and the network element can be mounted to a second utility pole.

While for purposes of simplicity of explanation, the respective processes are shown and described as a series of blocks in FIG. 13B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 13C:
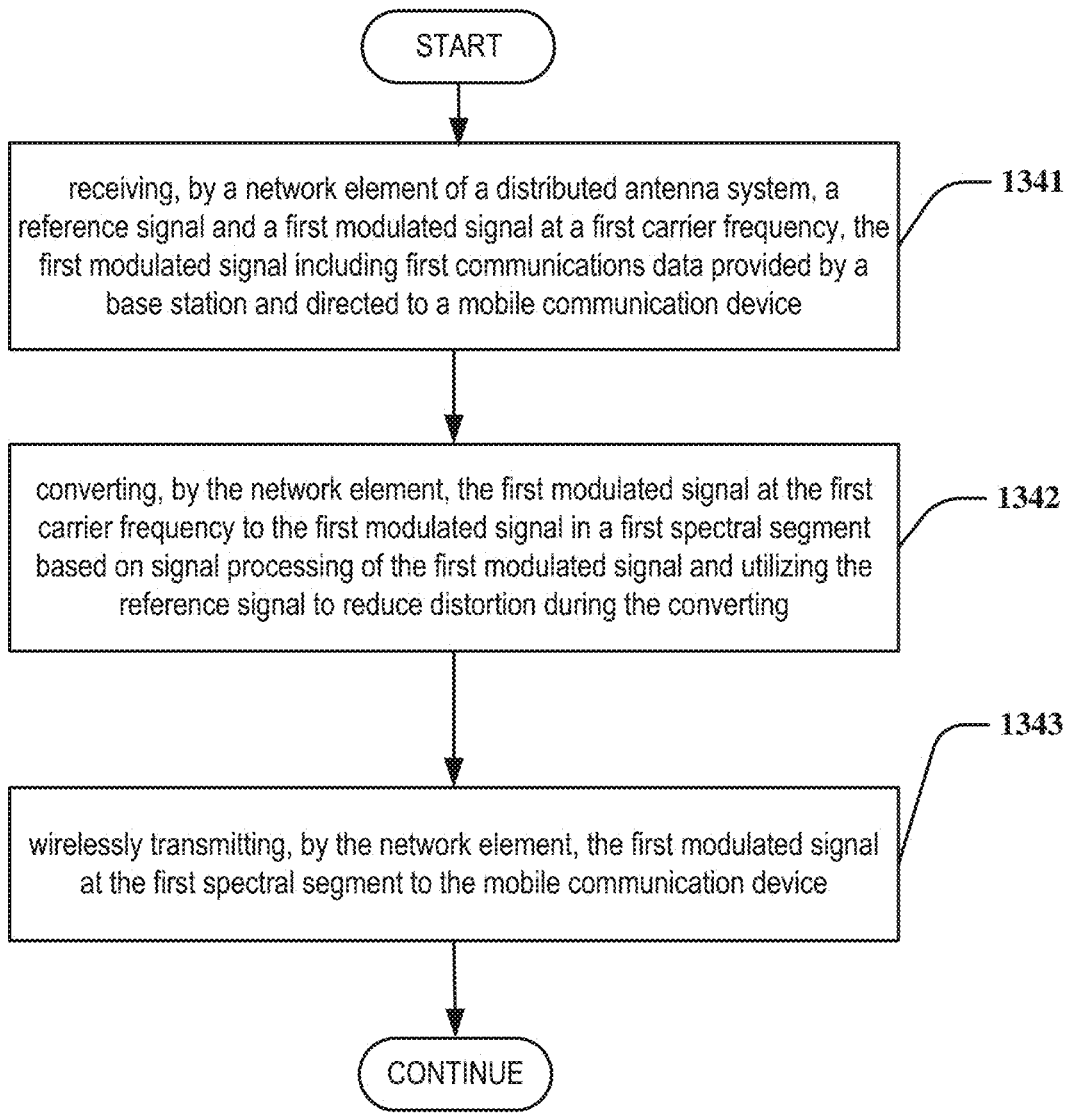
FIG. 13C illustrates a flow diagram of an example, non-limiting embodiment of a method in accordance with various aspects described herein.

Turning now to FIG. 13C, a flow diagram of an example, non-limiting embodiment of a method 1340, is shown. Method 1335 can be used with one or more functions and features presented in conjunction with FIGS. 1-12. Step 1341 include receiving, by a network element of a distributed antenna system, a reference signal and a first modulated signal at a first carrier frequency, the first modulated signal including first communications data provided by a base station and directed to a mobile communication device. Step 1342 includes converting, by the network element, the first modulated signal at the first carrier frequency to the first modulated signal in a first spectral segment based on a signal processing of the first modulated signal and utilizing the reference signal to reduce distortion during the converting. Step 1343 includes wirelessly transmitting, by the network element, the first modulated signal at the first spectral segment to the mobile communication device.

In various embodiments the first modulated signal conforms to a signaling protocol, and the signal processing converts the first modulated signal in the first spectral segment to the first modulated signal at the first carrier frequency without modifying the signaling protocol of the first modulated signal. The converting by the network element can include converting the first modulated signal at the first carrier frequency to the first modulated signal in the first spectral segment without modifying the signaling protocol of the first modulated signal. The method can further include receiving, by the network element, a second modulated signal in a second spectral segment generated by the mobile communication device, converting, by the network element, the second modulated signal in the second spectral segment to the second modulated signal at a second carrier frequency; and transmitting, by the network element, to an other network element of the distributed antenna system the second modulated signal at the second carrier frequency. The other network element of the distributed antenna system can receive the second modulated signal at the second carrier frequency, converts the second modulated signal at the second carrier frequency to the second modulated signal in the second spectral segment, and provides the second modulated signal in the second spectral segment to the base station for processing. The second spectral segment can differs from the first spectral segment, and the first carrier frequency can differ from the second carrier frequency.

While for purposes of simplicity of explanation, the respective processes are shown and described as a series of blocks in FIG. 13C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 13D:
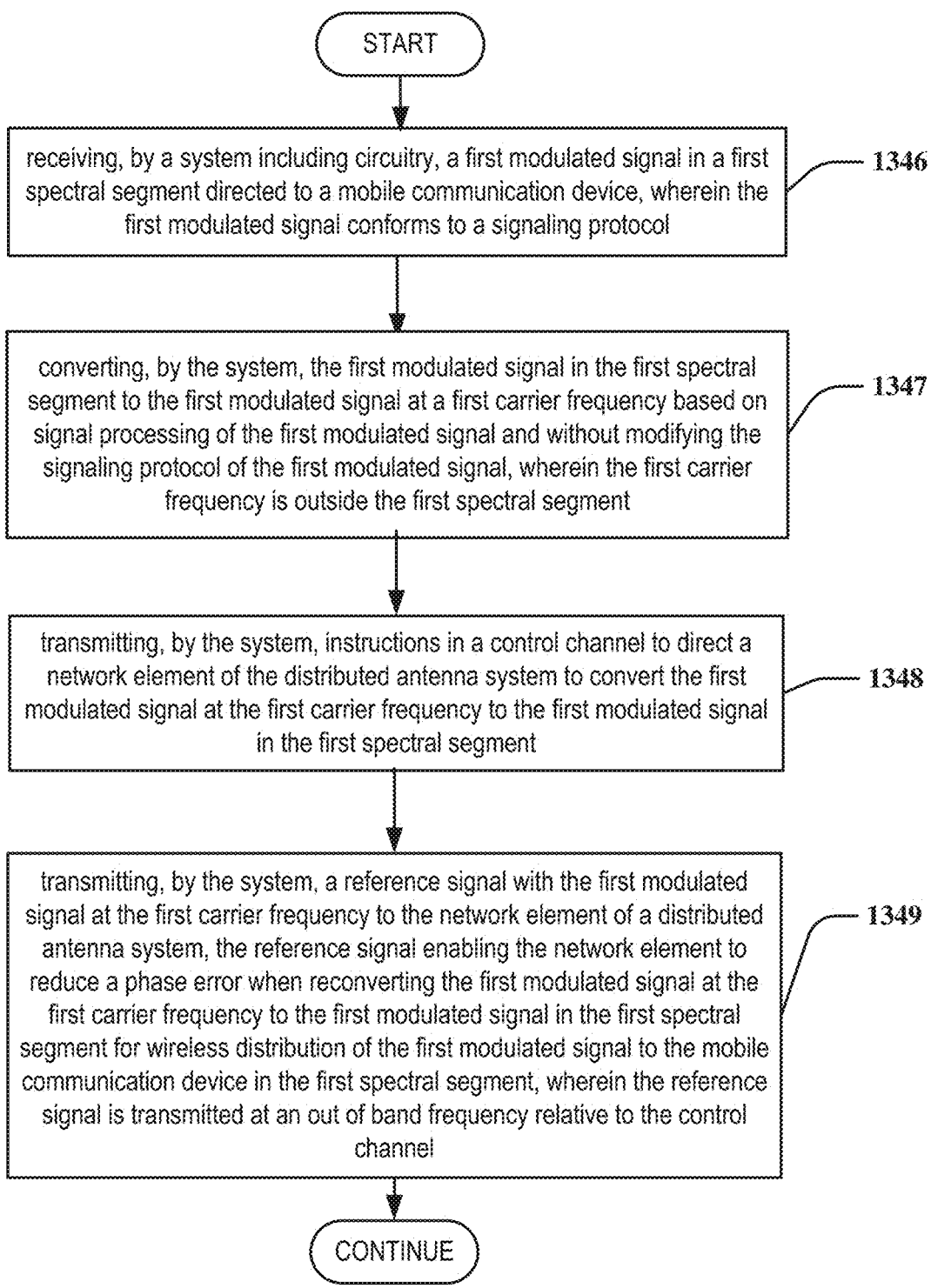
FIG. 13D illustrates a flow diagram of an example, non-limiting embodiment of a method in accordance with various aspects described herein.

Turning now to FIG. 13D, a flow diagram of an example, non-limiting embodiment of a method 1345, is shown. Method 1345 can be used with one or more functions and features presented in conjunction with FIGS. 1-12. Step 1346 includes receiving, by a system including circuitry, a first modulated signal in a first spectral segment directed to a mobile communication device, wherein the first modulated signal conforms to a signaling protocol. Step 1347 includes converting, by the system, the first modulated signal in the first spectral segment to the first modulated signal at a first carrier frequency based on a signal processing of the first modulated signal and without modifying the signaling protocol of the first modulated signal, wherein the first carrier frequency is outside the first spectral segment. Step 1348 includes transmitting, by the system, instructions in a control channel to direct a network element of the distributed antenna system to convert the first modulated signal at the first carrier frequency to the first modulated signal in the first spectral segment. Step 1349 includes transmitting, by the system, a reference signal with the first modulated signal at the first carrier frequency to the network element of a distributed antenna system, the reference signal enabling the network element to reduce a phase error when reconverting the first modulated signal at the first carrier frequency to the first modulated signal in the first spectral segment for wireless distribution of the first modulated signal to the mobile communication device in the first spectral segment, wherein the reference signal is transmitted at an out of band frequency relative to the control channel.

In various embodiments, the control channel is transmitted at a frequency adjacent to the first modulated signal at the first carrier frequency and/or at a frequency adjacent to the reference signal. The first carrier frequency can be in a millimeter-wave frequency band. The first modulated signal can be generated by modulating signals in a plurality of frequency channels according to the signaling protocol to generate the first modulated signal in the first spectral segment. The signaling protocol can comprise a Long-Term Evolution (LTE) wireless protocol or a fifth generation cellular communications protocol.

The converting by the system can comprises up-converting the first modulated signal in the first spectral segment to the first modulated signal at the first carrier frequency or down-converting the first modulated signal in the first spectral segment to the first modulated signal at the first carrier frequency. The converting by the network element can comprise down-converting the first modulated signal at the first carrier frequency to the first modulated signal in the first spectral segment or up-converting the first modulated signal at the first carrier frequency to the first modulated signal in the first spectral segment.

The method can further include receiving, by the system, a second modulated signal at a second carrier frequency from the network element, wherein the mobile communication device generates the second modulated signal in a second spectral segment, and wherein the network element converts the second modulated signal in the second spectral segment to the second modulated signal at the second carrier frequency and transmits the second modulated signal at the second carrier frequency. The method can further include converting, by the system, the second modulated signal at the second carrier frequency to the second modulated signal in the second spectral segment; and sending, by the system, the second modulated signal in the second spectral segment to a base station for processing.

The second spectral segment can differ from the first spectral segment, and wherein the first carrier frequency can differ from the second carrier frequency. The system can be mounted to a first utility pole and the network element can be mounted to a second utility pole.

While for purposes of simplicity of explanation, the respective processes are shown and described as a series of blocks in FIG. 13D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 13E:
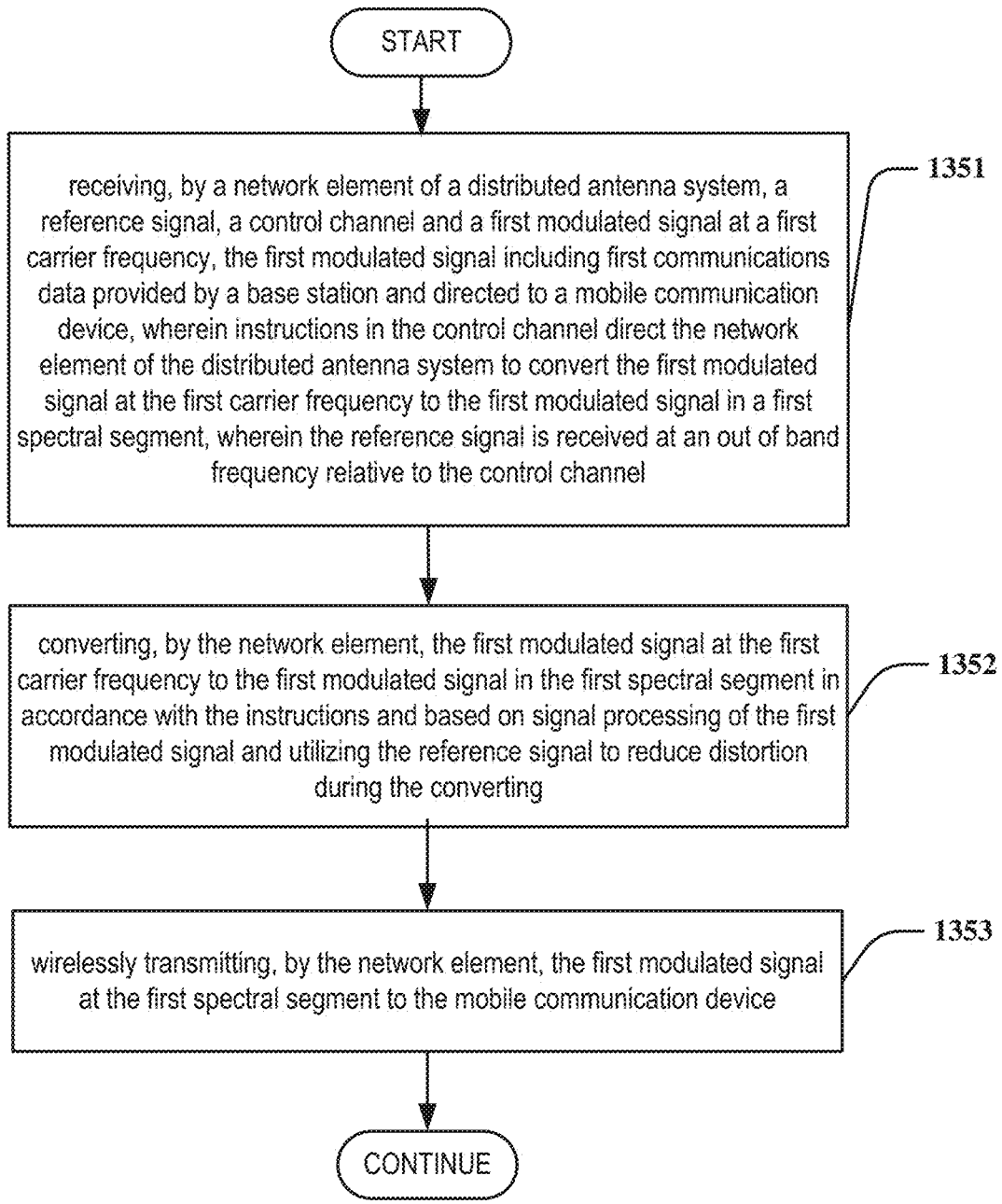
FIG. 13E illustrates a flow diagram of an example, non-limiting embodiment of a method in accordance with various aspects described herein.

Turning now to FIG. 13E, a flow diagram of an example, non-limiting embodiment of a method 1350, is shown. Method 1350 can be used with one or more functions and features presented in conjunction with FIGS. 1-12. Step 1351 includes receiving, by a network element of a distributed antenna system, a reference signal, a control channel and a first modulated signal at a first carrier frequency, the first modulated signal including first communications data provided by a base station and directed to a mobile communication device, wherein instructions in the control channel direct the network element of the distributed antenna system to convert the first modulated signal at the first carrier frequency to the first modulated signal in a first spectral segment, wherein the reference signal is received at an out of band frequency relative to the control channel. Step 1352 includes converting, by the network element, the first modulated signal at the first carrier frequency to the first modulated signal in the first spectral segment in accordance with the instructions and based on a signal processing of the first modulated signal and utilizing the reference signal to reduce distortion during the converting. Step 1353 includes wirelessly transmitting, by the network element, the first modulated signal at the first spectral segment to the mobile communication device.

In various embodiments, the control channel can be received at a frequency adjacent to the first modulated signal at the first carrier frequency and/or adjacent to the reference signal.

While for purposes of simplicity of explanation, the respective processes are shown and described as a series of blocks in FIG. 13E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 13F:
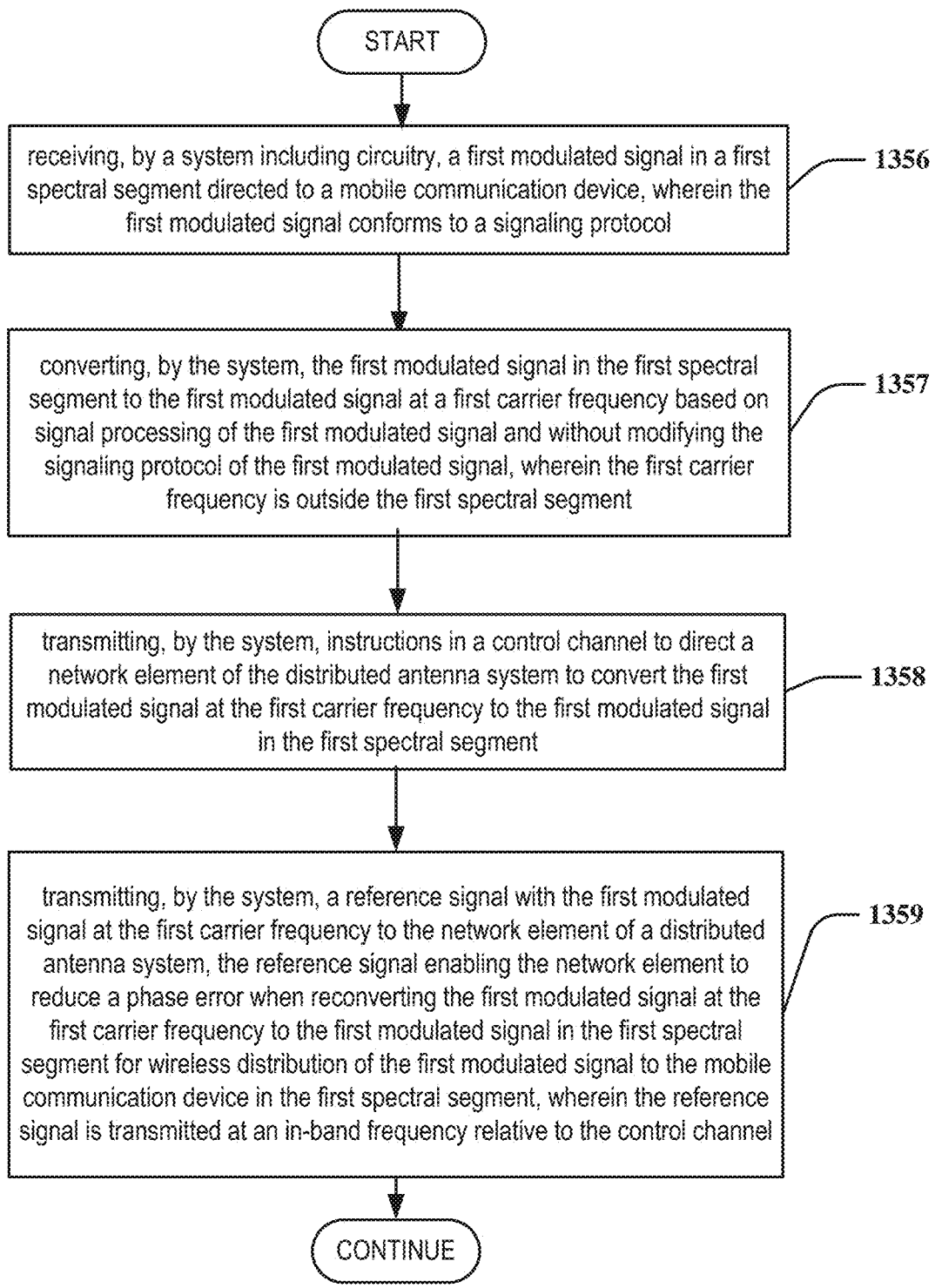
FIG. 13F illustrates a flow diagram of an example, non-limiting embodiment of a method in accordance with various aspects described herein.

Turning now to FIG. 13F, a flow diagram of an example, non-limiting embodiment of a method 1355, is shown. Method 1355 can be used with one or more functions and features presented in conjunction with FIGS. 1-12. Step 1356 includes receiving, by a system including circuitry, a first modulated signal in a first spectral segment directed to a mobile communication device, wherein the first modulated signal conforms to a signaling protocol. Step 1357 includes converting, by the system, the first modulated signal in the first spectral segment to the first modulated signal at a first carrier frequency based on a signal processing of the first modulated signal and without modifying the signaling protocol of the first modulated signal, wherein the first carrier frequency is outside the first spectral segment. Step 1358 includes transmitting, by the system, instructions in a control channel to direct a network element of the distributed antenna system to convert the first modulated signal at the first carrier frequency to the first modulated signal in the first spectral segment. Step 1359 includes transmitting, by the system, a reference signal with the first modulated signal at the first carrier frequency to the network element of a distributed antenna system, the reference signal enabling the network element to reduce a phase error when reconverting the first modulated signal at the first carrier frequency to the first modulated signal in the first spectral segment for wireless distribution of the first modulated signal to the mobile communication device in the first spectral segment, wherein the reference signal is transmitted at an in-band frequency relative to the control channel.

In various embodiments, the instructions are transmitted via modulation of the reference signal. The instructions can be transmitted as digital data via an amplitude modulation of the reference signal. The first carrier frequency can be in a millimeter-wave frequency band. The first modulated signal can be generated by modulating signals in a plurality of frequency channels according to the signaling protocol to generate the first modulated signal in the first spectral segment. The signaling protocol can comprise a Long-Term Evolution (LTE) wireless protocol or a fifth generation cellular communications protocol.

The converting by the system can comprises up-converting the first modulated signal in the first spectral segment to the first modulated signal at the first carrier frequency or down-converting the first modulated signal in the first spectral segment to the first modulated signal at the first carrier frequency. The converting by the network element can comprise down-converting the first modulated signal at the first carrier frequency to the first modulated signal in the first spectral segment or up-converting the first modulated signal at the first carrier frequency to the first modulated signal in the first spectral segment.

The method can further include receiving, by the system, a second modulated signal at a second carrier frequency from the network element, wherein the mobile communication device generates the second modulated signal in a second spectral segment, and wherein the network element converts the second modulated signal in the second spectral segment to the second modulated signal at the second carrier frequency and transmits the second modulated signal at the second carrier frequency. The method can further include converting, by the system, the second modulated signal at the second carrier frequency to the second modulated signal in the second spectral segment; and sending, by the system, the second modulated signal in the second spectral segment to a base station for processing.

The second spectral segment can differ from the first spectral segment, and wherein the first carrier frequency can differ from the second carrier frequency. The system can be mounted to a first utility pole and the network element can be mounted to a second utility pole.

While for purposes of simplicity of explanation, the respective processes are shown and described as a series of blocks in FIG. 13F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 13G:
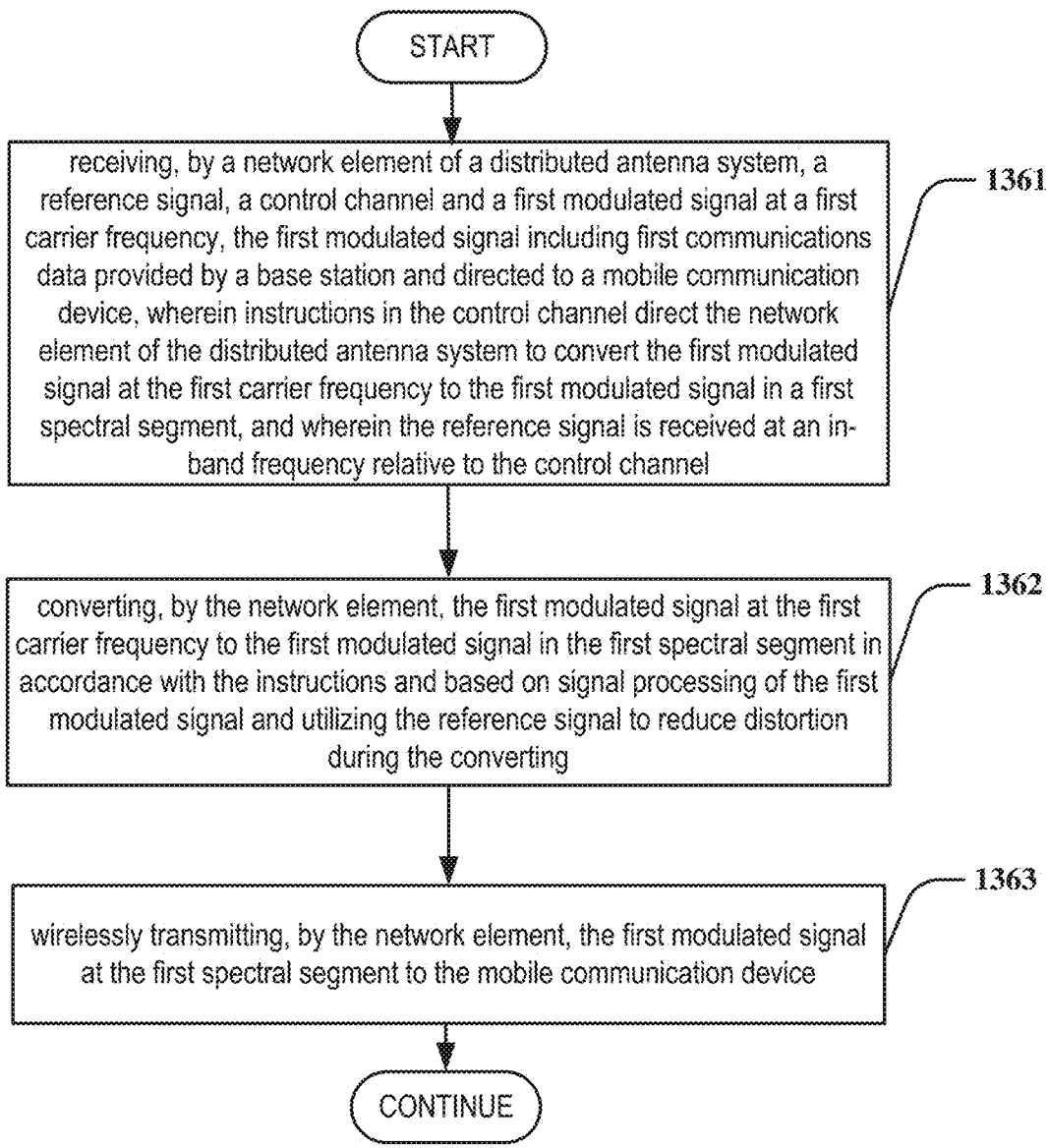
FIG. 13G illustrates a flow diagram of an example, non-limiting embodiment of a method in accordance with various aspects described herein.

Turning now to FIG. 13G, a flow diagram of an example, non-limiting embodiment of a method 1360, is shown. Method 1360 can be used with one or more functions and features presented in conjunction with FIGS. 1-12. Step 1361 includes receiving, by a network element of a distributed antenna system, a reference signal, a control channel and a first modulated signal at a first carrier frequency, the first modulated signal including first communications data provided by a base station and directed to a mobile communication device, wherein instructions in the control channel direct the network element of the distributed antenna system to convert the first modulated signal at the first carrier frequency to the first modulated signal in a first spectral segment, and wherein the reference signal is received at an in-band frequency relative to the control channel. Step 1362 includes converting, by the network element, the first modulated signal at the first carrier frequency to the first modulated signal in the first spectral segment in accordance with the instructions and based on a signal processing of the first modulated signal and utilizing the reference signal to reduce distortion during the converting. Step 1363 includes wirelessly transmitting, by the network element, the first modulated signal at the first spectral segment to the mobile communication device.

In various embodiments, the instructions are received via demodulation of the reference signal and/or as digital data via an amplitude demodulation of the reference signal.

While for purposes of simplicity of explanation, the respective processes are shown and described as a series of blocks in FIG. 13G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 13H:
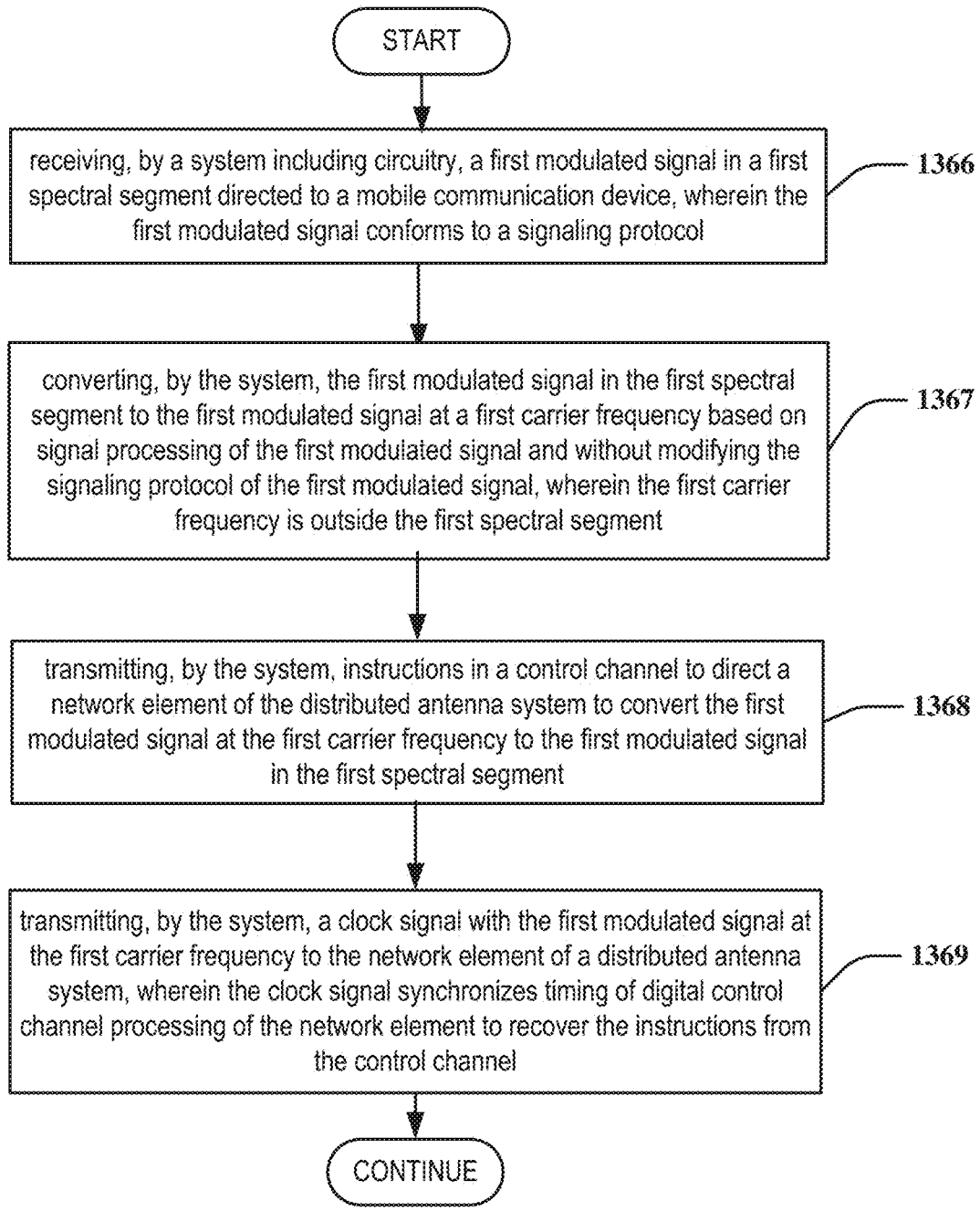
FIG. 13H illustrates a flow diagram of an example, non-limiting embodiment of a method in accordance with various aspects described herein.

Turning now to FIG. 13H, a flow diagram of an example, non-limiting embodiment of a method 1365, is shown. Method 1365 can be used with one or more functions and features presented in conjunction with FIGS. 1-12. Step 1366 includes receiving, by a system including circuitry, a first modulated signal in a first spectral segment directed to a mobile communication device, wherein the first modulated signal conforms to a signaling protocol. Step 1367 includes converting, by the system, the first modulated signal in the first spectral segment to the first modulated signal at a first carrier frequency based on a signal processing of the first modulated signal and without modifying the signaling protocol of the first modulated signal, wherein the first carrier frequency is outside the first spectral segment. Step 1368 includes transmitting, by the system, instructions in a control channel to direct a network element of the distributed antenna system to convert the first modulated signal at the first carrier frequency to the first modulated signal in the first spectral segment. Step 1369 includes transmitting, by the system, a clock signal with the first modulated signal at the first carrier frequency to the network element of a distributed antenna system, wherein the clock signal synchronizes timing of digital control channel processing of the network element to recover the instructions from the control channel.

In various embodiments, the method further includes transmitting, by the system, a reference signal with the first modulated signal at the first carrier frequency to a network element of a distributed antenna system, the reference signal enabling the network element to reduce a phase error when reconverting the first modulated signal at the first carrier frequency to the first modulated signal in the first spectral segment for wireless distribution of the first modulated signal to the mobile communication device in the first spectral segment. The instructions can be transmitted as digital data via the control channel.

In various embodiments, the first carrier frequency can be in a millimeter-wave frequency band. The first modulated signal can be generated by modulating signals in a plurality of frequency channels according to the signaling protocol to generate the first modulated signal in the first spectral segment. The signaling protocol can comprise a Long-Term Evolution (LTE) wireless protocol or a fifth generation cellular communications protocol.

The converting by the system can comprises up-converting the first modulated signal in the first spectral segment to the first modulated signal at the first carrier frequency or down-converting the first modulated signal in the first spectral segment to the first modulated signal at the first carrier frequency. The converting by the network element can comprise down-converting the first modulated signal at the first carrier frequency to the first modulated signal in the first spectral segment or up-converting the first modulated signal at the first carrier frequency to the first modulated signal in the first spectral segment.

The method can further include receiving, by the system, a second modulated signal at a second carrier frequency from the network element, wherein the mobile communication device generates the second modulated signal in a second spectral segment, and wherein the network element converts the second modulated signal in the second spectral segment to the second modulated signal at the second carrier frequency and transmits the second modulated signal at the second carrier frequency. The method can further include converting, by the system, the second modulated signal at the second carrier frequency to the second modulated signal in the second spectral segment; and sending, by the system, the second modulated signal in the second spectral segment to a base station for processing.

The second spectral segment can differ from the first spectral segment, and wherein the first carrier frequency can differ from the second carrier frequency. The system can be mounted to a first utility pole and the network element can be mounted to a second utility pole.

While for purposes of simplicity of explanation, the respective processes are shown and described as a series of blocks in FIG. 13H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 13I:
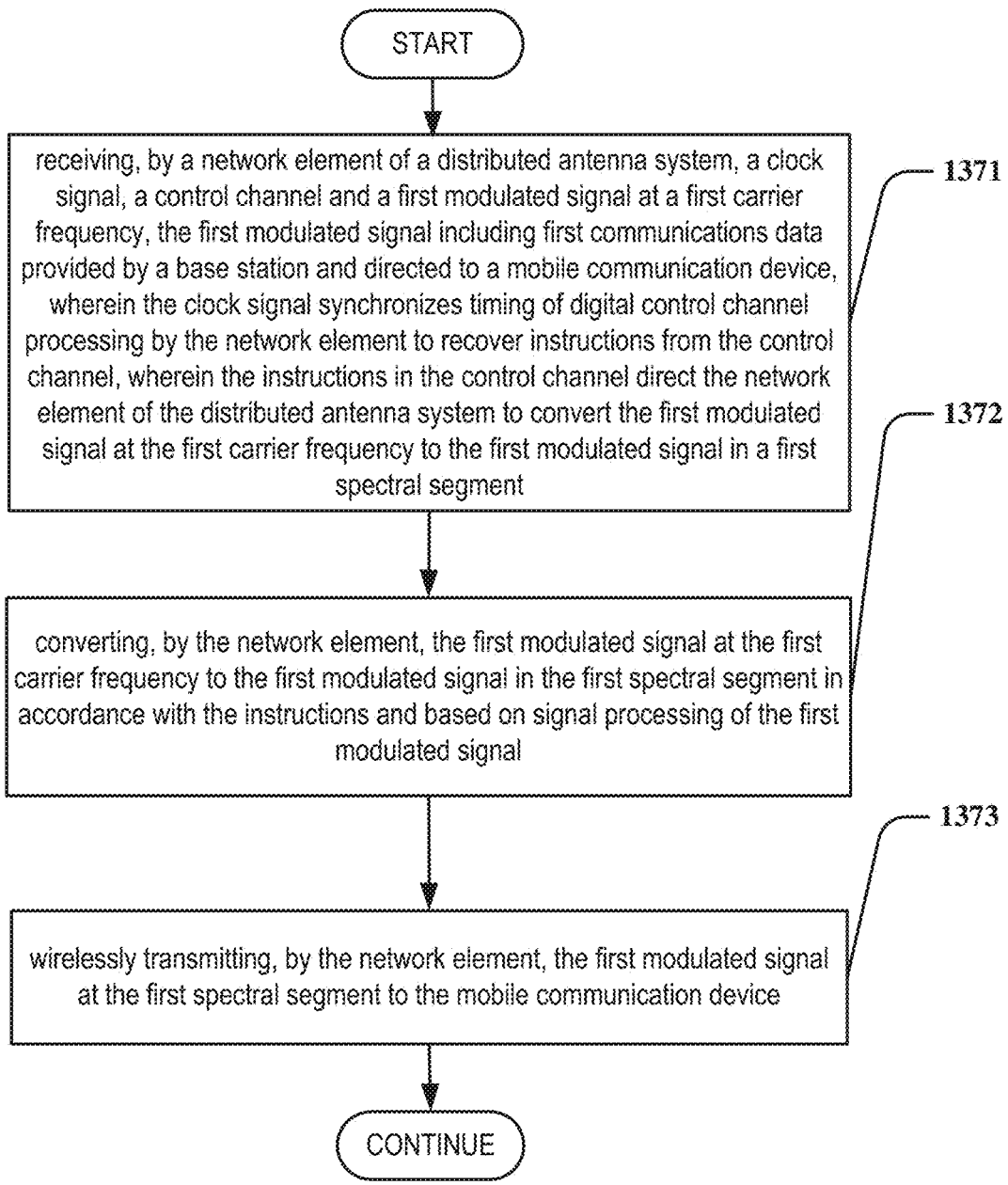
FIG. 13I illustrates a flow diagram of an example, non-limiting embodiment of a method in accordance with various aspects described herein.

Turning now to FIG. 13I, a flow diagram of an example, non-limiting embodiment of a method 1370, is shown. Method 1370 can be used with one or more functions and features presented in conjunction with FIGS. 1-12. Step 1371 includes receiving, by a network element of a distributed antenna system, a clock signal, a control channel and a first modulated signal at a first carrier frequency, the first modulated signal including first communications data provided by a base station and directed to a mobile communication device, wherein the clock signal synchronizes timing of digital control channel processing by the network element to recover instructions from the control channel, wherein the instructions in the control channel direct the network element of the distributed antenna system to convert the first modulated signal at the first carrier frequency to the first modulated signal in a first spectral segment. Step 1372 includes converting, by the network element, the first modulated signal at the first carrier frequency to the first modulated signal in the first spectral segment in accordance with the instructions and based on a signal processing of the first modulated signal. Step 1373 includes wirelessly transmitting, by the network element, the first modulated signal at the first spectral segment to the mobile communication device. In various embodiments, the instructions are received as digital data via the control channel.

While for purposes of simplicity of explanation, the respective processes are shown and described as a series of blocks in FIG. 13I, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 13J:
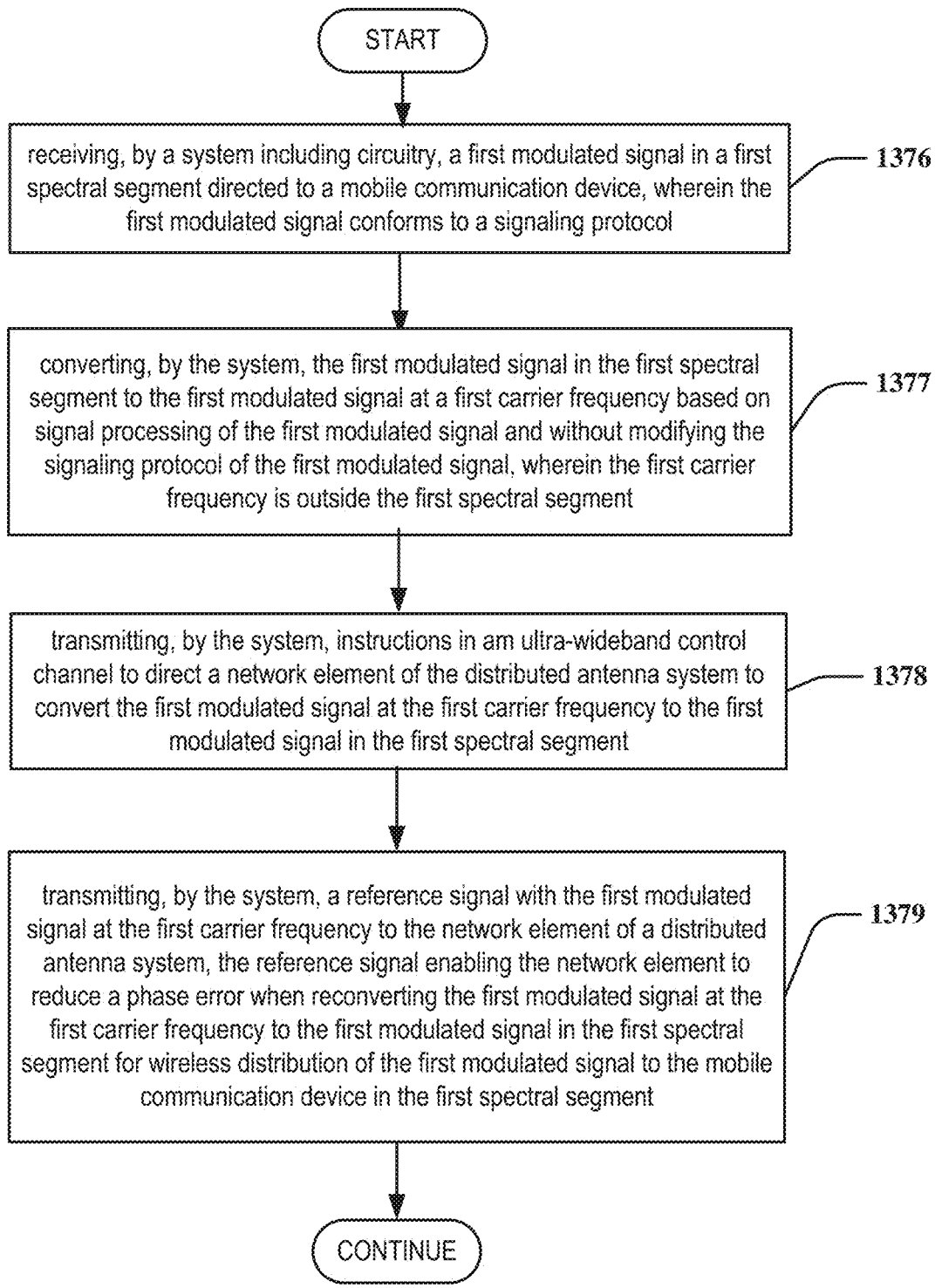
FIG. 13J illustrates a flow diagram of an example, non-limiting embodiment of a method in accordance with various aspects described herein.

Turning now to FIG. 13J, a flow diagram of an example, non-limiting embodiment of a method 1375, is shown. Method 1375 can be used with one or more functions and features presented in conjunction with FIGS. 1-12. Step 1376 includes receiving, by a system including circuitry, a first modulated signal in a first spectral segment directed to a mobile communication device, wherein the first modulated signal conforms to a signaling protocol. Step 1377 includes converting, by the system, the first modulated signal in the first spectral segment to the first modulated signal at a first carrier frequency based on a signal processing of the first modulated signal and without modifying the signaling protocol of the first modulated signal, wherein the first carrier frequency is outside the first spectral segment. Step 1378 includes transmitting, by the system, instructions in an ultra-wideband control channel to direct a network element of the distributed antenna system to convert the first modulated signal at the first carrier frequency to the first modulated signal in the first spectral segment. Step 1359 includes transmitting, by the system, a reference signal with the first modulated signal at the first carrier frequency to the network element of a distributed antenna system, the reference signal enabling the network element to reduce a phase error when reconverting the first modulated signal at the first carrier frequency to the first modulated signal in the first spectral segment for wireless distribution of the first modulated signal to the mobile communication device in the first spectral segment.

In various embodiments, wherein the first reference signal is transmitted at an in-band frequency relative to the ultra-wideband control channel. The method can further include receiving, via the ultra-wideband control channel from the network element of a distributed antenna system, control channel data that includes include: status information that indicates network status of the network element, network device information that indicates device information of the network element or an environmental measurement indicating an environmental condition in proximity to the network element. The instructions can further include a channel spacing, a guard band parameter, an uplink/downlink allocation, or an uplink channel selection.

The first modulated signal can be generated by modulating signals in a plurality of frequency channels according to the signaling protocol to generate the first modulated signal in the first spectral segment. The signaling protocol can comprise a Long-Term Evolution (LTE) wireless protocol or a fifth generation cellular communications protocol.

The converting by the system can comprises up-converting the first modulated signal in the first spectral segment to the first modulated signal at the first carrier frequency or down-converting the first modulated signal in the first spectral segment to the first modulated signal at the first carrier frequency. The converting by the network element can comprise down-converting the first modulated signal at the first carrier frequency to the first modulated signal in the first spectral segment or up-converting the first modulated signal at the first carrier frequency to the first modulated signal in the first spectral segment.

The method can further include receiving, by the system, a second modulated signal at a second carrier frequency from the network element, wherein the mobile communication device generates the second modulated signal in a second spectral segment, and wherein the network element converts the second modulated signal in the second spectral segment to the second modulated signal at the second carrier frequency and transmits the second modulated signal at the second carrier frequency. The method can further include converting, by the system, the second modulated signal at the second carrier frequency to the second modulated signal in the second spectral segment; and sending, by the system, the second modulated signal in the second spectral segment to a base station for processing.

The second spectral segment can differ from the first spectral segment, and wherein the first carrier frequency can differ from the second carrier frequency. The system can be mounted to a first utility pole and the network element can be mounted to a second utility pole.

While for purposes of simplicity of explanation, the respective processes are shown and described as a series of blocks in FIG. 13J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 13K:
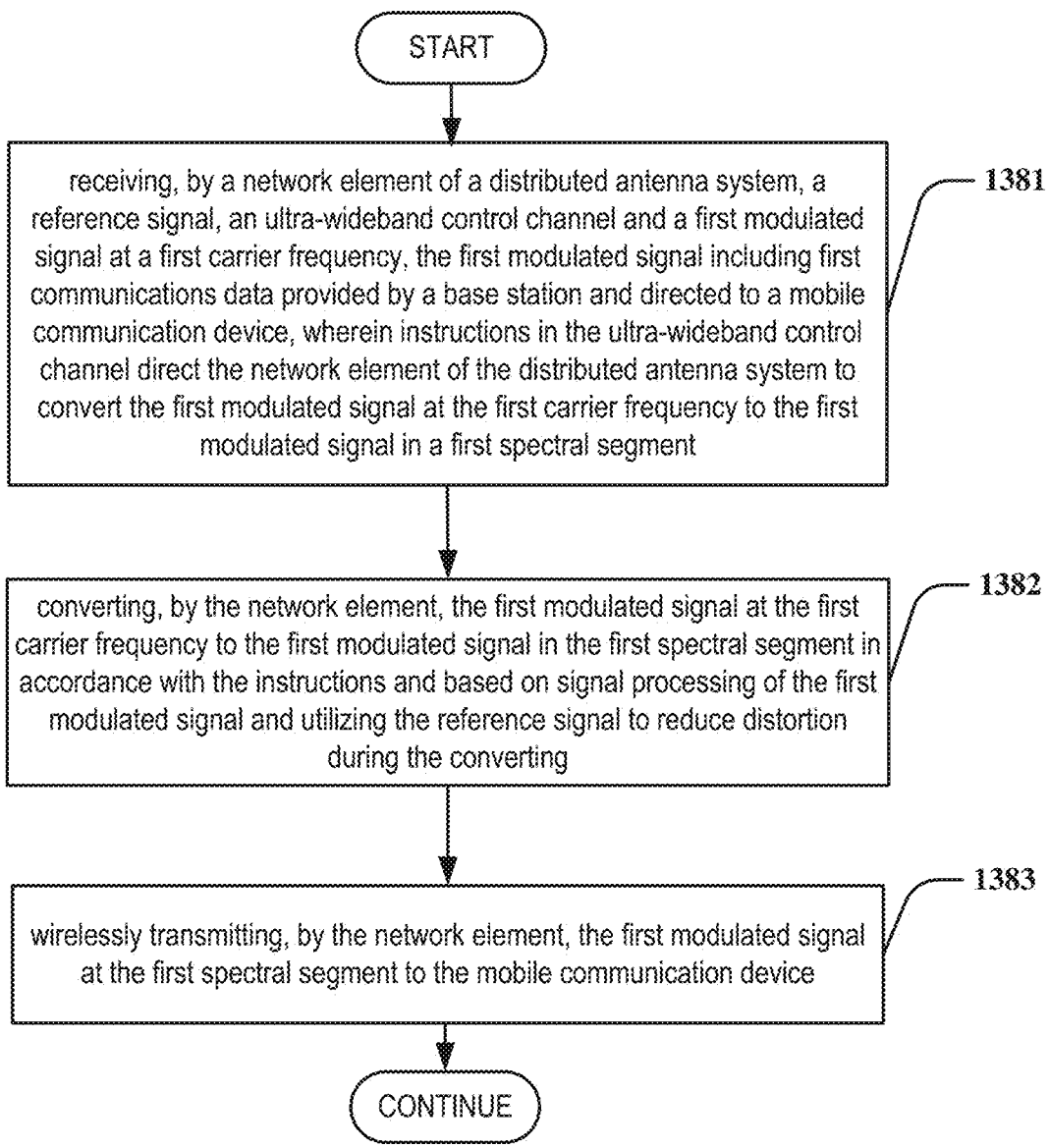
FIG. 13K illustrates a flow diagram of an example, non-limiting embodiment of a method in accordance with various aspects described herein.

Turning now to FIG. 13K, a flow diagram of an example, non-limiting embodiment of a method 1380, is shown. Method 1380 can be used with one or more functions and features presented in conjunction with FIGS. 1-12. Step 1381 includes receiving, by a network element of a distributed antenna system, a reference signal, an ultra-wideband control channel and a first modulated signal at a first carrier frequency, the first modulated signal including first communications data provided by a base station and directed to a mobile communication device, wherein instructions in the ultra-wideband control channel direct the network element of the distributed antenna system to convert the first modulated signal at the first carrier frequency to the first modulated signal in a first spectral segment, and wherein the reference signal is received at an in-band frequency relative to the control channel. Step 1382 includes converting, by the network element, the first modulated signal at the first carrier frequency to the first modulated signal in the first spectral segment in accordance with the instructions and based on a signal processing of the first modulated signal and utilizing the reference signal to reduce distortion during the converting. Step 1383 includes wirelessly transmitting, by the network element, the first modulated signal at the first spectral segment to the mobile communication device.

In various embodiments, wherein the first reference signal is received at an in-band frequency relative to the ultra-wideband control channel. The method can further include transmitting, via the ultra-wideband control channel from the network element of a distributed antenna system, control channel data that includes include: status information that indicates network status of the network element, network device information that indicates device information of the network element or an environmental measurement indicating an environmental condition in proximity to the network element. The instructions can further include a channel spacing, a guard band parameter, an uplink/downlink allocation, or an uplink channel selection.

While for purposes of simplicity of explanation, the respective processes are shown and described as a series of blocks in FIG. 13K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1320 (see below), non-volatile memory 1322 (see below), disk storage 1324 (see below), and memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
communication circuitry that facilitates operations, the operations comprising:
receiving a signal operating in a frequency band, the signal being modulated according to a signaling protocol;
frequency shifting the signal without modifying the signaling protocol by mixing a carrier wave signal with the signal to generate a frequency-shifted signal;
generating a transmission based on a combination of the frequency-shifted signal and a reference signal, the transmission including instructions directed to a first remote antenna system of a distributed antenna system; and
directing the transmission wirelessly to the first remote antenna system, the instructions being to direct the first remote antenna system to reconvert the frequency-shifted signal to the signal in the frequency band, and the reference signal being utilized to enable the first remote antenna system to reduce signal distortion when reconverting the frequency-shifted signal to the signal in the frequency band.

2. The system of claim 1, wherein the signal is provided by a base station device.

3. The system of claim 1, wherein the signal distortion comprises phase distortion.

4. The system of claim 1, wherein the instructions are in a control channel.

5. The system of claim 4, wherein the reference signal is modulated with the instructions in the control channel.

6. The system of claim 4, wherein the reference signal is modulated with a clock signal to enable the first remote antenna system to receive the instructions in the control channel.

7. The system of claim 1, wherein the signal conforms to a first signaling protocol of a plurality of signaling protocols, and wherein the first signaling protocol comprises a Long-Term Evolution (LTE) wireless protocol or a fifth generation cellular communications protocol.

8. The system of claim 1, wherein the carrier wave signal is utilized to frequency shift the signal into a corresponding frequency channel of a downlink spectral segment.

9. The system of claim 1, wherein the frequency shifting comprises up-converting the signal to the frequency-shifted signal.

10. The system of claim 1, wherein the reconverting by the first remote antenna system comprises down-converting the frequency-shifted signal to the signal in the frequency band.

11. The system of claim 1, wherein the frequency shifting comprises down-converting the signal to the frequency-shifted signal.

12. The system of claim 1, wherein the reconverting by the first remote antenna system comprises up-converting the frequency-shifted signal to the signal in the frequency band.

13. The system of claim 1, wherein the receiving the signal comprises receiving the signal originally in another frequency band that differs from the frequency band, and wherein the first remote antenna system wirelessly distributes the signal in the frequency band to a communication device.

14. The system of claim 1, wherein the first remote antenna system facilitates retransmission of at least a portion of the reference signal and at least a portion of the frequency-shifted signal to a second remote antenna system, the at least the portion of the reference signal being utilized to enable the second remote antenna system to reduce signal distortion.

15. A method, comprising:
receiving, by a circuit, a signal operating in a frequency band, the signal being modulated according to a signaling protocol;

frequency shifting, by the circuit, the signal without modifying the signaling protocol by mixing a carrier wave signal with the signal to generate a frequency-shifted signal; and generating, by the circuit, a wireless transmission based on a combined signal, the combined signal comprising a combination of the frequency-shifted signal and a reference signal, the wireless transmission including instructions directed to a remote antenna system of a distributed antenna system, the instructions being to direct the remote antenna system to reconvert the frequency-shifted signal to the signal in the frequency band, the reference signal being utilized to enable the remote antenna system to reduce signal distortion when reconverting the frequency-shifted signal to the signal in the frequency band.

16. The method of claim 15, wherein the signal is provided by a base station device.

17. The method of claim 16, wherein the base station device provides the signal in another frequency band that differs from the frequency band.

18. The method of claim 17, wherein the wireless transmission further includes a control channel including the instructions.

19. A first system of a distributed antenna system, comprising:
an antenna system; and
communication circuitry that facilitates operations, the operations comprising:
wirelessly receiving, by the antenna system, a first frequency-shifted signal, a second frequency-shifted signal, and a first reference signal from a second system of the distributed antenna system, the second system facilitating a first frequency shifting of a first signal operating in a first frequency band to the first frequency-shifted signal without modifying a first signaling protocol used to modulate the first signal, and the second system facilitating a second frequency shifting of a second signal operating in a second frequency band to the second frequency-shifted signal without modifying a second signaling protocol used to modulate the second signal;
performing a third frequency shifting of the first frequency-shifted signal to the first signal in the first frequency band for wireless delivery to a first communication device, the third frequency shifting utilizing the first reference signal to reduce signal distortion during the third frequency shifting; and
retransmitting, by the antenna system, the second frequency-shifted signal and a second reference signal to a third system of the distributed antenna system, the second reference signal enabling the third system to reduce signal distortion when reconverting the second frequency-shifted signal to the second signal in the second frequency band for wireless delivery to a second communication device.

20. The first system of claim 19, wherein the wirelessly receiving further includes receiving a control channel comprising instructions that direct the first system to retransmit the second frequency-shifted signal, and wherein the second reference signal comprises a retransmission of the first reference signal.

* * * * *